United States Patent [19]
Nagayama et al.

[11] Patent Number: 6,008,616
[45] Date of Patent: *Dec. 28, 1999

[54] POLE CHANGE INDUCTION MOTOR AND CONTROL APPARATUS AND METHOD FOR THE SAME

[75] Inventors: Kazutoshi Nagayama; Tadashi Ashikaga, both of Nagoya; Takayuki Mizuno, Kasugai; Kenji Yamada, Komaki; Masato Mori; Katsuyuki Watanabe, both of Nagoya; Isao Matsuda, Ogaki, all of Japan

[73] Assignee: Kabushiki Kaisha Meidensha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/571,136

[22] Filed: Dec. 12, 1995

[30] Foreign Application Priority Data

Dec. 12, 1994 [JP] Japan .................................. 6-307648
Feb. 22, 1995 [JP] Japan .................................. 7-33536

[51] Int. Cl.⁶ .................................................. H02P 1/38
[52] U.S. Cl. ........................ 318/773; 318/775; 318/801
[58] Field of Search .................. 318/798–815, 318/773–777

[56] References Cited

U.S. PATENT DOCUMENTS

| | | | |
|---|---|---|---|
| 3,673,477 | 6/1972 | Broadway et al. | |
| 4,489,265 | 12/1984 | Kuznetsov | 318/773 |
| 5,107,435 | 4/1992 | Yamada | 364/474.22 |
| 5,136,228 | 8/1992 | Yamada et al. | 318/808 |
| 5,204,607 | 4/1993 | Hugel et al. | 318/806 |
| 5,444,351 | 8/1995 | Tamamura et al. | 318/811 |

OTHER PUBLICATIONS

Mizuno et al., "Analysis of a change in Number of Poles in a Pole Change Induction Motor Applicable for an Electric Vehicle by Means of a Six-Phase Absolute Transformation Rotating d–g axes", Oct. 3, 1994.

*Primary Examiner*—David Martin
*Attorney, Agent, or Firm*—Foley & Lardner

[57] ABSTRACT

An apparatus for a pole change induction motor and control method for the same which are applicable to, for example, a driving source of an electric vehicle without power transmission are disclosed. In the control apparatus and method for the pole change motor is electrically changed between an n number of poles and a 2n number of the poles (n=2, 4, - - - ) so as to secure an output torque of the pole change induction motor in a constant driving mode with a high rotation speed of the induction motor without increase in a dimension of either of the induction motor or an inverter associated with the pole change induction motor and without occurrence in a torque variation. In a preferred embodiment, two channels of exciting and torque instructions and slip frequency generators (current instruction calculating blocks and current control systems) are provided for the n number of pole driving and 2n number of pole driving.

41 Claims, 42 Drawing Sheets

(FOUR-POLE)

(TWO-POLE)

LOW-SPEED DRIVING RANGE
(4P)

HIGH-SPEED DRIVING RANGE (2P)

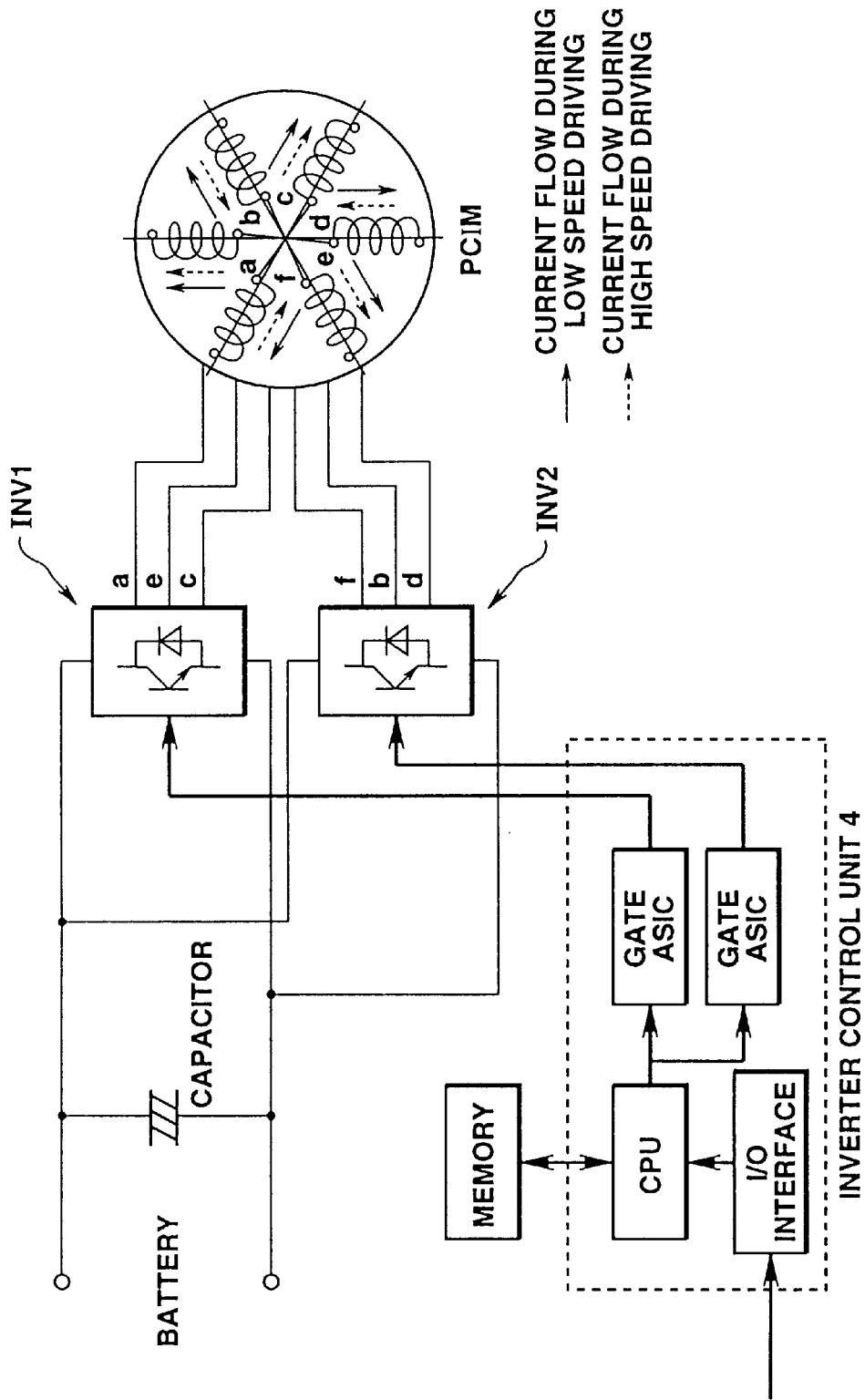

FOUR-POLE/EIGHT-POLE SIMULTANEOUS DRIVING

FIG.11M
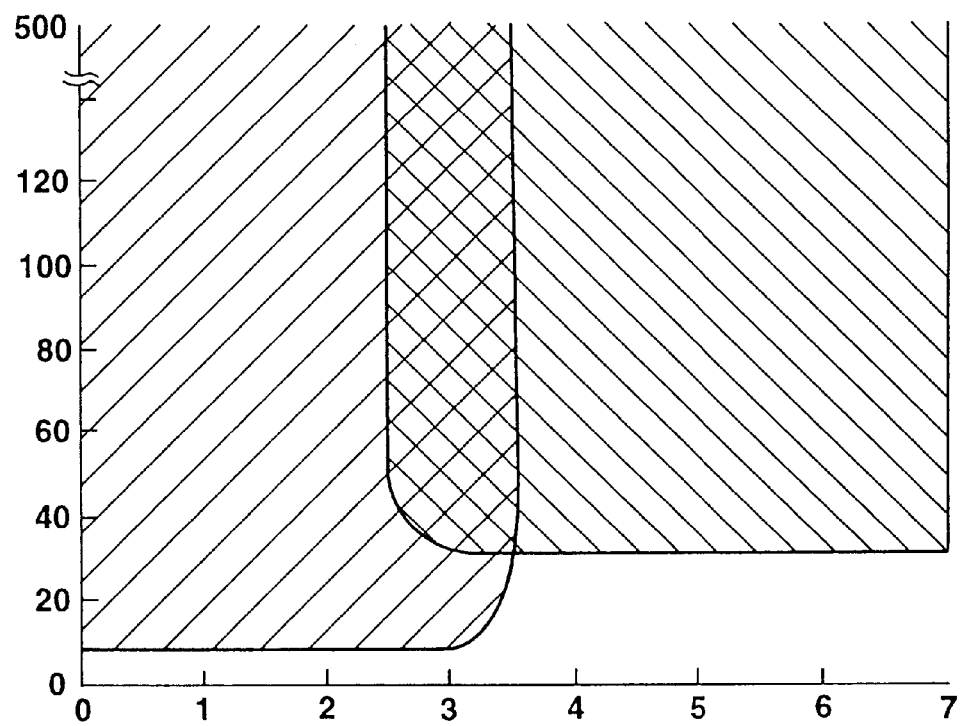
 IM     POLE CHANGE SYSTEM

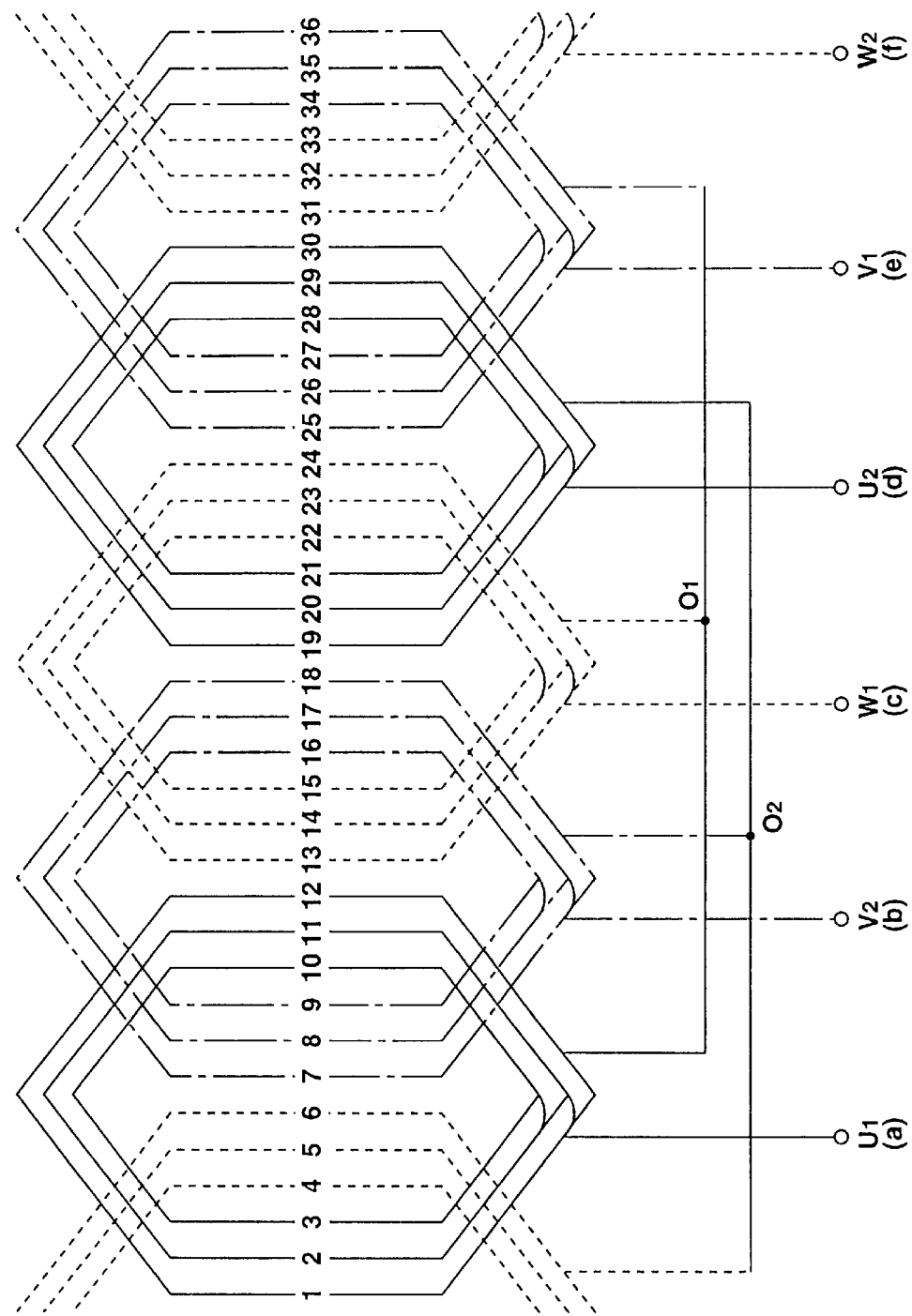

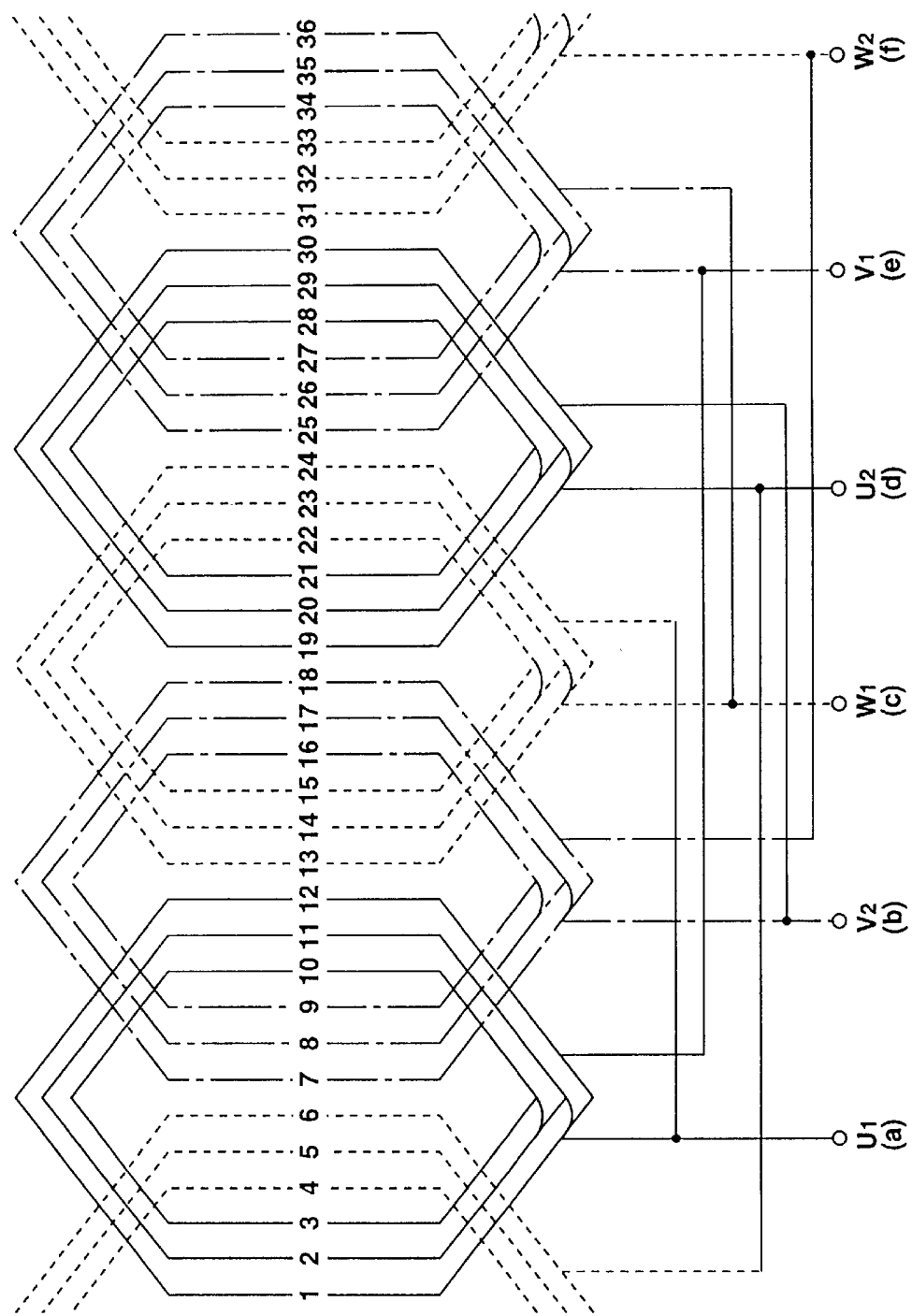
FIG.13  SINGLE-LAYER CONCENTRIC WINDING (△-▽ CONNECTION) 2/4P (TWO(DOUBLE)-LAYER) LAP WINDING (Y-Y)CONNECTION 4/8P

SPEED CONTROL SYSTEM 10 OF FIG.16

EXAMPLE OF INSTRUCTION
CALCULATING BLOCK 100 OF FIG.19

PI CURRENT CONTROL

FOUR-POLE SIDE
(CURRENT CONTROL SYSTEM 1) (2A)

PI CURRENT CONTROL

EIGHT-POLE SIDE
(CURRENT CONTROL SYSTEM 2) (2B)

FOUR-POLE SIDE
(CURRENT CONTROL SYSTEM 1) (2A)

EIGHT-POLE SIDE
(CURRENT CONTROL SYSTEM 2) (2B)

FOUR-POLE SIDE
(CURRENT CONTROL SYSTEM 1) (2A)

EIGHT-POLE SIDE
(CURRENT CONTROL SYSTEM 2) (2B)

FOUR-POLE SIDE
(CURRENT CONTROL SYSTEM 1)

EIGHT-POLE SIDE
(CURRENT CONTROL SYSTEM 2)

POLE CHANGE INDUCTION MOTOR AND CONTROL APPARATUS AND METHOD FOR THE SAME

BACKGROUND OF THE INVENTION

1. Field of the Invention

The present invention relates generally to a pole change induction motor and control apparatus and method for controlling the same which is applicable to, for example, a driving source of an electric vehicle with no power transmission.

2. Description of the Background Art

Frequency (rotation speed) controls with inverters as power supplies for induction motors have been adopted as variable speed controls of induction motors. A torque characteristic of a torque with respect to a frequency (revolution or rotation speed) of the motor indicates a constant torque characteristic (dotted line with V in FIG. 1) so that the supplied voltage to the motor is, at this constant torque range, increased in proportion to the increase in the rotation speed. (The constant torque characteristic is such that even if the frequency (revolution speed) of the motor is changed, the torque of the motor does not change.)

FIG. 1 shows a revolution speed (frequency) versus torque characteristic graph in a frequency control of the induction motor.

As denoted by a solid line of FIG. 1, in a speed range in which a constant output is derived from the motor (hereinafter referred to as a constant output driving range) and which is in excess of the constant torque characteristic, the torque T is reduced along a curved line of 1/f (f: frequency of the motor) which is generally inversely proportional to the increase in the frequency due to a limitation of the applied voltage V from the inverter to the induction motor. A broken line shown in FIG. 1 denotes a maximum torque characteristic T' that the induction motor naturally has. At frequencies higher than a frequency denoted by af in FIGS. 1 and 2 (f in this case denotes a base speed) over which a point of intersection between the maximum torque characteristic curve T' (T' is proportional to $1/f^2$) and the torque characteristic T (T is proportional to 1/f) is present, the output torque of the motor is limited by the maximum torque characteristic T'. In FIGS. 1 and 2, a denotes an arbitrary number (integer) generally greater than 2. However, even if a is 1 or more, the above-described limitation of the output torque is established.

When the induction motor is driven in the constant output (characteristic) range shown in FIG. 1, the output torque is reduced as the frequency (rotation speed) becomes higher. In addition, the output torque is limited according to the maximum torque characteristic of the induction motor so that an insufficient torque is resulted according to a load applied to the induction motor.

The following driving methods have conventionally been considered in order to eliminate the torque insufficiency problem described above.

(1) Production of a large capacity and large dimension induction motor. If such an induction motor as having a maximum torque characteristic T'" shown in FIG. 2 is used, the torque from the torque characteristic T shown in FIG. 2 can be derived until the rotation speed is increased and reaches to a predetermined speed (frequency) 2af according to the alternative maximum torque characteristic T'" in place of the maximum torque characteristic T' as shown in FIG. 2.

(2) Production of a large capacity and large dimension inverter. If an output power (capacity) of the inverter connected to the induction motor is increased, the output voltage of the large dimension inverter is changed from V1 to V2 shown in FIG. 3 so as to derive the maximum torque characteristic T1" from that T1' of the induction motor, thus the output torque until the frequency (RPM) 2af being assured.

(3) Mechanically or manually switching of connections between windings in the induction motor: Such a driving of the induction motor as described below is carried out. That is to say, a pole change (change or switching, namely, the number of poles are changed) is carried out by mechanically or manually switching the connections between winding switching terminals of the induction motor and inverters when the driving revolution speed is in excess of a certain range.

However, in the above-described item (1), to obtain the double frequency (2af/af=2) as the value of the increased torque, it is necessary to double the dimension of the inverter so that the large sized whole system including the double sized induction motor is resulted.

In the above-described item (2), if the torque increase is resulted, an output current of the inverter is increased due to the change in a voltage characteristic applied to the induction motor and, thus, the whole system including the large-sized inverter itself is increased.

In the above-described item (3), it is necessary to provide a switch to change the number of poles. In addition, a switching operation interval of the switch corresponds to an idling time duration (no load driving) of the motor driving so that a torque shock (variation) due to an abrupt change of the output torque occurs during this switching operation. Furthermore, due to a frequent use of the switch causes a shortened life of the switch or failure in the switch.

SUMMARY OF THE INVENTION

It is, therefore, a principal object of the present invention to provide a pole change induction motor and a (driving) control apparatus and method for the pole change induction motor, the induction motor being provided with windings which achieve a suppression of a torque variation caused shock in a constant output driving with an electrical change in a number of poles of the pole change induction motor to eliminate an output torque insufficient problem during the constant output driving without the enlarged dimensions for the motor and inverter, the pole change induction motor and control apparatus and method for the same being suitably applicable to a driving source of an electric vehicle with no power transmission.

The above-described object can be achieved by providing an apparatus comprising:

a) a pole change induction motor capable of changing its number of poles between an n number of the poles and a 2n number of the poles (n=2, 4, - - -) and having stator windings, the stator windings including six lead terminals;

b) inverter means for providing frequency controlled three-phase powers for two groups of said stator windings, each of the two groups being constituted by three of the six lead terminals of the stator windings;

c) measuring means for measuring a rotation speed of the pole change induction motor; and d) controlling means for receiving the measured rotation speed (ωr) of said pole change induction motor and a speed instruction (ωr*) and controlling output phases of said inverter means to the stator winding of said induction motor supplied to each of the two groups of the lead terminals of the stator winding so as to provide at least one of either; all of the same phases for the outputs of said inverter means; or the phases of the outputs of said inverter means such that each phase of the outputs at respective phases of said six-phase inverter is shifted sequentially by 2 π/3 for the two groups of the lead terminals of said stator winding, when said induction motor is driven in a constant output range and the rotation speed of the motor falls in a low speed range below a predetermined rotation speed, thus the induction motor being driven with the number of the poles being changed to the 2n number of the poles, and so as to provide at least one of either; 180° inverted output phases for the outputs of said inverter means which are supplied to one of the two groups of the lead terminals of said stator winding with the same phases provided for the outputs of said inverter means which are supplied to the other of the two groups of the lead terminals and provide output frequencies of the outputs of said inverter means to the two groups of the lead terminals of said stator winding which are approximately half the output frequencies; or the phases of the outputs of said inverter means such that each phase of the outputs at respective phases of said six-phase inverter is sequentially shifted by π/3 for the two groups of the lead terminals of said stator windings and to provide the frequencies of the outputs at the respective changed to the 2n number of the poles, and so as to provide at least one of either; 180° inverted output phases for the outputs of said inverter means which are supplied to one of the two groups of the lead terminals of said stator winding with the same phases provided for the outputs of said inverter means which are supplied to the other of the two groups of the lead terminals and provide output frequencies of the outputs of said inverter means to the two groups of the lead terminals of said stator winding which are approximately half the output frequencies; or the phases of the outputs of said inverter means such that each phase of the outputs at respective phases of said six-phase inverter is sequentially shifted by π/3 for the two groups of the lead terminals of said stator windings and to provide the frequencies of the outputs at the respective phases of said inverter means for the two groups of the lead terminals of said stator windings such that the output frequencies are approximately half the output frequencies at a time when the induction motor is driven in the constant output driving and the rotation speed of said induction motor falls in the low speed range, when the induction motor is driven in the constant output range and the phases of said inverter means for the two groups of the lead terminals of said stator windings such that the output frequencies are approximately half the output frequencies at a time when the induction motor is driven in the constant output driving and the rotation speed of said induction motor falls in the low speed range, when the induction motor is driven in the constant output range and the rotation speed of said induction motor falls in a high speed range exceeding the predetermined speed, thus the induction motor being driven with the number of the poles being changed to the n number of the poles.

The above-described object can also be achieved by providing a method for speed controlling a pole change induction motor, comprising the steps of:

a) providing the pole change induction motor capable of changing its number of poles between an n number of the poles and a 2n number of the poles (n=2, 4, - - - ) and having stator windings, the stator windings including six lead terminals;

b) providing inverter means for frequency controlled three-phase powers for two groups of said stator windings, each of the two groups being constituted by three of the six lead terminals of the stator windings;

c) measuring a rotation speed of the pole change induction motor; and d) receiving the measured rotation speed (ωr) of said pole change induction motor and a speed instruction (ωr*) and controlling output phases of said inverter means to the stator winding of said induction motor supplied to each of the two groups of the lead terminals of the stator winding so as to provide at least one of either; all of the same phases for the outputs of said inverter means; or the phases of the outputs of said inverter means such that each phase of the outputs at respective phases of said six-phase inverter is shifted sequentially by 2 π/3 for the two groups of the lead terminals of said stator winding, when said induction motor is driven in a constant output range and the rotation speed of the motor falls in a low speed range below a predetermined rotation speed, thus the induction motor being driven with the number of the poles being rotation speed of said induction motor falls in a high speed range exceeding the predetermined speed, thus the induction motor being driven with the number of the poles being changed to the n number of the poles.

BRIEF DESCRIPTION OF THE DRAWINGS

FIG. 11C is an explanatory view for explaining a current flow in the case of the four poles and two poles in the pole change induction motor of the first embodiment shown in FIG. 6 and an internal configuration of an inverter control unit shown in FIG. 6.

FIG. 11M is a characteristic graph of a constant output driving range in a case of the conventional induction motor and in the pole change induction motor used in the control apparatus for the pole change induction motor according to the present invention.

FIG. 11O is a characteristic graph as responses of a simulation of the control apparatus for the pole change induction motor which is capable of changing the number of the poles between eight poles and four poles in the same way as shown in FIGS. 11D through 11L.

FIGS. 12, 13, 14, and 15 are explanatory views of examples of connections of the stator windings of the pole change induction motor used in the control apparatus for the pole change induction motor according to the present invention.

BEST MODE FOR CARRYING OUT THE INVENTION

Reference will hereinafter be made to the drawings in order to facilitate a better understanding of the present invention.

First Embodiment

Figure 6:
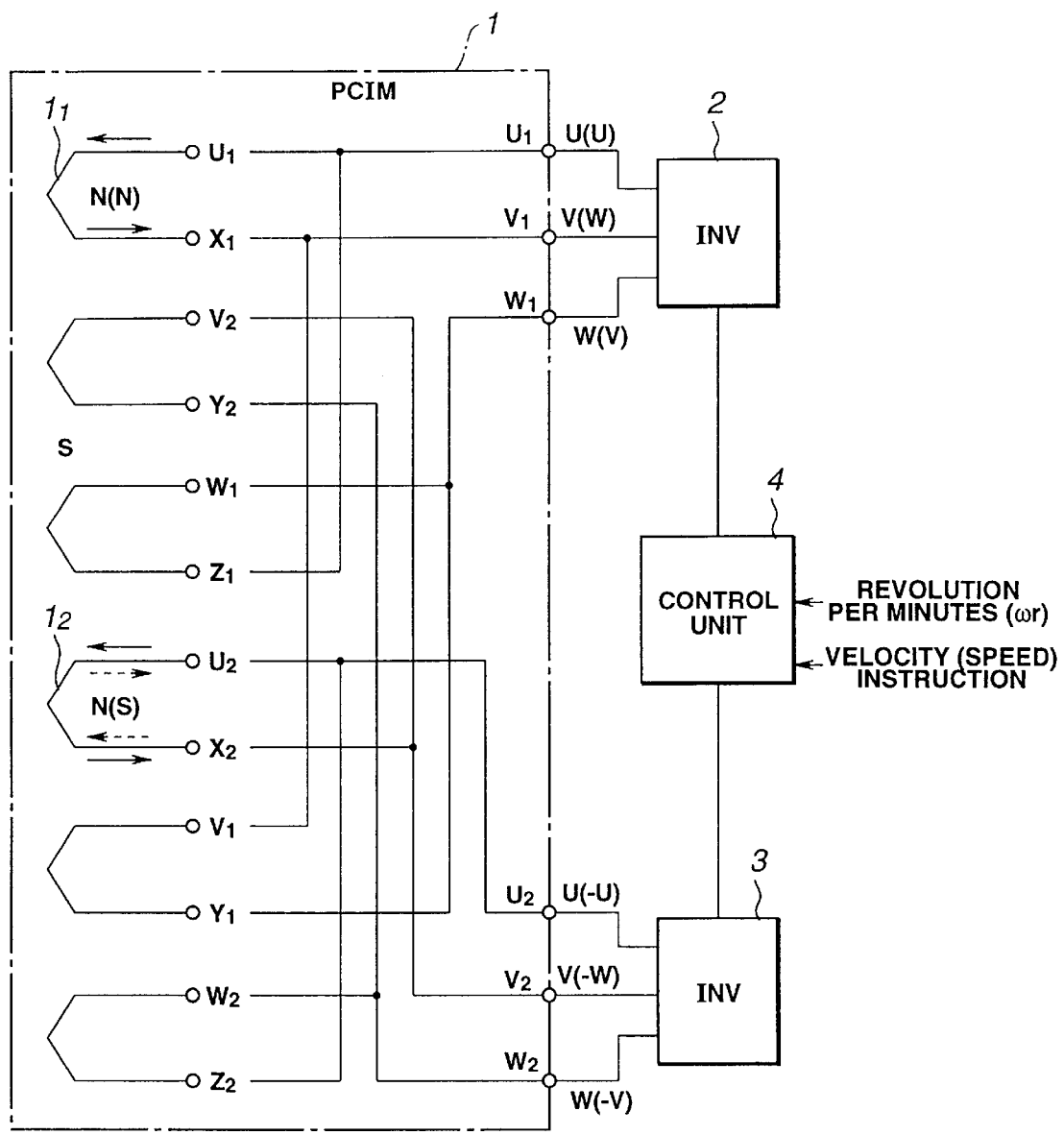
FIG. 6 is a schematic view of stator windings of the pole change induction motor (PCIM) and the control apparatus for the pole change induction motor (PCIM) in a first preferred embodiment according to the present invention.

FIG. 6 shows a first embodiment of a pole change induction motor and its control apparatus according to the present invention.

A pole change induction motor (PCIM) 1 is provided with stator windings in a three-phase type and having six leading (lead) terminals U1, V1, W1, U2, V2, W2. In the first embodiment, two three-phase inverters 2 and 3 serve to drive the induction motor (IM) 1. A speed variable inverter control unit 4 including an automatic speed control system or open-loop speed control system, connected commonly to the two inverters (INV) 2 and 3, controls output frequencies and output phase voltages (or output phase currents of the) inverters 2 and 3 according to a speed instruction value and a detection value of the motor output axial rotation speed.

For the speed instruction value and the detection value of the motor output axial rotation speed, a U.S. Pat. No. 5,136,228 (issued on Aug. 4, 1992) is exemplified, the disclosure of which is herein incorporated by reference.

Respective output capacities of the inverters 2 and 3 are set so as to correspond to controllable current capacities in which a conventional one three-phase inverter is divided into two. That is to say, each main circuit switching element of the respective inverters 2 and 3 uses a half controllable current and, in each main circuit having the parallel connected switching elements, the number of the parallel connected switching elements are halved.

Figure 1:
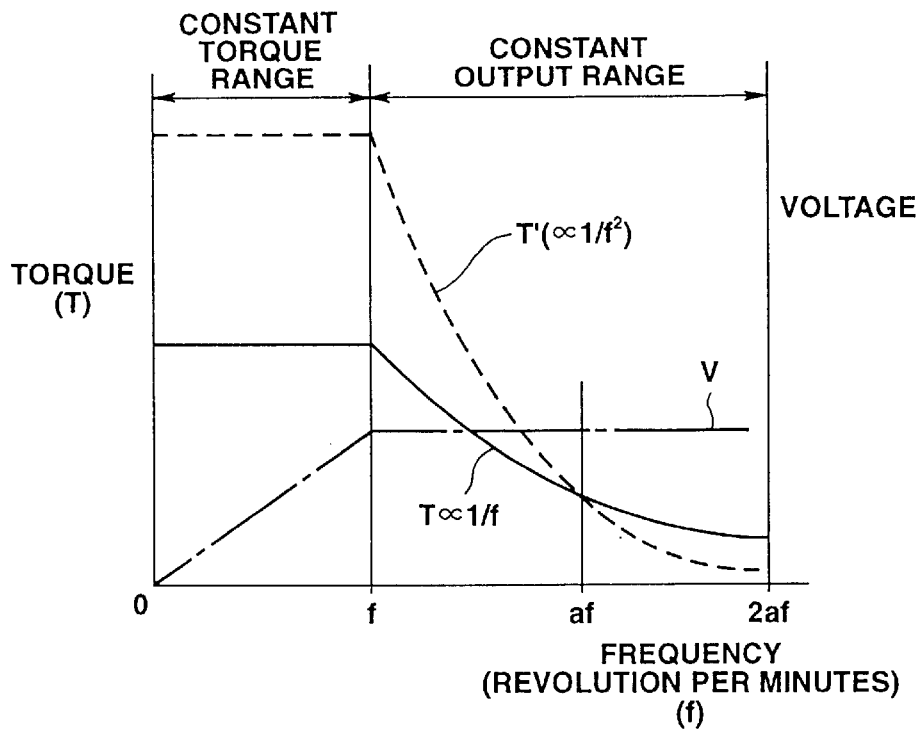
FIG. 1 is a characteristic graph of a frequency (revolution speed) of a conventional induction motor versus torque thereof described in the BACKGROUND OF THE INVENTION.
Figure 2:
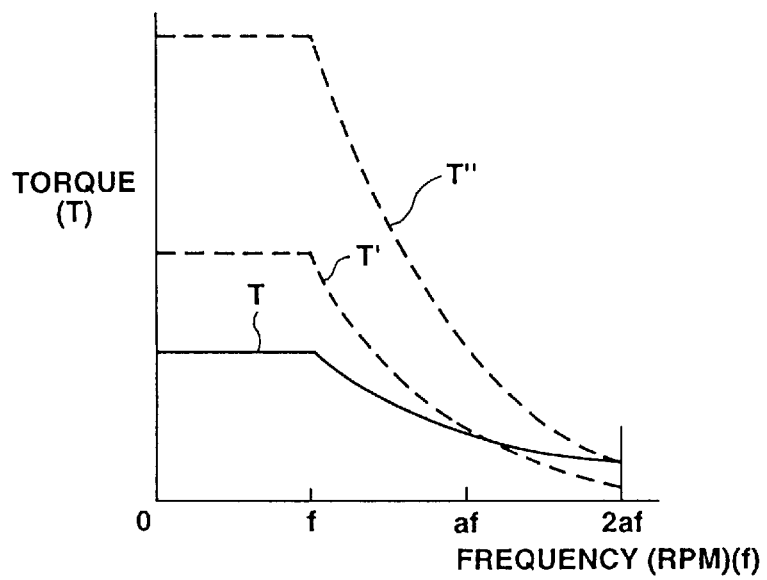
FIG. 2 is a characteristic graph of the frequency (revolution speed of the conventional induction motor versus torque thereof with a conventional maximum torque characteristic modified.
Figure 3:
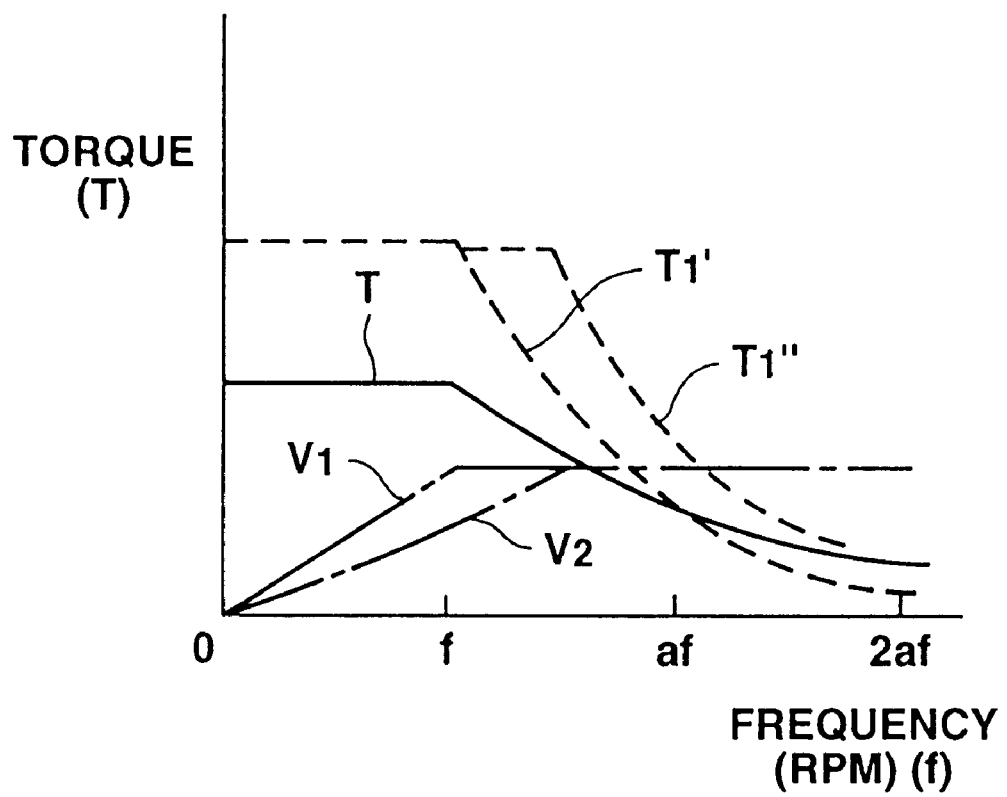
FIG. 3 is a characteristic graph of the frequency (revolution speed) of the conventional induction motor versus torque thereof with a capacity of an inverter associated with the induction motor modified.

The inverter control unit 4 controls the phases of the output voltages from the respective inverters 2 and 3 so that the voltage phases derived from the three-phase inverters 2 and 3 to the pole change induction motor 1 (PCIM) are mutually the same when the induction motor 1 is driven at the rotation speed (frequency) which is within a constant torque driving range and constant output driving range and until a frequency denoted by af shown in FIGS. 1 through 3 (namely, the frequency (rotation speed) of the pole change induction motor is low in the constant torque range and is increased up to a frequency value denoted by af (a denotes an integer of 1 or more and f denotes a base speed). When the induction motor 1 is driven at a frequency range of the induction motor which exceeds the frequency af, the voltage phase of corresponding one 3 of the two inverters 2 and 3 is inverted by 180 degrees and the output frequencies of both inverters 2 and 3 are halved with a phase rotation reversed.

A relationship between phase switched states in the change in the number of poles (in the pole change induction motor (PCIM) in FIG. 6, the number of the poles is changed between four poles and two poles) is described in Table 1. (It is noted that during the number of the poles being two poles, the phase rotation is carried out as appreciated from Table 1.

This control procedure for the output voltage phases from the two inverters 2 and 3 can carry equivalently out the pole switching (the number of the poles is switched at a ratio of 1 versus 2).

In details, at a low frequency (rotation speed) region of the induction motor 1 below af, at which the respective inverters 2 and 3 are driven at the same phases, four poles of N (North), S (South), N (North), and S (South) are formed on a stator portion in the motor 1 according to current flow directions (denoted by solid lines marked with arrows) at two windings I1 and I2. When the phase of the inverter 3 is inverted, the current flow direction of the winding I2 is reversed as denoted by broken lines with arrows of FIG. 6. The number of poles of the induction motor is consequently changed into two poles of N and S.

When the pole change from the four poles to the two poles occurs, the output frequencies of the two three-phase inverters 2 and 3 are halved so that the revolution speed of the induction motor becomes the same as those before and after this pole number change occurs and the torque curve becomes so smooth that the induction motor (PCIM) falls in the high frequency range.

Figure 7:
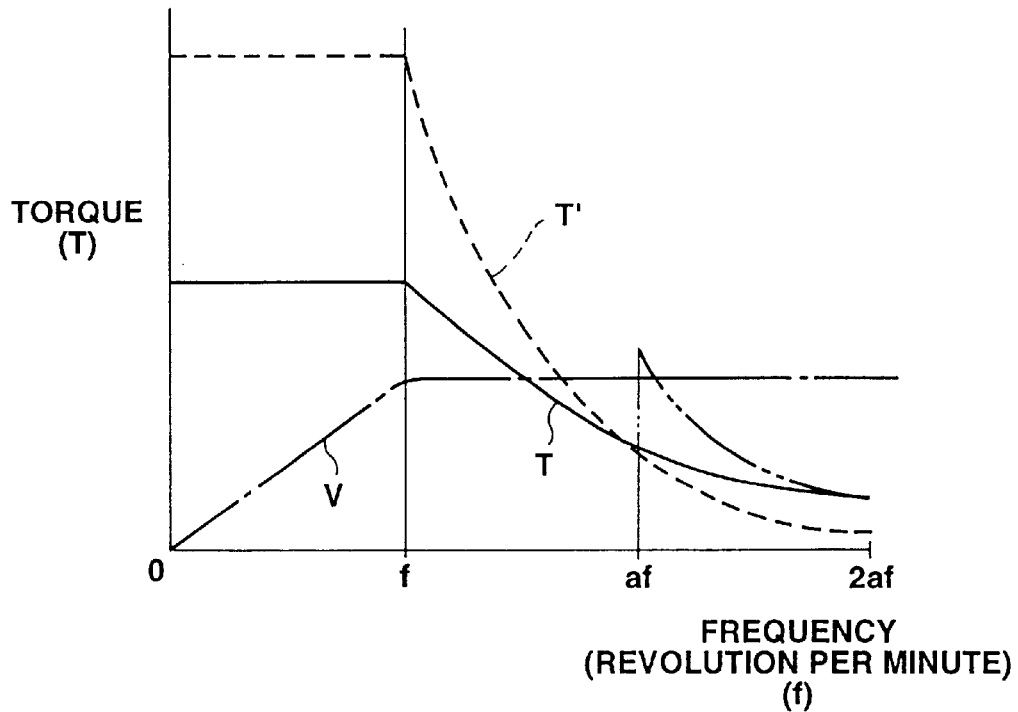
FIG. 7 is a characteristic graph representing the maximum torque characteristics when the number of poles in the pole change induction motor shown in FIG. 6 is changed at a rotation speed (frequency) of the pole change motor denoted by af.

In addition, due to the change in the pole numbers, at the high frequency (rotation speed) range exceeding af, a maximum torque characteristic T" of the pole change induction motor 1 becomes twice at the frequency af and thereafter the torque at the frequency af at which the pole change to the two poles occurs becomes reduced along a characteristic curve of $1/f^2$ (denoted by a phantom line of FIG. 4 or FIG. 7) so that a desired (required) driving (output) torque T can be secured until the frequency (rotation speed) of 2af, as appreciated from FIG. 7.

Figure 8A:
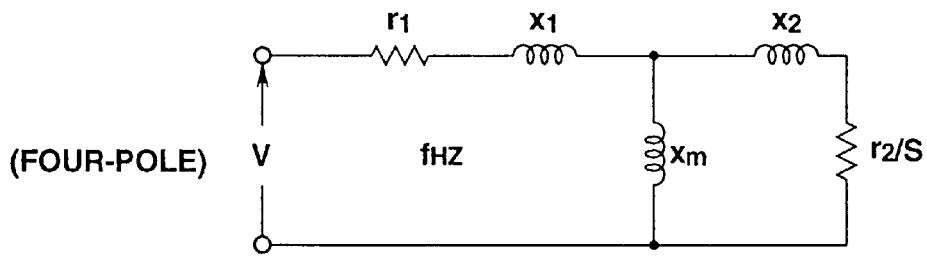
FIGS. 8A and 8B are equivalent circuits in the cases of the four pole state and two pole state of the pole change induction motor in the first embodiment shown in FIG. 6.
Figure 8B:
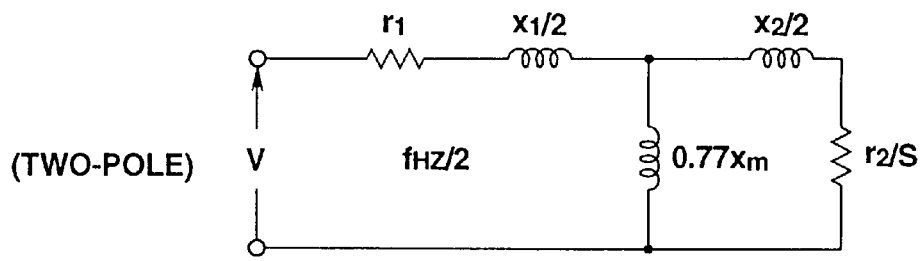

FIGS. 8A and 8B show equivalent circuits of the four pole state induction motor and two pole state pole change induction motor, respectively.

As compared with both of FIGS. 8A and 8B, in the equivalent circuit in the case of the two pole state induction motor, primary and secondary circuit reactances x1 and x2 are halved as those in the case of the four pole induction motor and mutual inductance xm between the windings of stator (primary circuit) and rotor (secondary circuit) gives 0.77%. In FIGS. 8A and 8B, V denotes a terminal voltage of the pole change induction motor (PCIM), r1 denotes a primary resistance, x1 denotes a primary self inductance (primary reactance), x2 denotes secondary self inductance (secondary reactance), r2 denotes a secondary resistance, S denotes the slip frequency generally denoted by ωs.

In these equivalent circuits of FIGS. 8A and 8B, a maximum torque Tm derivable from the pole change induction motor (PCIM) of FIG. 6 is expressed as follows:

$$Tm = K \frac{V^2}{\left(r1 + \sqrt{(r1^2 + (x1+x2)^2)}\right)}$$

In this equation, since the values of x1 and x2 at the high speed range are sufficiently larger than the value of the primary resistance r1, the maximum torque Tm of the induction motor 1 can be expressed in the following equation. The torque provides twice as those compared with the low speed range.

$$Tm \approx K \frac{V^2}{X1 + X2} = 2V^2/(x1+x2)$$

K denotes a torque constant in the above two equations.

Figure 9:
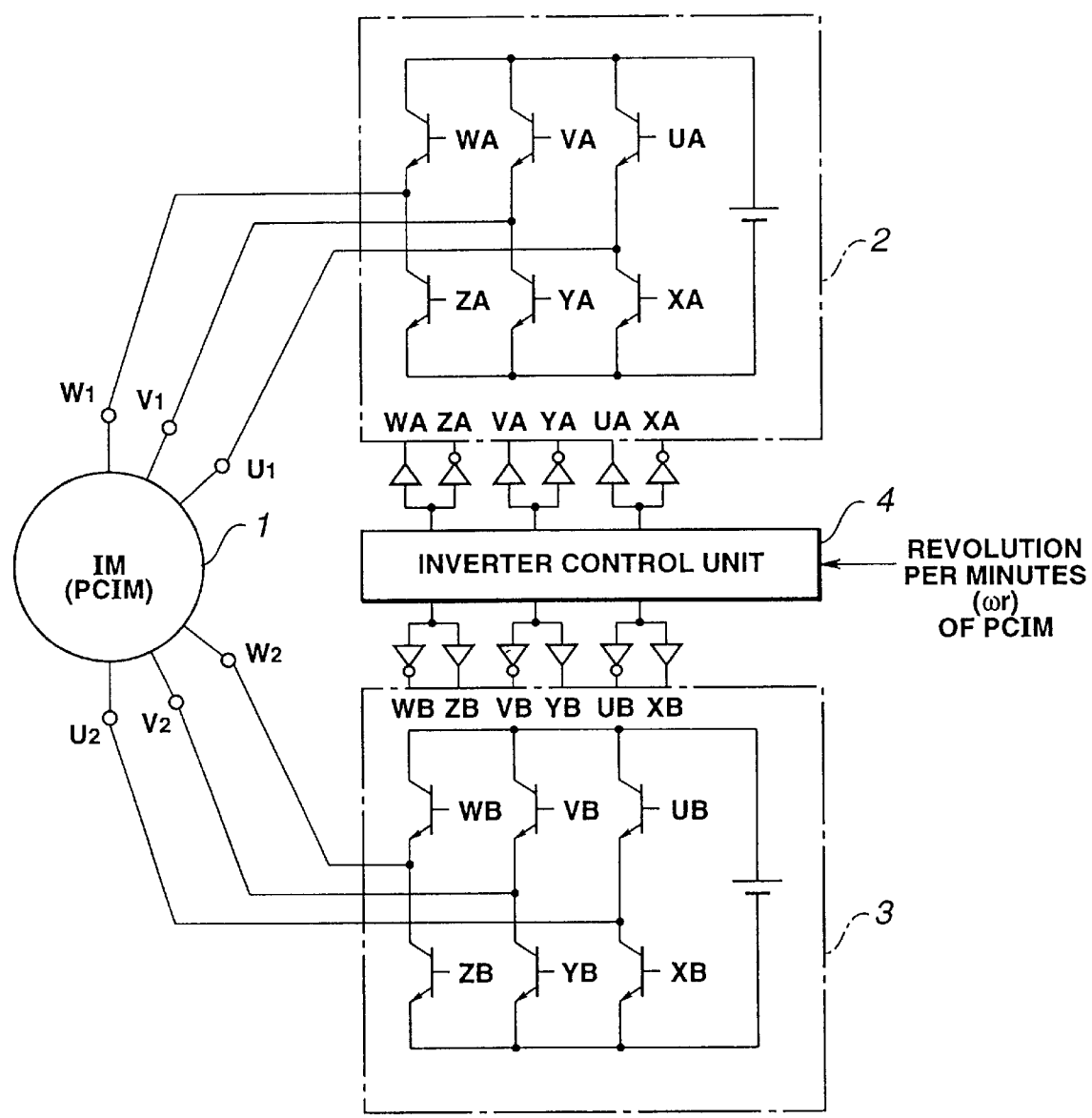
FIG. 9 is an explanatory view for explaining connections between inverters and an inverter control unit in the case of the first embodiment shown in FIG. 6.

FIG. 9 shows internal configurations of the two inverters 2 and 3 and inverter control unit 4 used in the first embodiment shown in FIG. 6.

Each of both inverters 2 and 3 is constituted by a voltage type or current type three-phase inverter main circuit. The control unit 4 for each inverter 2 and 3 generates gate signals for respective transistors (switching elements) of the three-phase inverters 2 and 3 as denoted by WA, VA, UA, WB, UA, and VA shown in FIG. 9.

The generation of the gate signals from the inverter control unit 4 is controlled so as to provide the output phase voltages for the six lead terminals in accordance with Table 2.

It is noted that U1, V1, W1, U2, V2, and W2 denote line voltages at the respective winding lead terminals shown in FIG. 9 and PRE denotes the rotation speed (frequency) at which the number of the poles is changed.

In Table 2, the peak value correction functions K1 (t) and K2 (t) are adjusted in a range from zero to one in accordance with a lapse of time t during the driving range switching (high frequency range above af and low speed range below af) of the pole change induction motor 1. Thus, the gate control signals are generated from the inverter control unit 4 such that the peak value correction function K1 (t) for a first term of each equation of Table 2 is 1 and the peak value correction function K2 (t) for a second term of each equation of Table 2 is zero. The peak value correction functions K1 (t) and K2 (t) are used to suppress a transient phenomenon such as a torque variation at minimum in a case where the phase and frequency of each inverter 2 and 3 are changed and may be replaced with other functions as will be described later.

During the switching into the high speed driving range, the function K1 (t) is adjusted from one to zero during the time duration T and the function K2 (t) is adjusted from zero to one. According to this adjustment, a component in the first term of each equation in Table 2 is gradually reduced and the component in the second term of each equation of Table 2 is gradually increased. Thus, at the lapse of time of T, each equation of Table 2 indicates only the component of the second term.

On the contrary, during the switching from the high speed driving range to the low speed driving range, the function K1 (t) is adjusted to be increased from zero to one and the function K2 (t) is adjusted to be decreased from one to zero so that each equation of Table 2 indicates only the component of the first term.

As appreciated from each equation recited in Table 2, the angular velocities of the voltages are different between the first terms and second terms of the respective equations in Table 2. Thus, in order to avoid mutual interferences of the angular velocities, the output torque generated in the induction motor 1 is a sum of the torque generated from the first terms of the respective equations U1 through W2 of Table 2 and that generated from the second terms of the respective equations U1 through W2 of Table 2. Thus, since the torque generated at the pole change induction motor (PCIM) is proportional to a square of the voltage, the sum of the generated torque corresponding to the first terms of the respective equations and that corresponding to the second terms of the respective equations is always constant during the switching of the speed range. In other words, during the switching, no variation of the generated torque in the induction motor 1 occurs during the switching of the speed range and the shock due to the change in the output torque can be eliminated.

Hence, since the inverter control unit 4 includes the gate control signal generator having a function generator which generates the equations recited in Table 2 so as to generate the gate control signals to the respective gate ends of the transistor main circuits in the respective inverters 2 and 3, only the amplitude correction functions K1 (t) and K2 (t) are controlled during the switching of the driving range. Then, the switching of the driving range can smoothly be carried out.

The type of the respective inverters 2 and 3 is not limited only to the voltage type but also may be limited to the current type.

It is noted that the switching in the driving range between the high speed range and the low speed range means the change in the number of poles between an n number of poles and a 2n number of poles (n=2 in the first embodiment).

Alternatively, the generation of the gate control signals in the inverter control unit 4 may be controlled so as to provide the output phase voltages (currents) for the six leading terminals U1 through W2 in accordance with Table 3.

In each equation recited in the above-described Table 3, since times of T1 and T2 are values equal to or above motor secondary time constants during the low speed driving and during the high speed driving, the transient phenomenon in a case where the output phases and frequencies of the respective inverters 2 and 3 are switched to change the number of the poles in the pole change induction motor PCIM 1 can be suppressed at minimum.

Second Embodiment

Figure 10:
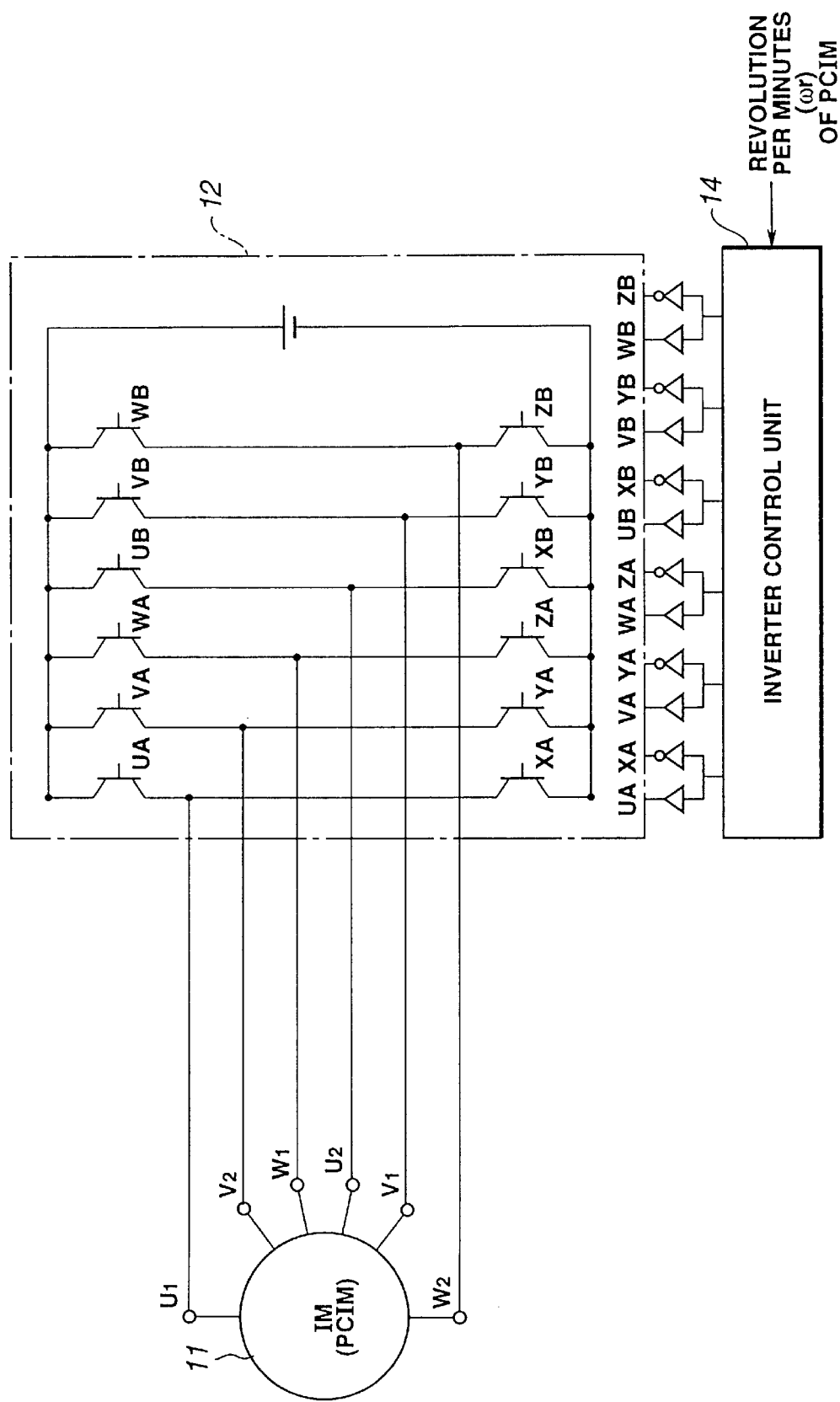
FIG. 10 is a schematic connection diagram of the control apparatus for the pole change induction motor in a case of a second preferred embodiment according to the present invention.

FIG. 10 shows a second preferred embodiment of the pole change induction motor and control apparatus therefor according to the present invention.

The pole change induction motor 11 in the second embodiment is provided with 6-phase stator windings, six lead terminals U1, V1, W1, U2, V2, and W2 being drawn from the respective phase windings. Then, the induction motor 11 shown in FIG. 10 is connected to and driven by a single six-phase inverter 12, the output frequencies and output voltages (currents) of the inverter 12 being controlled by means of the inverter control unit 14.

The control content of the inverter control unit 14 is as follows:

When driving the induction motor 11 at the constant torque range, at the constant output range, and at the frequency (revolution speed) up to the frequency denoted by af (a means any arbitrary integer equal to one or more and f means the frequency at the base speed, the base speed being defined as a rated synchronous speed (the synchronous speed equals 120 times the value of line frequency, divided by the number of poles and the base speed is expressed usually in revolutions per minute (r/min), but any consistent set of units may be used), each phase of each of the six output phases U1, V2, W1, U2, V1, and W2 is shifted by 2 $\pi/3$ in this sequence.

When driving the induction motor 11 at the high frequency range exceeding the frequency af, each phase of each of the six phases of U1, V2, W1, U2, V1, and W2 is shifted in this sequence by $\pi/3$ and the output frequency from the inverter 12 is halved (as appreciated from Table 4 or Table 5). Such a control procedure as described above permits the number of poles in the induction motor 11 to equivalently be changed at the ratio of 1 versus 2.

The generation of the gate signals in the inverter control unit 14 is carried out to provide each phase output for the corresponding one of six lead terminals of the induction motor PCIM 11 in accordance with either of two of Tables 4 or 5.

The amplitude (peak value) correction functions K1 (t) and K2 (t) are adjusted in the range from one to zero as the time t has passed during the change in the driving range (number of the poles) of the pole change induction motor 11. Hence, in the low speed driving range, the inverter control unit 14 generates the gate control signals so that the amplitude (peak value) correction function K1 (t) of each first term of the respective equations in Tables 4 and 5 is adjusted to indicate one and the amplitude (peak value) correction function K2 (t) of each second term of the respective equations in Tables 4 and 5 is adjusted to indicate zero.

Thereafter, during the switching from the low speed driving range to the high speed driving range, the amplitude correction function K1 (t) is adjusted from one to zero during the time t and the amplitude correction function K2 (t) is adjusted from zero to one during the time T2.

This adjustment causes a gradual reduction of the component of each first term of the respective equations in Table 4 and Table 5 and a gradual increase of the component of each second term of the respective equations in Table 4 and Table 5. After the lapse of time T2, each equation of Table 4 or Table 5 results in only the component of each second term.

On the contrary, during the driving range switching from the high speed driving range to the low speed driving range, the correction function of K1 (t) is adjusted to be increased from zero to one and the correction function of K2 (t) is reduced from one to zero so that each equation of Table 4 or Table 5 results in the component of each first term.

It is noted that, during the switching in the driving range between the high speed driving ranges and low speed driving range, the angular velocities of the first term and second term of each equation in Table 4 and Table 5 are different from each other. Thus, the mutual interferences due to the difference in the angular velocity are required to be avoided so that the torque generated in the induction motor 11 is the sum of the torque generated from the first term of each equation of Table 4 or Table 5 and that generated from the second term of each equation of Table 4 or 5. Since the torque generated in the induction motor 11 is proportional to the square of the voltage applied thereto, the sum of the torques generated from the first term and from the second term is always constant. In other words, during the switching of the driving range, no variation in the generated torque occurs and no shock due to the change in the torque occurs during the driving range switching.

Hence, as described in the first embodiment, the gate control signal generator provided in the inverter control unit 14 includes the function generators according to each equation of Table 4 or Table 5 and includes the gate control signal generators which serve to control only the peak value (amplitude) correction functions K1(t) and K2(t).

The six-phase inverter 12 shown in FIG. 10 is of the voltage type. Alternatively, the inverter may be of the current type.

Although, in the inverter control unit. 4 shown in FIG. 9 or inverter control unit 14 shown in FIG. 10, the revolution speed (frequency) of the motor at which the driving range is switched from the low speed driving to the high speed driving during the acceleration of the motor is the same as that af at which the driving range is switched from the high speed driving to the low speed driving. However, the rotation speed (frequency) of the motor at which the driving range is switched from the high speed driving to the low speed driving may be shifted from the frequency at which the driving range is switched from the low speed driving to the high speed driving so as to provide a window having the different threshold values. This will be described later. It is noted that if the same frequency is taken for the driving range switching and if the motor is driven in a range placed in the vicinity to the same (single) frequency af (PRE in Tables of 2, 3, 4, 5), a chattering of the torque would be generated and the speed control for the motor becomes unstable. Therefore, a stable driving can be assured when the frequency at which the driving range is switched is provided with the window. This is appreciated from FIG. 27 or FIG. 34 which will be explained later.

Next, the six-phase stator winding methods for the pole induction motor 1 (11) in the case of the first and second embodiments will be described below.

As described in the case of the first and second embodiments, six stator winding lead terminals output from the induction motor 1 (11) are needed even if the induction motor is three-phase type or six-phase type and six windings are needed accordingly.

Figure 11A:
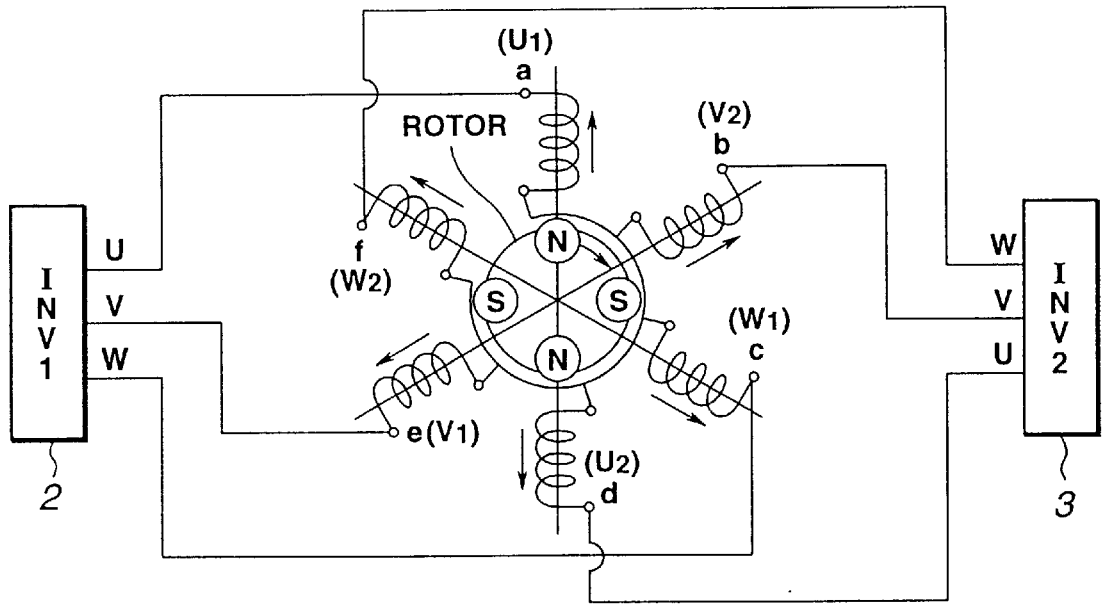
FIGS. 11A and 11AA are explanatory views for explaining a theory of a pole number change state in the pole change induction motor during a low speed driving range in the first embodiment shown in FIG. 6.
Figure 11A:
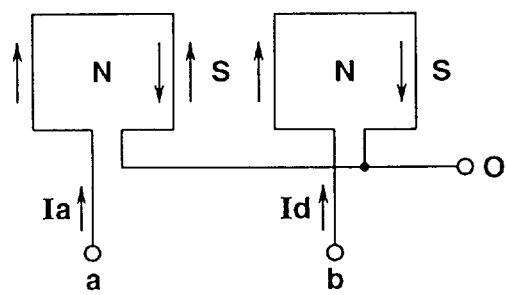

In details, as shown in a theory of operation of FIGS. 11A and 11AA, six stator windings are arranged sequentially as denoted by U1 (a) phase, V2 (b) phase, W1 (c) phase, U2 (d) phase, V1 (e) phase, and W2 (f) phase along the rotation direction of a rotor of the pole change induction motor.

In the case of the low speed driving range at the constant output driving mode, as shown in FIG. 11A, the three of the six-phase stator windings of U1 phase, V1 phase, and W1 phase are respectively connected to the three output phase terminals (U, V, W) of the first inverter 2 and the remaining three windings of U2, V2, and W2 are connected to the phase terminals (U, V, W) of the second inverter 3. In this case, each phase winding of u1 phase, V1 phase, W1 phase, U2 phase, V2 phase, and W2 phase is formed of a single-layer concentric winding or two-layer (double-layer) lap winding. A first group of the three phase windings of U1, V1 and W1 phases and a second group of windings of U2, V2, and W2 are independently interconnected in Δ (delta) connections or Y (star) connections, respectively. As shown in FIG. 11AA, when an a (U1) phase current Ia and d (U2) phase current flows in the direction denoted by solid lines to a neutral line O, the stator windings provide N, S, N, S poles, namely, four poles (2n).

Figure 11B:
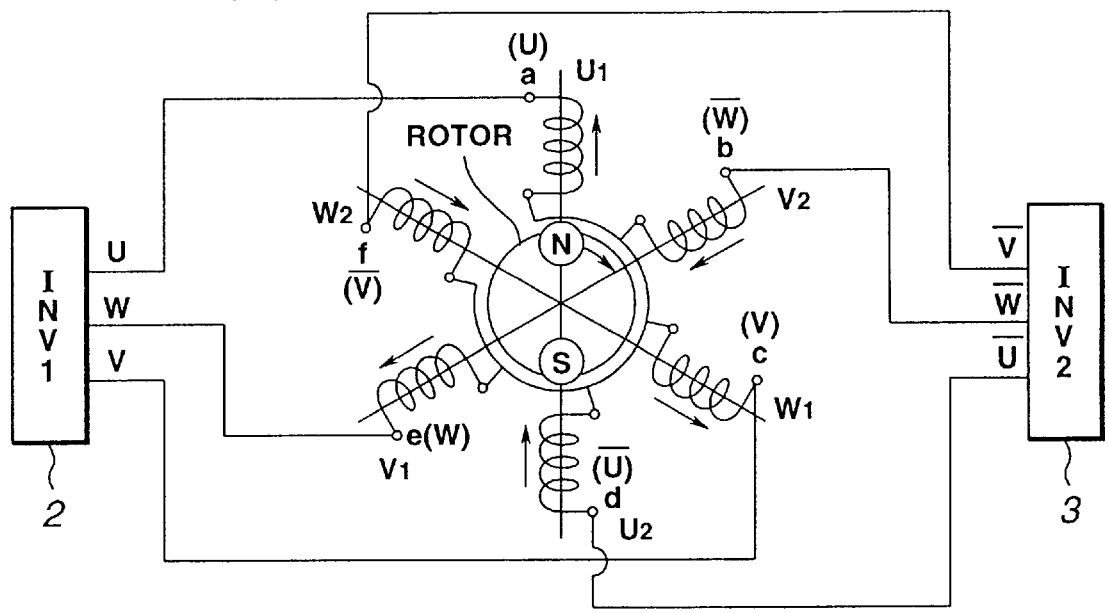
FIGS. 11B and 11BB are explanatory views for explaining the theory of a pole number change state in the pole change induction motor during a high speed driving range in the first embodiment shown in FIG. 6.
Figure 11B:
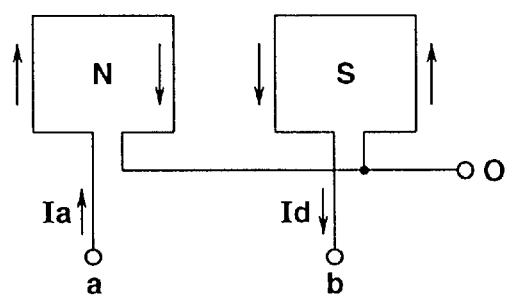

On the other hand, in the high-speed driving range exceeding REF (af) of the constant output driving, as shown in FIG. 11B, the three windings of U1 phase, V1 phase, W1 phase are connected to the output phase terminals of U, V, and W in the first inverter 2 and the three windings of U2, V2, and W2 are connected to output phase terminals indicating –U, –W, and –V of the second inverter 3. It is noted that a sign of – means 180° inversion and is equal to a bar on each phase U, V, and W shown in FIG. 11B. However, these connection are carried out electrically not mechanically as appreciated from Tables 2 through 5. That is to say, the inverters 2 and 3 outputs the voltages having the value of –U, –V, and –W so as to electrically connect the output terminals thereof to the corresponding windings, namely, U1→U of the first inverter 2, V1→V of the first inverter 2, W1→W of the first inverter 2, –U2→–U of the second inverter 3, –V2→–V terminal of the second inverter 3, and –W2→–W of the second inverter 3.

As shown in FIG. 11BB, the direction of the Id current is reversed so that the number of the poles is set to two poles.

In the way described with reference to FIGS. 11A and 11B, electrical phase shifts and phase order shifts by means of the respective inverters 2 and 3 in the case of the first embodiment permit the number of poles in the induction motor to be changed between the four poles and the two poles.

In FIGS. 11AA and 11BB, O denotes the neutral line (point) connecting the six-phase windings.

As described above with reference to FIGS. 11A, 11AA, 11B, and 11BB, the three-phase windings are independently arranged into two of the first group and second group (this equivalently means the six-phase winding), the voltage signal or current signal applied to each group is varied at the halved frequency in accordance with each equation shown in Table 2, 3, 4, or 5. The change in the number of poles can smoothly be carried out without a shock due to the variation of the output torque.

FIGS. 12 and 13 show examples of the single-layer concentric windings (inverted Y-Y connection and inverted Δ-Δ connection) applicable to the windings of the stator in the pole change induction motor 1 (11) in the case of the first and second embodiments shown in FIGS. 9 and 10. However, the connection form shown in FIGS. 12 and 13 are applicable to all of preferred embodiments of the control apparatus for the pole change induction motor (four-to-two pole change induction motor) according to the present invention.

In FIGS. 12 and 13, the number of slots in the stator of the induction motor are 36 and the change in the number of poles are from four poles and two poles and vise versa.

In FIG. 12, the first group of the U1 phase, the V1 phase, and the W1 phase is connected together in the Y (star) connection form having a first neutral point $O_1$ and the second group of the U2 phase, the V2 phase, and the W2 phase is connected together in the Y connection form having a second neutral point $O_2$.

In FIG. 13, the first group and second group are connected together in the inverted Δ and Δ connection forms, respectively.

Figure 14:
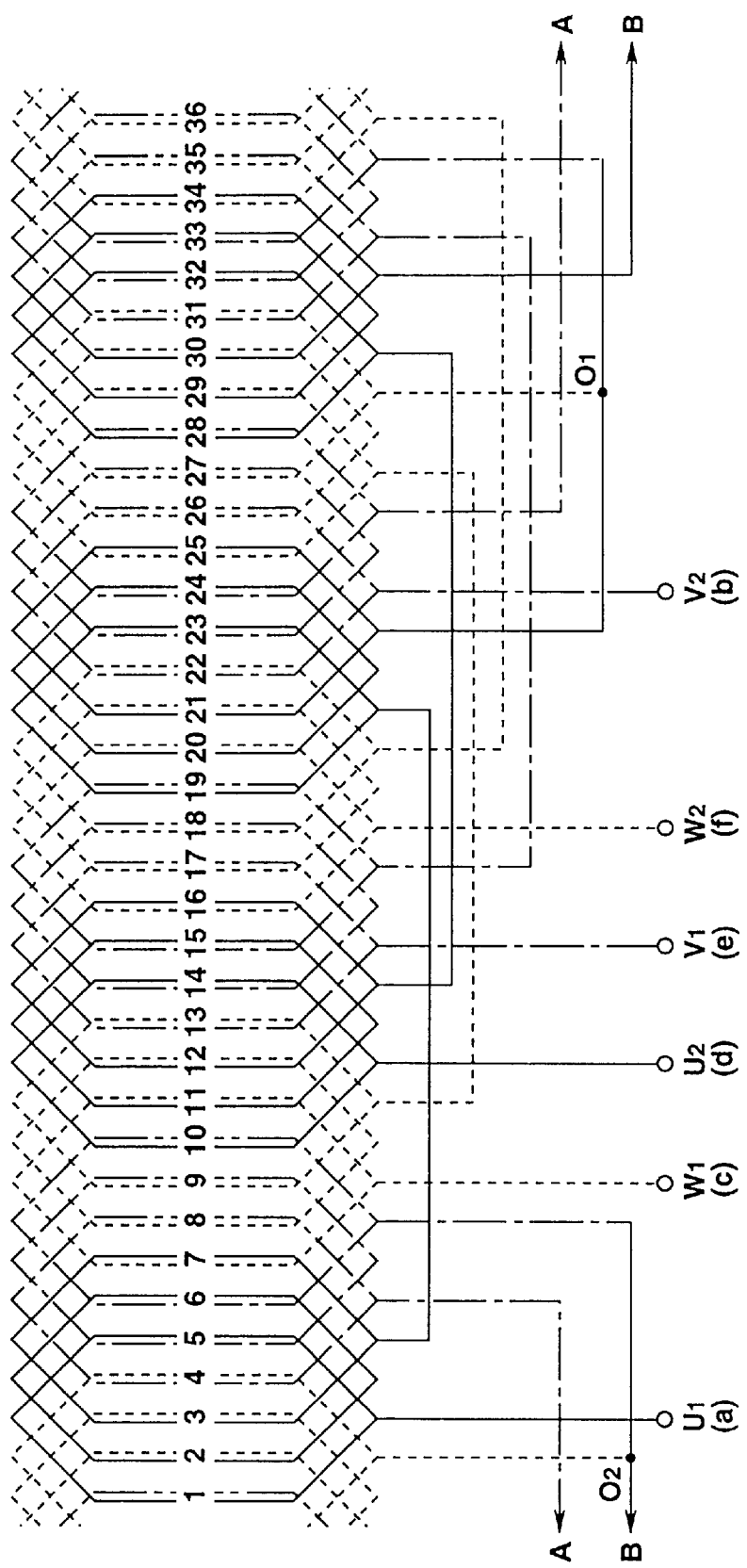

FIG. 14 shows an example of the double-layer lap winding type stator of the pole change (eight-to-four poles) induction motor. The control for the eight-to-four pole change induction motor will be described later.

In FIG. 14, the windings are connected in the Y connection form. In the example shown in FIG. 14, the number of slots in the stator of the motor are 36. The number of windings are twice those shown in FIG. 12 since the windings are double layers. The change in the number of poles is carried out from four poles to eight poles and vice versa in the case of FIG. 14.

In this case, the windings having the same polarity for each phase are connected in series with each other so as to form one group of the windings when viewed as the windings in the mode of the high speed driving range in order to divide the windings into two phases and the windings present at the phase of 2/3 π in terms of the electrical angle ((the number of poles)/2×mechanical angle) are collected so as to form one group winding, thus two groups of the three phase stator windings being formed.

Figure 15:
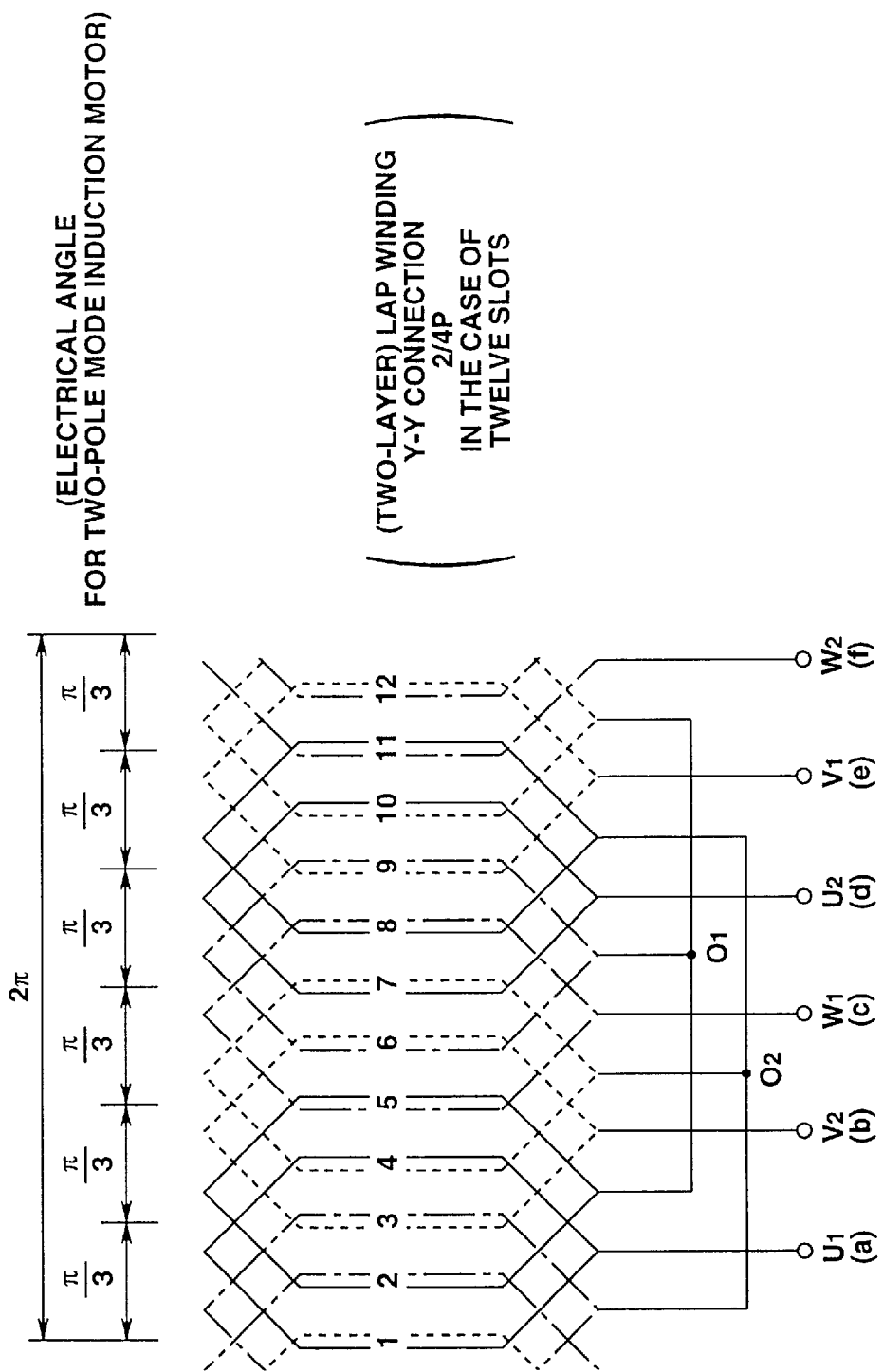

Furthermore, FIG. 15 shows another example of the double-layer lap winding connection in which the change of the number of poles is carried out between two poles and four poles. In FIG. 15, the number of slots is 12 and the electrical angle is π/3 in the connection forms of Y-Y.

Although the single-layer concentric and double-layer lap windings are exemplified by FIGS. 12 through 15, the established conditions of the windings in the stator of the induction motor capable of changing the number of poles are as follows:

(A) A winding pitch of each stator winding is approximately half a magnetic polarity pitch in the high speed driving range. In this case, the winding is of a full-pitch winding for the magnetic polarity pitch in the low speed driving range, an image pole is produced in the low speed driving range.

(B) In the motor capable of changing the number of poles equal to two poles/four poles or more (four poles/eight poles or more), the number of windings per phase is two or more. In this case, as viewed from the electrical angle in the high speed driving range, the winding having the same phase is one phase by connecting the windings in series with each other or in parallel.

(C) The three phases of windings placed 2/3 π electrical angle interval are grouped into the first group and the remaining three phases are grouped into the second group to form the two groups. These two groups of the first group and second group are both in the Y connection forms and Δ connection forms.

(D) For the phase sequence (phase rotation), when a first group is set as U1, V1, and W1, the two groups of windings are set as U2 which are placed at π electrical angle and the remaining windings are set as V2 and W2 in same direction as the first group.

Third Embodiment

Before explaining a third embodiment of the pole change induction motor and control apparatus and method for (speed) controlling the pole change induction motor according to the present invention, a basic driving method of the pole change induction motor with the change in the number of poles which is a basic concept establishing the present invention will be described below.

This basic concept has been described in a Japanese Paper "Analysis of a change in number of poles in a pole change induction motor applicable for an electric vehicle by means of a six-phase absolute transformation rotating d-g axes" authored by Mizuno et al., published at a seminar of a rotary machinery of an electric academic society on Oct. 3, 1994. In the Japanese Paper identified above, the inverter serves to control the phases and frequencies of the phase voltages (currents) to be applied to the stator windings of the pole induction motor so that the shock-free electrical change (switching) in the number of the poles in the pole change induction motor can be made without provision of a mechanical switch and with a transient phenomenon during the change in the number of poles suppressed.

Figure 4:
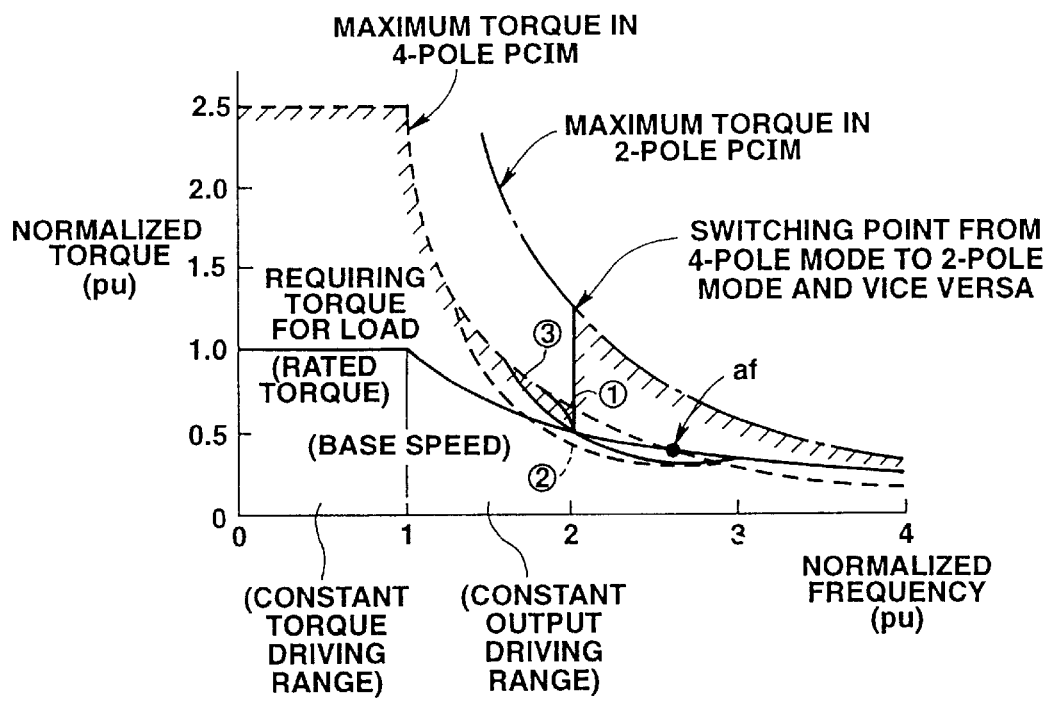
FIG. 4 is a characteristic graph representing maximum torque characteristics when the number of poles in a pole change induction motor used in a control apparatus for a pole change induction motor is changed from four poles to two poles and vice versa.

The maximum torque (Tm) is approximately doubled when the induction motor is driven with the change in the number of poles from four poles to two poles under the same voltages and the same frequencies, as shown in FIG. 4. In addition, a wide range of the constant output driving can be achieved for the load (required) torque and when the motor has rotated at the same revolution speed, the phase frequency to be applied to the motor is halved.

For the change in the number of poles from the four poles to the two poles, two kinds of orthogonal two axes (d1-q1 axes and d2-q2 axes) are considered rotating in synchronization with the rotating magnetic: fields during states of the respective pole numbers, as a six-phase pole change induction motor.

Figure 5:
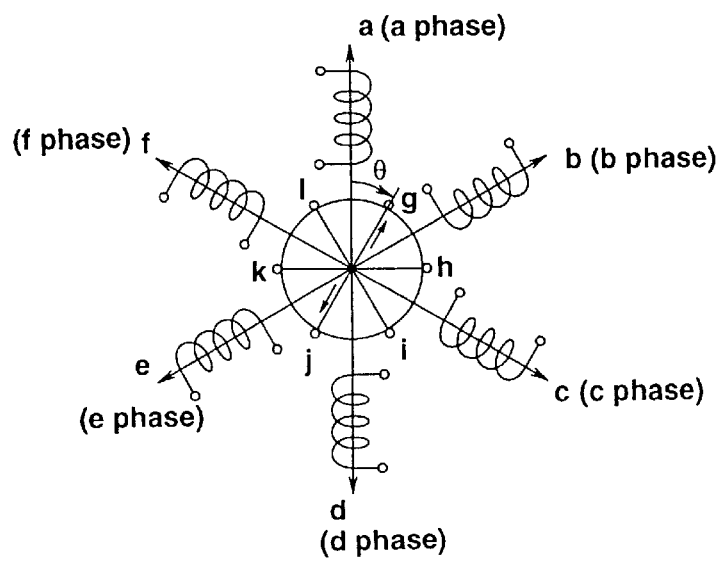
FIG. 5 is a schematic view for explaining a six-phase stator winding in the pole change induction motor (PCIM) used in the control apparatus according to the present invention.

FIG. 5 shows a winding arrangement model of the pole change motor having the six-phase windings applicable to the third embodiment.

In order to change the number of poles in the six-phase windings into two poles in the pole change induction motor shown in FIG. 5, the following six-phase voltages are applied to the respective terminals of the six-phase windings:

$$
\begin{aligned}
Va1 &= V1m \cdot \cos(\omega 1\, t + \phi 1), \\
Vb1 &= V1m \cdot \cos(\omega 1\, t + \phi 1 - \pi/3), \\
Vc1 &= V1m \cdot \cos(\omega 1\, t + \phi 1 - 2\pi/3), \\
Vd1 &= V1m \cdot \cos(\omega 1\, t + \phi 1 - 3\pi/3), \\
Ve1 &= V1m \cdot \cos(\omega 1\, t + \phi 1 - 4\pi/3), \\
Vf1 &= V1m \cdot \cos(\omega 1\, t + \phi 1 - 5\pi/3).
\end{aligned}
$$
— (1).

In the equations of (1), V1$m$ denotes a phase voltage maximum value during the two-pole driving, ω1 denotes an angular frequency during the two-pole driving, φ1 denotes a phase angle during the two-pole driving.

In order to change the number of poles in the six-phase windings into four poles in the motor 50 shown in FIG. 5 (shown in FIG. 16), the following six-phase voltages are applied to the respective lead terminals of the six-phase windings.

$$
\begin{aligned}
Va2 &= V2m \cdot \cos(\omega 2\, t + \phi 2), \\
Vb2 &= V2m \cdot \cos(\omega 2\, t + \phi 2 - 2\pi/3), \\
Vc2 &= V2m \cdot \cos(\omega 2\, t + \phi 2 - 4\pi/3), \\
Vd2 &= V2m \cdot \cos(\omega 2\, t + \phi 2) \\
Ve2 &= V2m \cdot \cos(\omega 2\, t + \phi 2 - 2\pi/3), \\
Vf2 &= V2m \cdot \cos(\omega 2\, t + \phi 2 - 4\pi/3).
\end{aligned}
$$
— (2).

In the equation (2), V2$m$ denotes the phase voltage maximum value during the four-pole driving, ω2 denotes the angular frequency, and φ2 denotes the phase angle during the four-pole driving.

Two-pole rotating coordinate axes (d1-q1 axes) in the six-phase windings shown in FIG. 5 and four-pole rotating coordinate axes (d2-q2 axes) are prepared for the six-phase windings shown in FIG. 5. The coordinate systems by means of the d-q axes are considered and as the result of the consideration, the voltage equations shown in Table 6 and Table 7 are derived.

In the equations shown in Table 6 and Table 7, each subscript 1 denotes in the case of the two-pole state induction motor 50, each subscript 2 denotes in the case of the four-pole state induction motor, each subscript s denotes the d-q axes on the stator windings, and each subscript r denotes the d-q axes on rotor windings of the pole change induction motor 50.

In Table 6, in constants in the case of the two-pole state induction motor 50, Rs denotes the primary resistance, Ls1 denotes a primary self inductance during the two pole state, Msr1 denotes a mutual inductance between the stator (primary) side and the rotor (secondary) side during the four pole state, Rr1 denotes the secondary resistance during the two pole state, Lr1 denote the secondary self resistance during the two pole state, and Rm1 denotes an iron loss resistance during the two pole state.

In Table 7, in constants in the case of the four-pole induction motor, Rs denotes the primary resistance, Ls2 denotes the primary self inductance during the four pole state, Msr2 denotes a mutual inductance during the four pole state, Rr2 denotes the secondary resistance during the four pole state, Lr2 denotes the secondary self resistance during the four pole state, and Rm2 denotes the iron resistance during the four pole state.

Suppose that a vector control for the two-pole induction motor is carried out in the equations of armature winding voltages Vds1 and Vqs1 of Table 6.

In this case, the followings are established:

$$Idr1=0 \text{ and } Iqr1=(-Msr1/Lr1)\cdot Iqs1.$$

Furthermore, in the case of the third embodiment according to the present invention, since the iron loss Rm1=Rm2=0, the above-described armature (primary) winding axes voltages Vds1 and Vqs1 are established as follows:

$$Vds1 = Rs\cdot Ids1 - \omega 1\cdot Ls1\cdot Iqs1 + \omega 1\cdot Msr1\cdot (Msr1/Lr1)\cdot Iqs1, \quad (3)$$

$$Vqs1 = Rs\cdot Iqs1 + \omega 1\cdot Ls1\cdot Ids1.$$

In the equations of (3), if $(Ls1\cdot Lr1-Msr1^2)/Lr1 = L\sigma 1$, the equations of (3) can be expressed as shown in the following equations Vds1 and Vqs1 (armature side). Therefore, in the vector control for the d-q axes coordinate system, the armature voltage may be controlled as follows:

$$Vds1^* = Rs\cdot Ids1^* - \omega 1\cdot L\sigma 1 Iqs1^*,$$

and $$Vqs1^* = Rs\cdot Iqs1^* + \omega 1 Ls1 Lds1^* \quad (4).$$

In the case of the four-pole induction motor (namely, in pole change motor in the four-pole mode), the following armature voltage in the d-q axes is derived:

$$Vds2^* = Rs Ids2^* - \omega 2\cdot L\sigma 2 Iqs2^*,$$

$$Vqs2^* = Rs Iqs2^* - \omega 2 L\sigma 2 Ids2^* \quad (5).$$

In the equation (5), Lσ2 (equivalent leakage inductance)= $(Ls2Lr2-(Msr2)^2)/Lr2$.

In this way, six-phase inverter and six-phase induction motor are installed in the case of the mutual change between the two and four poles, the voltage equations in the d-q axes (rotating coordinate axes in the two poles and four poles are independently established according to the equations of (4) and (5), respectively, and the vector control for the six-phase induction motor can be carried out.

The third embodiment which will be described below specifically achieves the vector control for the pole change induction motor (50) on the basis of the vector control established using the above-described equations.

Figure 16:
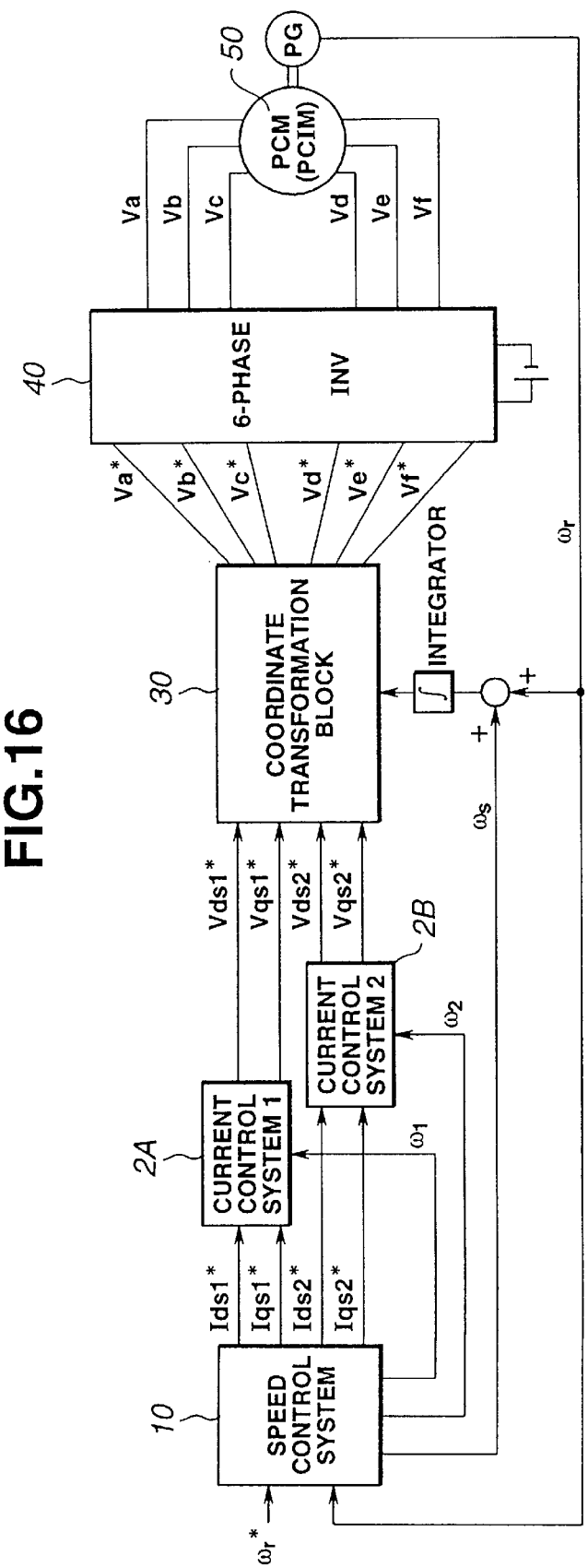
FIGS. 16 and 17 are circuit block diagrams of the control apparatus for the induction motor in a third preferred embodiment according to the present invention.
Figure 17:
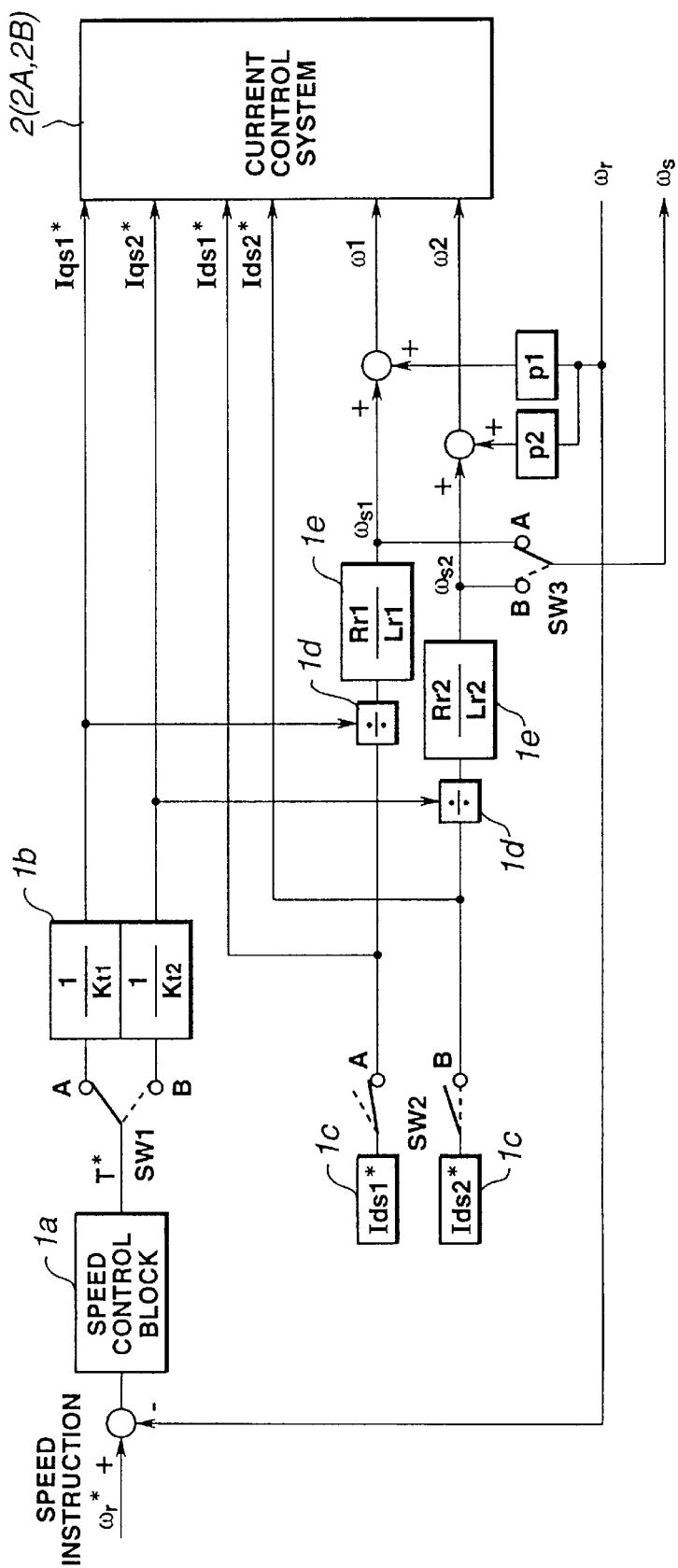

FIG. 16 and FIG. 17 show the control apparatus for the induction motor in the case of the third embodiment which specifically achieves the above-described basic concept of the vector control.

FIG. 16 is a simplified circuit block diagram of the control apparatus in the fourth embodiment according to the present invention.

FIG. 17 is a schematic circuit block diagram of a speed control system in the induction motor control apparatus shown in FIG. 16.

In FIG. 16, PCM denoted by reference numeral 50 is an abbreviation for Pole Change Motor (PCIM), namely, the induction motor which is capable of changing its number of poles between two and four poles and PG denotes a pulse generator which generates a pulse train having an actual velocity ωr of the PCM (PCIM) 50.

In FIG. 16, a speed control system denoted by reference numeral 10 receives a speed instruction ωr* and actual velocity ωr and outputs two-pole driving output parameters Ids1, Irs1, ω1, the four-pole driving output parameters Ids2, Iqs2 and ω2, and a slip frequency ωs.

The detailed function of the speed control system 10 is shown in FIG. 17.

That is to say, a difference (deviation) between the speed instruction ωr* and actual velocity ωr is derived by a summer and a torque instruction T* is given at a speed control section 1a according to the difference between the speed instruction value ωr* and the actual velocity ωr. Next, a (drive) switch SW1 performs the switching between two poles and four poles according to a two pole/four pole switching instruction based on the actual velocity (frequency or rotation speed) ωr as appreciated from FIG. 27 which will be described later. Each of two coefficient function generators 1b multiply the torque instruction T* by either of two constants 1/Kt1 (two poles) or 1/Kt2 (four poles) to derive q-axis current instructions Iqs1* (two poles) and Iqs2* (four poles), respectively.

In addition, axis current instruction generators 1c output exciting current instructions Ids1* and Ids2* via associated switches SW2 which is driven according to the two pole/four pole switching instruction. It is noted that the subscript 1 denotes the case of the two poles, subscript 2 denotes the case of the four poles, subscript s denotes the primary (stator) side.

Furthermore, the q-axis current instructions Iqs1* and Iqs2* are divided by either of two dividers 1d and multiplied by Rr1/Lr1 (two poles) and by Rr2/Lr2 (four poles) by means of coefficient function generators 1e, respectively, to derive the slip frequencies ωs1 and ωs2 during the two pole state and during the four pole state. Thus, a switch SW3 serves to derive the slip frequency ωs of the motor PCM (PCIM) 50 in either of the two-pole drive mode or the four-pole mode.

In addition, electrical power supply angular frequencies ω1 and ω2 are derived with a number of pair of poles (p1 and p2) added to the slip frequencies ωs1 and ωs2.

Referring back to FIG. 16, a current control system having current control systems 1 and 2 (2A and 2B) is arranged at a subsequent stage of the speed control system 10. The current control systems 1 and 2 (2A and 2B) derive the d-q axes voltage instructions Vds1*, Vqs1*, Vds2*, and Vqs2* on the basis of the voltage matrices of Table 6 and Table 7. It is noted that the iron loss resistance Rm=0.

Next, a coordinate transformation block 30 derives the six-phase voltages Va*, Vb*, Vc*, Vd*, Ve*, and Vf* according to the mutually independent two-pole voltage instructions Vds1* and Vqs1* and four-pole voltage instructions Vds2* and Vqs2*.

Tables 8 and 9 show the six-phase voltage matrix equations in the case of the two-pole state induction motor 50 and four-pole state induction motor 50.

The coordinate transformation block 30 carries out the calculations using the equations recited in Tables 8 and 9 according to the changed number of poles, Tables being used to substitute the equations recited in (4) and (5).

In the way described above, the six-phase inverter 40 is controlled by means of the six-phase voltage instruction values Va* through Vf* (and Vg* through Vl*) so that the change in the number of poles from the four poles to the two poles or vice versa is carried out for the pole change induction motor 50.

Although the detailed explanation of the four-to-two and two-to-four pole changes has been made in the third embodiment, the control apparatus shown in FIGS. 16 and 17 are applicable to such a pole change induction motor having an arbitrary number of poles to be changed if the ratio of the number of the poles of 1:2 is satisfied. It is noted that the coordinate transformation block receives an electrical angular position signal θ3 (shown in FIG. 5) indicative of the angular position of the secondary flux via an integrator. This integrator is exemplified by the U.S. Pat. No. 5,136,228 (the disclosure of which is herein incorporated by reference).

Fourth Embodiment

Figure 18:
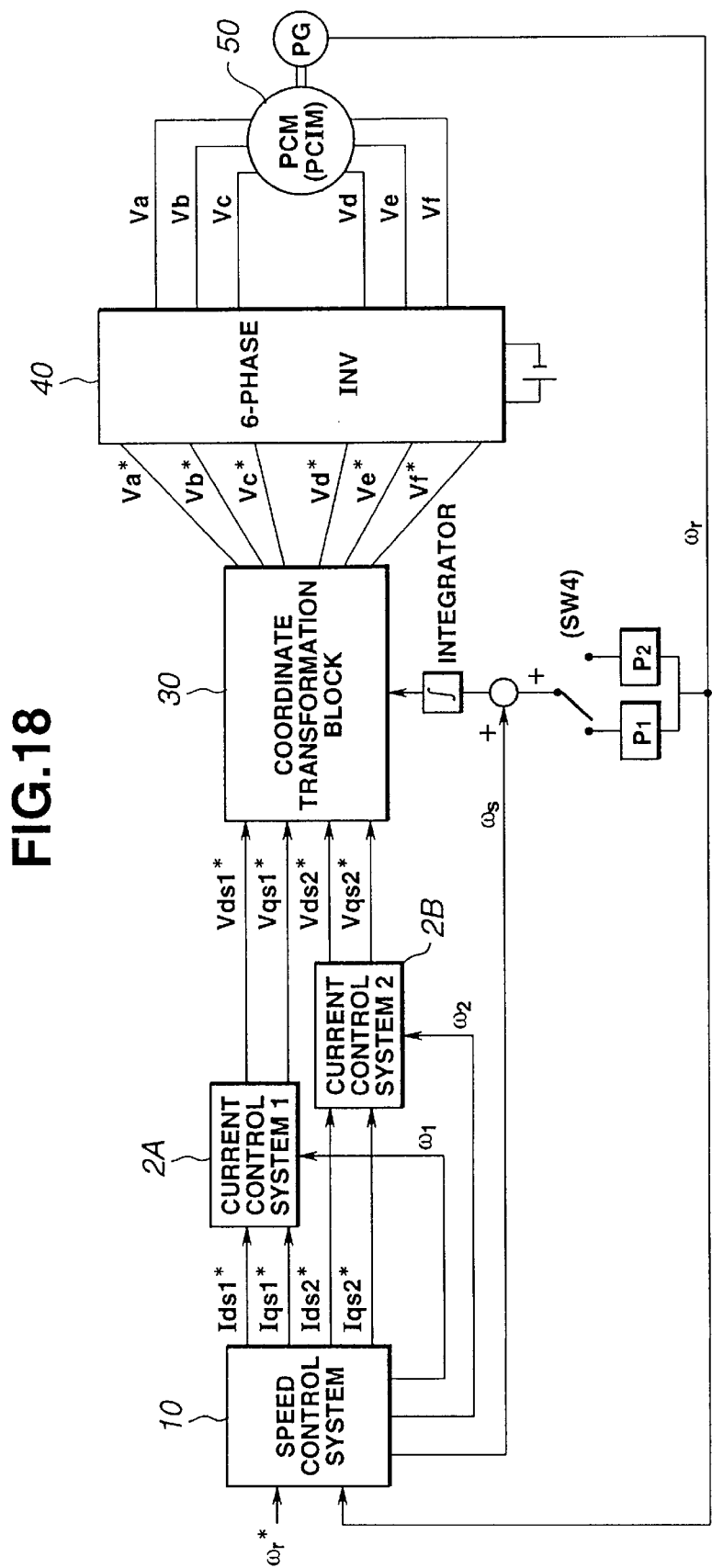
FIGS. 18 is a circuit block diagram of the control apparatus for the pole change induction motor in a fourth preferred embodiment according to the present invention.

FIG. 18 shows a fourth preferred embodiment of the control apparatus of the induction motor capable of changing the number of poles between four poles and two poles. Although the structure of the fourth embodiment is generally the same as that of the third embodiment shown in FIG. 16, the electrical angular position θ is derived via a switch (SW4) and the number of the pair of the poles (p1 or p2).

The structure of the speed control system 10 in the case of the fourth embodiment is the same as that shown in FIG. 17. Hence, the operation of the fourth embodiment is generally the same as that in the case of the third embodiment described above.

Fifth Embodiment

Figure 19:
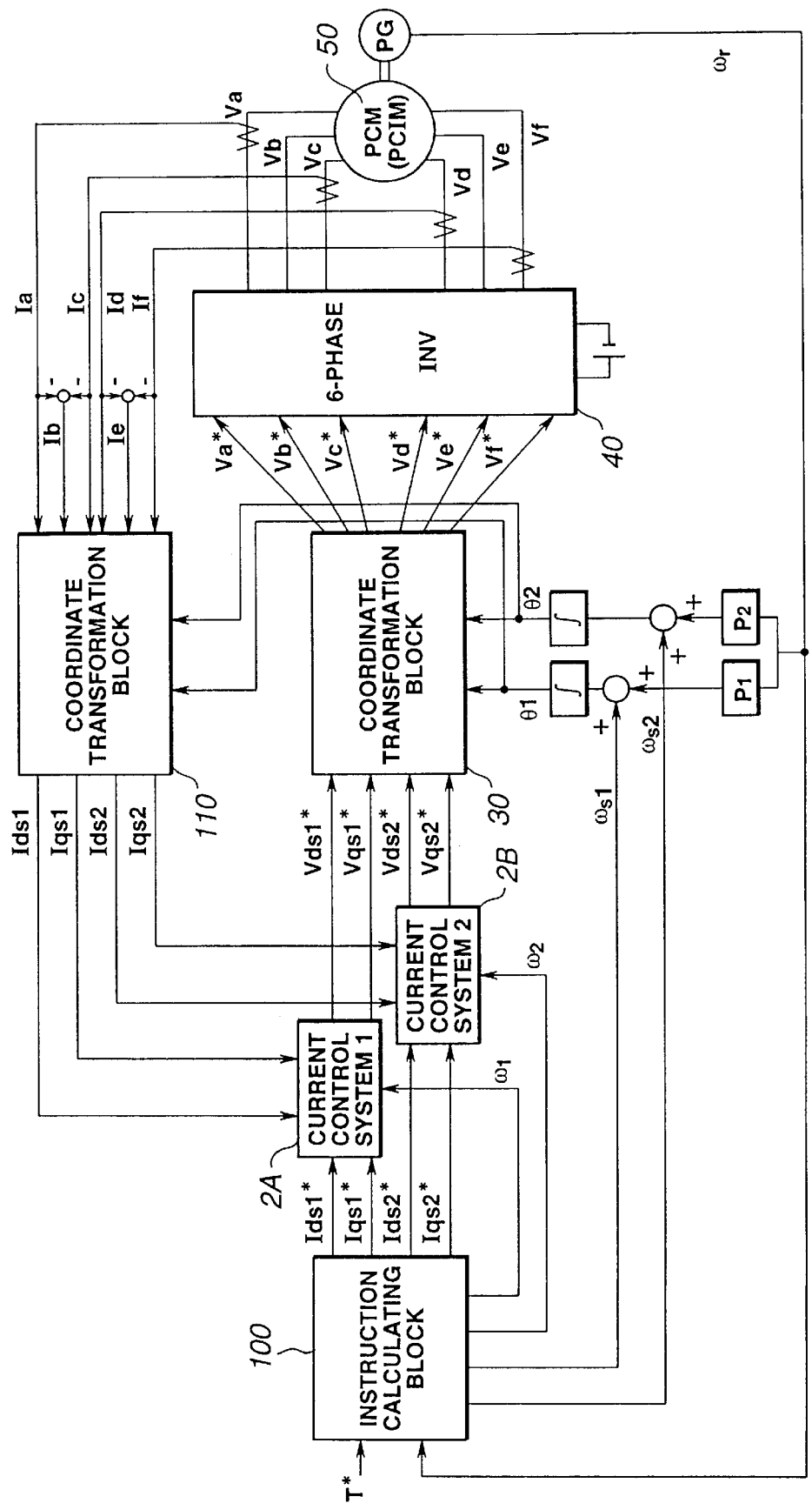
FIG. 19 is a circuit block diagram of the control apparatus for the pole change induction motor in a fifth preferred embodiment according to the present invention.

FIG. 19 shows a control block diagram of the control apparatus for the induction motor capable of changing the number of poles between four poles and eight poles in a case of a fifth preferred embodiment according to the present invention.

In the control apparatus in the case of the third and fourth embodiments, the speed control system 10 serves to control the exciting (d1 and d2 axes) and torque (q1 and q2 axes) current instructions independently so that the driving control can be achieved without the torque variation which would occur during the switching in the number of poles between four and two poles.

In the case of the fifth embodiment, the same driving control as described above can be applied to the control apparatus in the fifth embodiment (namely, the pole change induction motor capable of changing the number of the poles from eight poles to four poles and vice versa).

The current control systems 1 and 2 2A and 2B in the d-axis and q-axis are individually disposed in the same way as in the case of FIG. 18.

An instruction calculating block 100 is disposed before the stage of the current control systems 1 and 2 2A and 2B. It is noted that the current control systems 2A and 2B, the coordinate transformation block 30, and the six-phase inverter 4 are the generally same as those shown in FIG. 18. In the case of FIG. 19, another coordinate transformation block 110 is installed as a feedback system of the phase currents Ia through If derived from current detectors at the six leading terminals of the pole change induction motor 50. Each subscript 1 in the fifth embodiment denotes at four poles and 2 in this embodiment denotes at eight poles.

The instruction calculating block 100 receives a torque instruction value T* and the actual velocity of the pole change induction motor PCM (PCIM) 50 and outputs four-pole exciting and torque current instructions Ids1* and Iqs1* in the d-q axes and eight-pole exciting and torque current instructions Ids2* and Iqs2* in the d-q axes.

Figure 20:
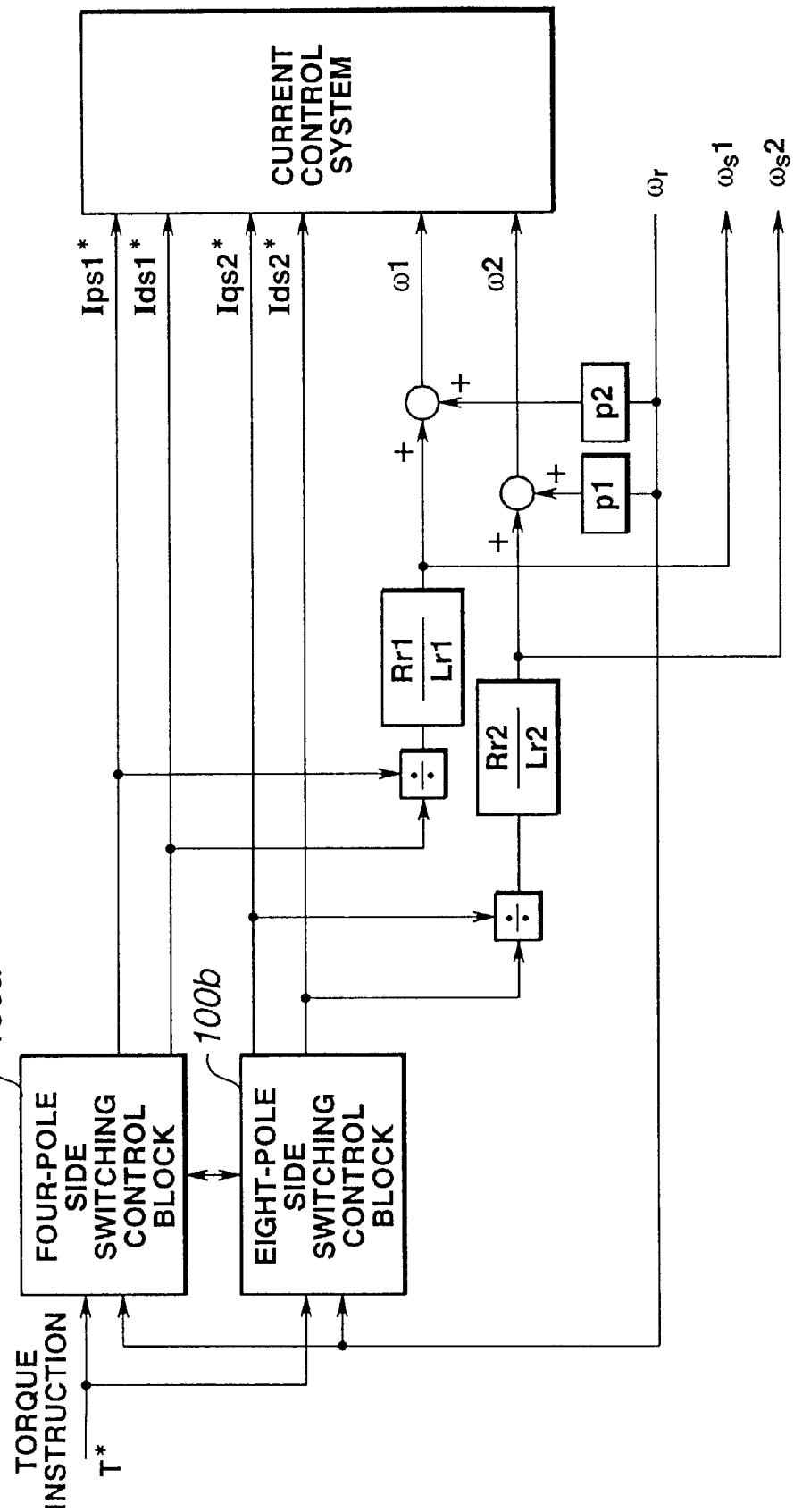
FIG. 20 is a circuit block diagram of an instruction calculating block shown in FIG. 19.

FIG. 20 shows a structure of the instruction calculating block 100 shown in FIG. 19.

As shown in FIG. 20, the instruction calculating block 100 is divided into four-pole switching control block 100a and eight-pole switching control block 100b.

The control blocks 100a and 100b controls so that a sum of the output torques in case of the four poles and in the case of eight poles is constant. This control procedure will be described. Motor constants are shown in Table 10 in the case of four pole driving mode and in the case of eight pole driving mode.

As shown in Table 10, the secondary time constant Tr1 during the four-pole driving mode (less number of the poles) is four times longer than that during the eight-pole driving (greater number of the poles). The constant output driving is carried out in accordance with the secondary time constant Tr1 during the four-pole driving so as to prevent the shock due to the occurrence of abrupt change in torque from occurring during the switching between the four-pole driving and the eight-pole driving.

When the rotation speed of the induction motor PCM 50 shown in FIG. 19 is increased and reached to the switching point (af or REF) so that the eight-pole driving state is changed to the four-pole driving state, the four-pole (side) switching control block 100a serves to vary the exciting current instruction value Ids1* up to a rated value in a stepwise manner during the switching in the driving mode from the eight-pole driving to the four-pole driving. At this time, the secondary magnetic flux φr1 based on the exciting current instruction Ids1* indicates a rise in a first-order lag according to the secondary time constant Tr1 generated during the four-pole driving as shown in the following equation.

$$\phi r1 = \phi r1^* (1 - e^{(-t/Tr1)}) \quad (6).$$

Hence, during an initial stage of switching in the pole driving mode from the eight pole driving to the four pole driving, the secondary magnetic flux φr1 indicates approximately zero since t in the equation of (6) is generally zero at this initial stage. Hence, if the four-pole torque current instruction Iqs1* abruptly rises at this time of switching, a hunting of the output torque occurs due to an imbalance with the exciting current instruction. Therefore, the four-pole torque current instruction Iqs1* is also set in the first-order lag with the secondary time constant Tr1 during the entrance in the four-pole driving in the same way as the response of the secondary magnetic flux φr1.

$$Iqs1^* \text{ is proportional to } \{1 - e^{(-t/Tr1)}\} \quad (7).$$

A motor axial (motor output) torque T (4) generated during this entrance in the four pole driving indicates the rise in a second-order lag as shown in the following equation (8), if the torque instruction is expressed as T*.

$$T(4) = T^* (1 - e^{(-t/Tr1)})^2 \quad (8).$$

On the other hand, during this entrance in the four pole driving, the eight-pole switching control block 100b controls the exciting and torque instructions Ids2* and Iqs2* to reduce their values so that the sum between the motor axial torque T (8) in the eight pole driving mode and the motor axial torque T (4) becomes always constant and the following equation (8)' is established:

$$T(8) = T^* - T(4) \qquad (8)'$$
$$= T^*(2e^{(-t/Tr1)} - e^{(-2t/Tr1)}).$$

In this way, both of the exciting current instruction Ids2* and the torque current instruction Iqs2* are derived and output by the current instruction calculating block 100 to the current control system 2 (2B) so that the ratio between the exciting current Ids and torque current Iqs is constant. In this case, a minimum value of the exciting current Ids gives approximately 20% of the rated value with a control stability taken into consideration.

The current control in the eight-pole side switching control block 100b and the current control system 2B is stopped if the output axial torque T (4) in the four-pole driving sufficiently rises.

Next, at a simultaneous time when the rotation speed of the motor PCM (PCIM) 50 shown in FIG. 19 is reduced and the switching from the four-pole driving to the eight-pole driving is carried out, the four-pole (side) switching control block 100a instantaneously gives the zeroed exciting current instruction Ids1*. At this time, the response of the secondary magnetic flux φr2 is such as to be the first-order lag at the secondary time constant during the four-pole driving in the same way as the equation (6).

When the torque current instruction Iqs1* is reduced (falls down) along with the secondary time constant Tr1 during the four-pole driving in the same way as the case of switching in the driving from the eight-pole driving to the four-pole driving (in the same way as the equation (7)), the motor axial torque T (4) is, in turn, reduced (falls) in the second-order lag in the same way as the equation (8) during the entrance in the eight pole driving (the motor axial torque T (8) rises in the second-order lag).

At this time, the eight-pole switching control block 10b, in turn, rises the exciting current instruction and torque current instruction Ids2* and Iqs2* so that a resultant torque (T (8)+T (4)) becomes constant. At this time, the eight-pole and four-pole side switching control blocks 100a and 100b determine the respective torque and exciting current instructions so that the ratio between the exciting current Ids and torque current Iqs becomes constant. Thereafter, when the torque T (8) generated during the eight-pole driving sufficiently rises, the current control in the four-pole side switching control block 100a and in the current control system 1 (2A) during the entrance from the four pole driving to the eight pole driving is stopped.

As described above, the switching in the driving mode between the eight-pole driving and four-pole driving can be carried out by means of both of the four-pole side and eight-pole side switching control blocks 100a and 100b, maintaining the motor axial torque constant, by simultaneous operations in the four-pole driving vector control and in the eight-pole driving vector control.

FIGS. 22A, 22B, 22C, and 22D show simulation results during the switching from the eight-pole driving to the four-pole driving in the control apparatus in the fifth embodiment shown in FIGS. 19 and 20.

In FIGS. 22A through 22D, the switching from the eight-pole driving to the four-pole driving is started from 0.1 seconds on lateral axes of FIGS. 22A through 22D and is ended at 0.9 seconds.

Figure 22A:
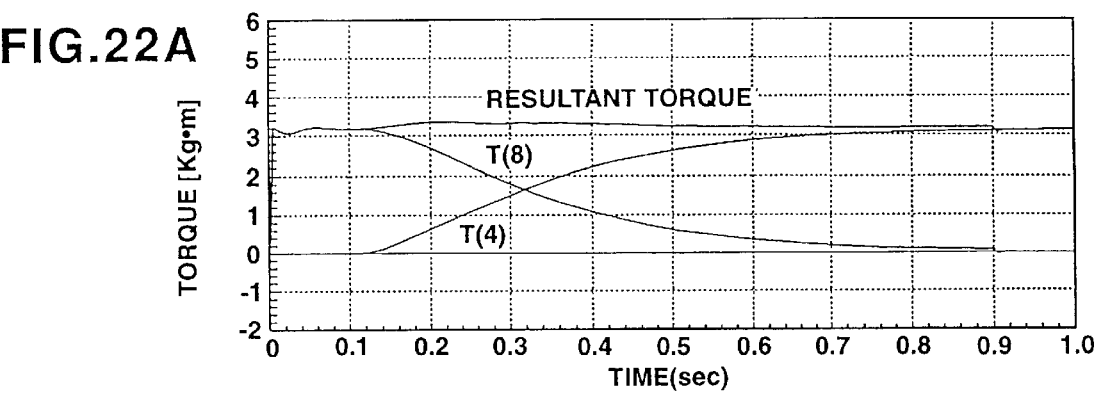
FIGS. 22A, 22B, 22C, and 22D are characteristic graphs representing results of a simulation of responses in the control apparatus shown in FIG. 19 when a number of poles in the pole change induction motor is changed from eight poles to four poles.

FIG. 22A shows the torque components T (8) and T (4) and the resultant torque (T (8)+T (4)).

Figure 22B:
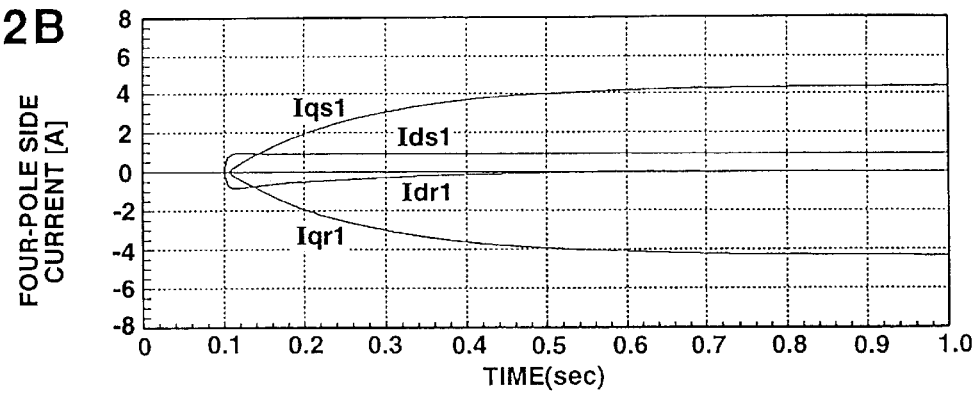

FIG. 22B shows the four pole side exciting currents (Ids1 and Irs1) in the d axis and the four pole side torque currents in the q axis (Iqs1 and Iqr1 during the switching from the eight-pole driving to the four-pole driving.

Figure 22C:
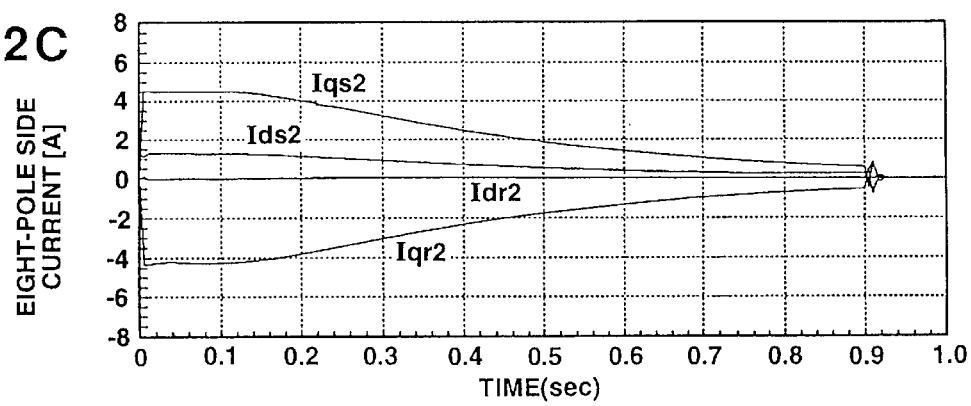

FIG. 22C shows the eight pole side exciting currents in the d axis (Ids2 and Idr2) and the eight pole side torque currents in the q axis (Iqs2 and Iqr2), respectively, during the switching from the eight-pole driving to the four-pole driving.

Figure 22D:
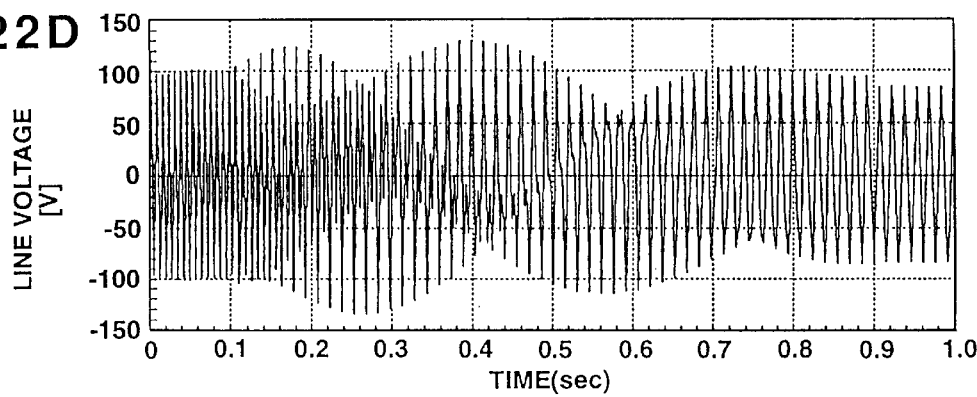

FIG. 22D shows the line voltage waveforms (AC) at the motor input ends during the switching from the eight-pole driving to the four-pole driving.

As typically shown in FIG. 22A, the torque variation does not appear during the switching from the eight-pole driving to the four-pole driving, the shock due to the variation in the torque does not occur, and the torque is maintained constant.

Since the peak values are increased in the line voltages as shown in FIG. 22D, the method for switching the driving between the eight-pole driving and the four-pole driving described above is effective for a relatively light load (the torque instruction T* indicates a relatively light load to the pole change motor 50).

Figure 21A:
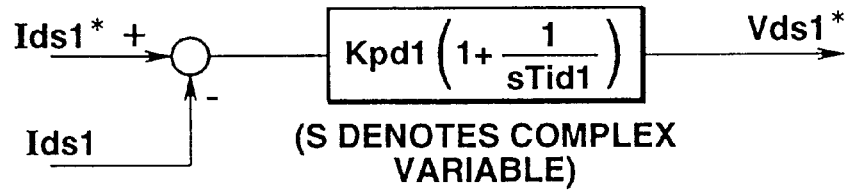
FIGS. 21A and 21B are PI current control circuit block diagrams of examples of four-pole side current control system 1 and eight-pole side current control system 2 shown in FIG. 19, respectively.

Referring back to FIG. 19, the current control systems 1 and 2 2A and 2B are independently installed for the eight-pole driving and the four-pole driving in the same way as shown in FIG. 17. The first current control system 2A receives Ids1 and Iqs1 from the other coordinate transformation block 110 which are feedback values Ia, Ib, Ic, Id, Ie, and If of the alternating current flowing through the respective six-phase lines of the induction motor (PCM). The second current control system 2B receives Ids2 and Iqs2 from the other coordinate transformation block 110 which are the feedback values Ia through If of the alternating current flowing through the respective six-phase lines of the induction motor (PCM). The first current control system 2A outputs the voltage instructions of Vds1* and Vqs1*. The second current control system outputs the voltage instructions of Vds2* and Vqs2*. In this case, the first current control system 1 (2A) is constituted by a PI (Proportional-Integral) current control as shown in FIG. 21A. In this case, the second current control system 2 (2B) is also constituted by the PI (Proportional-Integral) current control as shown in FIG. 21B.

Figure 21B:
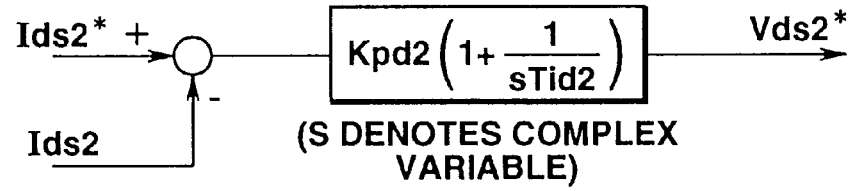

In FIGS. 21A and 21B, Kpd1 and Kpd2 denote proportional gains in the d axis, Kpq1 and Kpq2 denote proportional gains in the q axis, Tid2 and Tid2 denote time constants for the integration in the d axis, Tiq1 and Tiq2 denote time constants for the integration in the q axis, and s denotes a Laplace operator.

As shown in FIG. 19, the coordinate transformation block 30 transforms the d-q axes voltage instructions Vds1*, Vqs1*, Vds2*, and Vqs2* into alternating voltage current instructions Va*, Vb*, Vc*, Vd*, Ve*, and Vf* on the basis of the rotor positional angle θ (θ1 (shown in FIG. 5) in the case of the four-pole driving and θ2 in the case of the eight-pole driving) and outputs them to the six-phase inverter 4.

The timing at which the change in the number of poles occurs in the fifth embodiment is the rotation speed (frequency) of the motor which is about twice the base speed as shown in FIGS. 1 and 4. At this time, in the case where the load is large (heavy) at the point of changing the number of poles, the output phase voltages from the six-phase inverter 40 may become values in the vicinity to the maximum value up to the inverter itself 4 can output so that a margin provided for the output phase voltages from the inverter 40 becomes small. Therefore, in this case, it is necessary to change the number of poles with the output phase voltages (line voltage) of the inverter 40 suppressed within each voltage allowance value of the inverter 40 that the inverter 4 naturally has. Specifically, during the switching from the eight-pole driving to the four-pole driving, the eight-pole side current control system 2A (eight-pole side switching control block 100*b*) reduces the exciting current and torque current instructions to match to the secondary time constant Tr1 during the four-pole in the same way as described above and the four-pole side current control system 2B (four-pole side switching control block 100*a*) rises the exciting current and torque current instructions at a time later than the current reduction start time at the eight-pole side current control system.

In addition, during the switching from the four-pole driving to the eight-pole driving, the four-pole side current control system 2A (four-pole side switching control block 100*a*) falls the exciting current and torque current instructions and the eight-pole side current control system 2B (eight-pole side switching control block 100*b*) rises the exciting and torque current instructions at a time later than the start of the falling of the exciting and torque current instructions at the four-pole side current control system 2A in the same way as described above.

FIGS. 23A, 23B, 23C, and 23D show the results of simulations when the number of the poles is changed from eight poles to four poles in the case of the fifth embodiment.

In FIGS. 23A through 23D, the rises in the four pole side exciting and torque current instructions are started 0.15 seconds after the falls of the exciting and torque current instructions during the switching from the eight-pole driving to the four-pole driving.

Figure 23A:
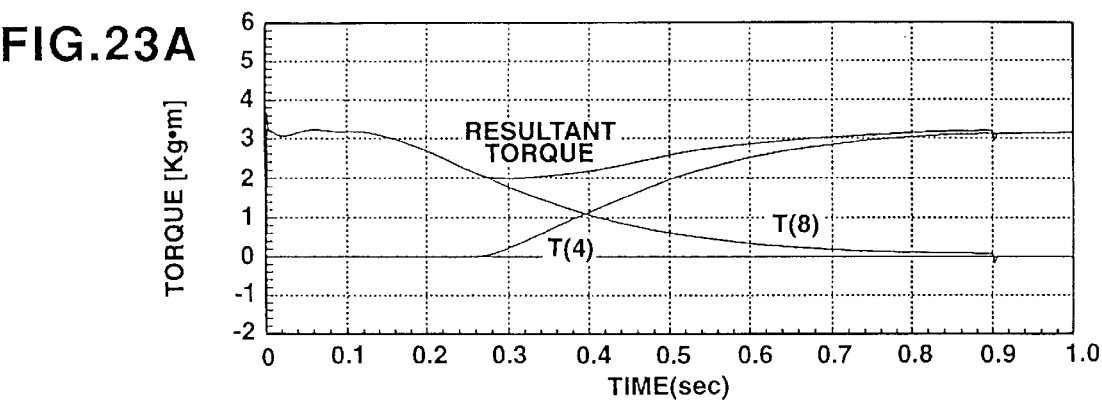
FIGS. 23A, 23B, 23C, and 23D are characteristic graphs representing other results of a simulation of responses in the control apparatus shown in FIG. 19 when the number of poles in the pole change induction motor is changed from four poles to eight poles.
Figure 23B:
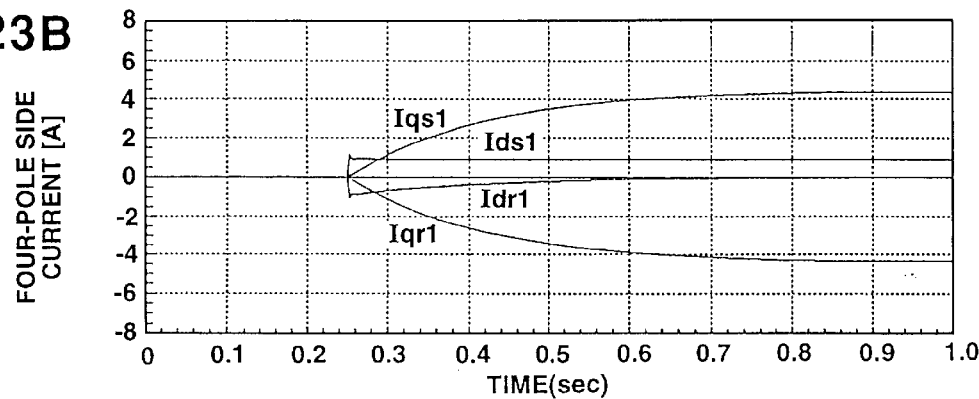
Figure 23C:
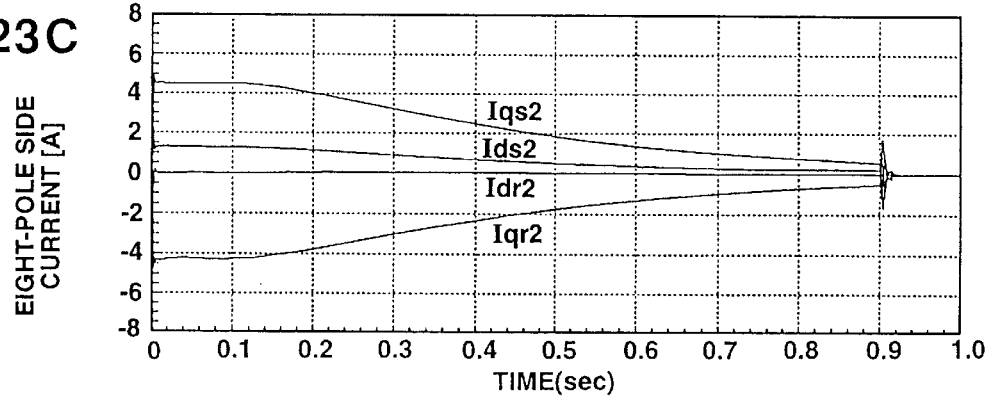
Figure 23D:
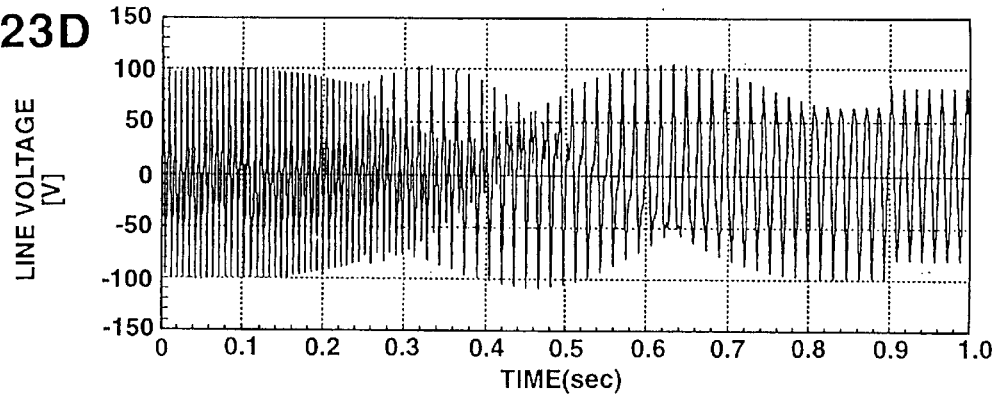

As typically shown in FIG. 23A, the resultant torque during the switching from the eight-pole driving to the four-pole driving was reduced since the start of risings of the four pole exciting and torque current instructions were delayed but the hunting in the variation in the resultant torque did not occur. In addition, as appreciated from FIG. 23D, the peak values of the line (output phase) voltages were approximately maintained at constant during the switching from the eight-pole driving to the four-pole driving. Therefore, it is possible to perform the stable switching into the four-pole driving even if the output voltages of the inverter 40 are placed at the values near to its maximum output voltage of the inverter 40.

Since the lag time of 0.15 seconds during the switching from the eight-pole driving to the four-pole driving approximately corresponds to the secondary time constant during the four-pole driving (as shown in Table 10), the lag time is set to the secondary time constant during the four-pole driving so that the vector control for the pole change induction motor PCM (PCIM) 50 can be achieved with the excessive rise in the lines voltage peak values suppressed.

Figure 24A:
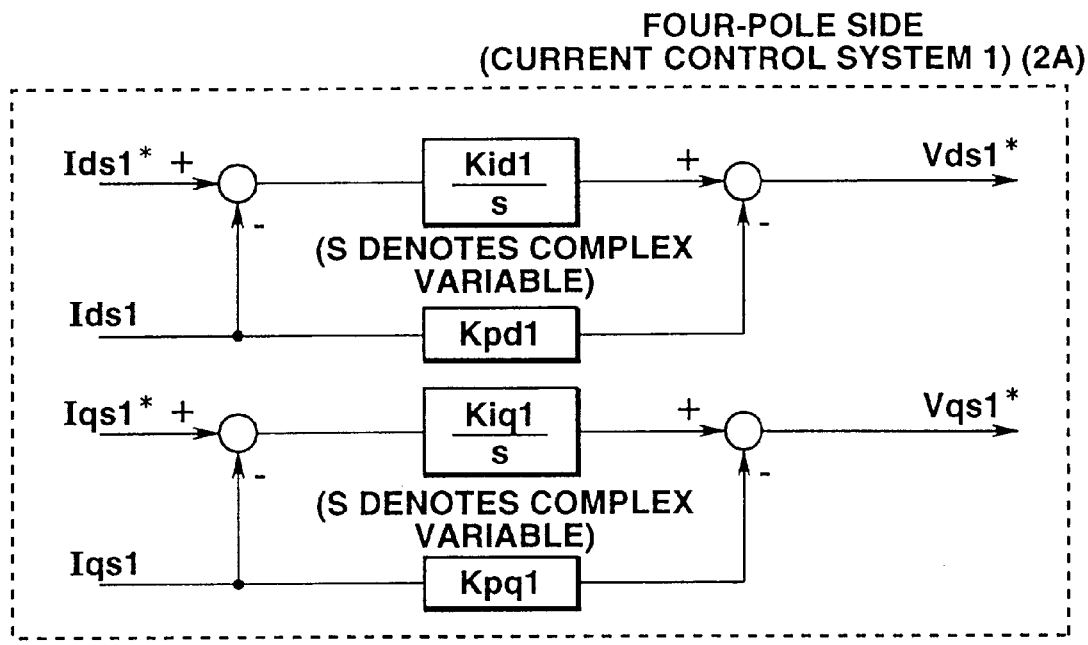
FIGS. 24A and 24B are circuit block diagrams of still other examples of the current control systems 1 and 2 shown in FIG. 19.
Figure 24B:
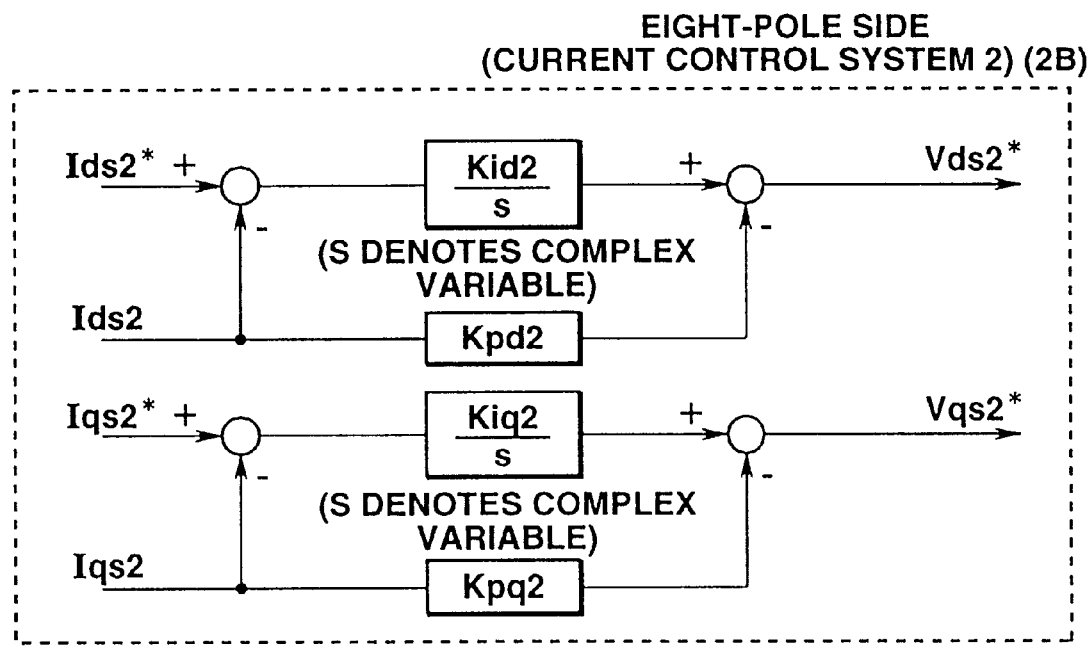

FIGS. 24A and 24B shows first alternatives of the four-pole side current control system 1 (2A) and the eight-pole side current control system 2 (2B) in the case of the fifth embodiment. In FIGS. 24A and 24B, Kid denotes an integration gain at the d axis and Kiq denotes an integration gain at the q axis. This alternatives execute IP current controls (I denotes Integration and P denotes the Proportion).

Figure 25A:
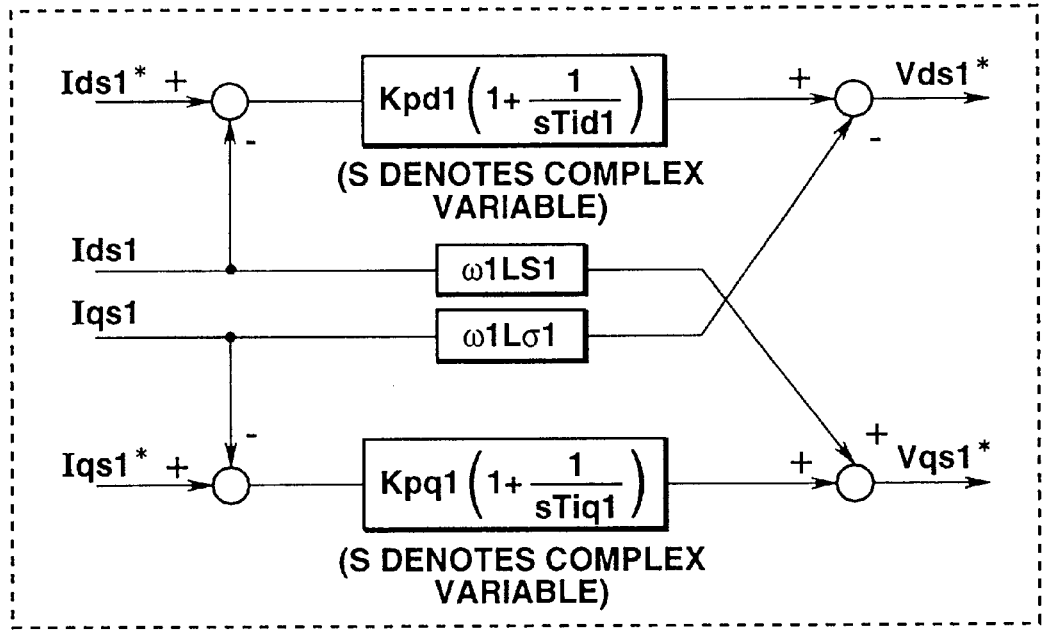
FIGS. 25A and 25B are circuit block diagrams of still other examples of the current control systems 1 and 2 shown in FIG. 19.
Figure 25B:
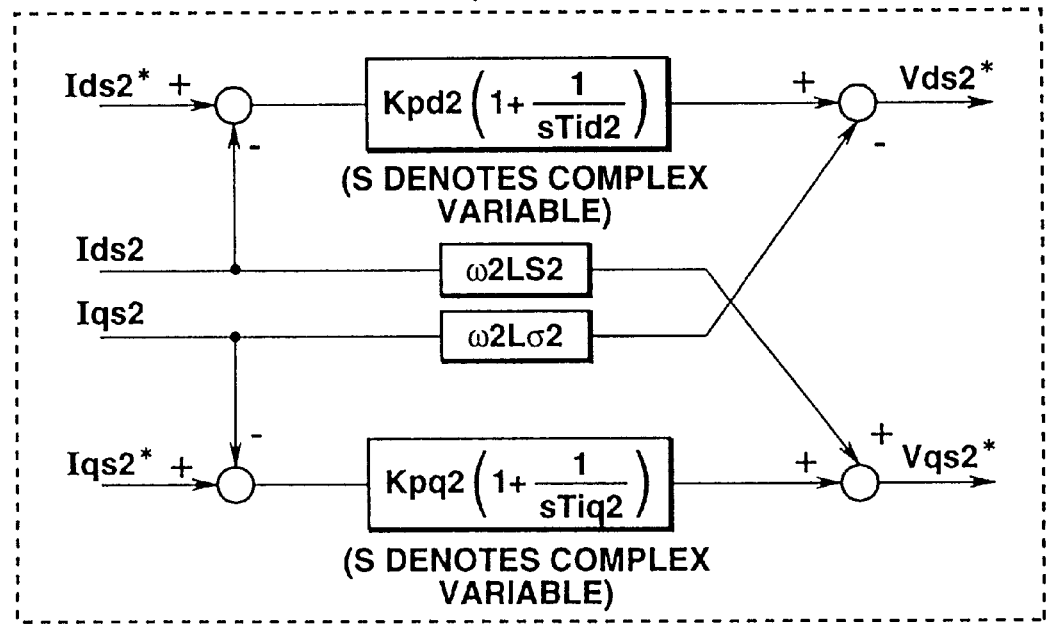

FIGS. 25A and 25B show second alternatives of the four-pole side current control system 1 (2A) and the eight-pole side current control system 2 (2B) in the case of the fifth embodiment.

Figure 26A:
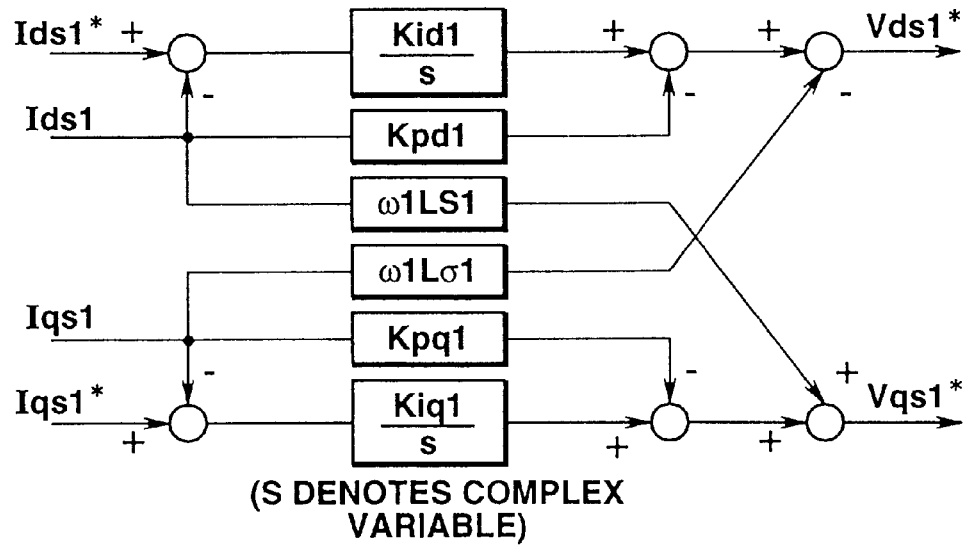
FIGS. 26A and 26B are circuit block diagrams of still other examples of the current control systems 1 and 2 shown in FIG. 19.
Figure 26B:
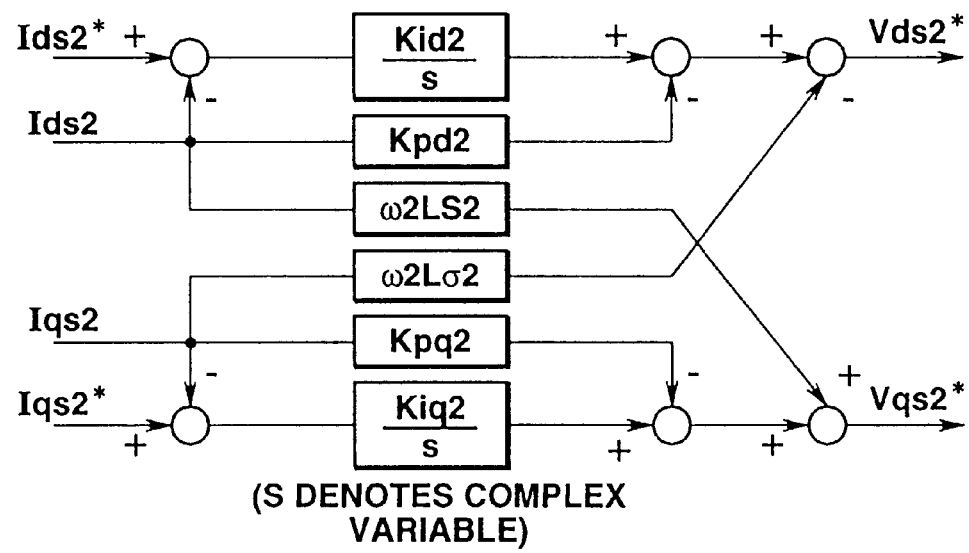

FIGS. 26A and 26B show third alternatives of the four-pole side current control system 1 (2A) and the eight-pole side current control system 2 (2B) in the case of the fifth embodiment.

In FIGS. 26A and 26B, Ls1 denotes the primary self inductance, Lσ1 denotes the leakage inductance, and ω denotes the electrical angular frequency.

FIGS. 24A and 24B show the PI current control, FIGS. 25A and 25B show non-interference PI current control, and FIGS. 26A and 26B show non-interference PI current control.

Sixth Embodiment

Figure 27:
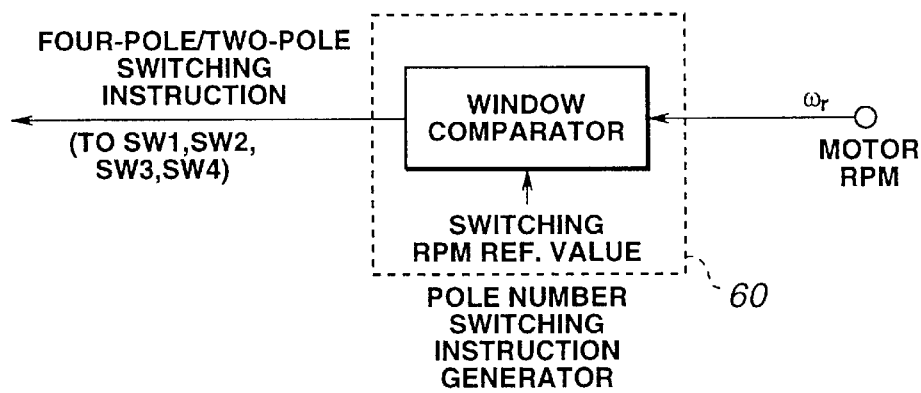
FIG. 27 is a circuit block diagram of a sixth preferred embodiment of the control apparatus applicable to the control apparatus shown in FIG. 18 (16) or 19.

FIG. 27 shows a pole change driving instruction generator 60 applicable to the control apparatus for the induction motor capable of changing its number of poles, the ratio of its number of poles to be changed being 2:1, for example, applicable to the speed control system 10 shown in FIG. 16 or 18 or to the instruction calculating block 100 shown in FIG. 19.

When the pole change driving instruction generator 60 shown in FIG. 27 is applied to the speed control system shown in FIG. 18, the following result is obtained.

The pole change driving instruction generator 60 including a window comparator always receives the motor actual velocity ωr from the pulse generator PG attached around the motor axle.

When the rotation speed ωr of the induction motor is increased and reached to the pole driving switching point at which a first threshold value (Ncu shown in FIG. 34) is set, the window comparator outputs a voltage level indicating a pole change instruction such that the number of poles in the induction motor (PCM or PCIM) should be changed, for example, from the four poles to the two poles or from the eight poles to the four poles. Upon receipt of the pole change instruction, the first and second current control systems 1 and 2 (2A and 2B) perform the above-described operations on the exciting and torque current instructions during the change in the number of the poles.

On the other hand, when the rotation speed ωr of the pole change induction motor (PCIM) is decreased from above the predetermined rotation speed (PRE or Ncu) and reaches to the pole driving switching point at which a second threshold value (Ncd in FIG. 34) of the window comparator is shifted from the first threshold value (Ncu), the window comparator outputs the pole change instruction such that the number of poles in the induction motor (PCM or PCIM) should be changed, for example, from two poles to four poles or from four poles to eight poles. Upon receipt of the pole change instruction, the first and second control systems 1 and 2 (2A and 2B) perform the above-described operations on the exciting and torque current instructions during the change in the number of poles.

Figure 34:
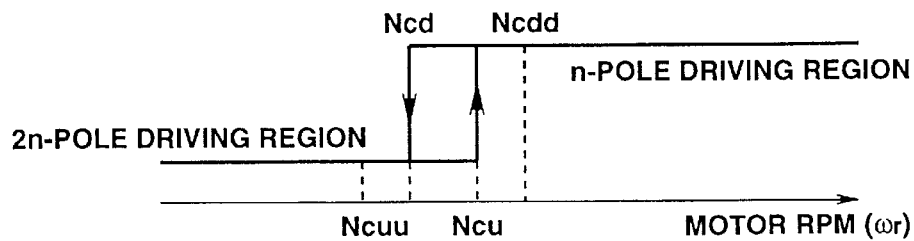
FIG. 34 is a characteristic graph representing a rotation (revolution) speed of the pole change induction motor when the number of the poles is to be changed.

It is noted that the window comparator shown in FIG. 27 has two different first and second threshold values along the rotation speed of the motor to prevent the rotation speed of the motor placed in the vicinity to the pole change switching point of the rotation speed as appreciated from FIG. 34.

Figure 28:
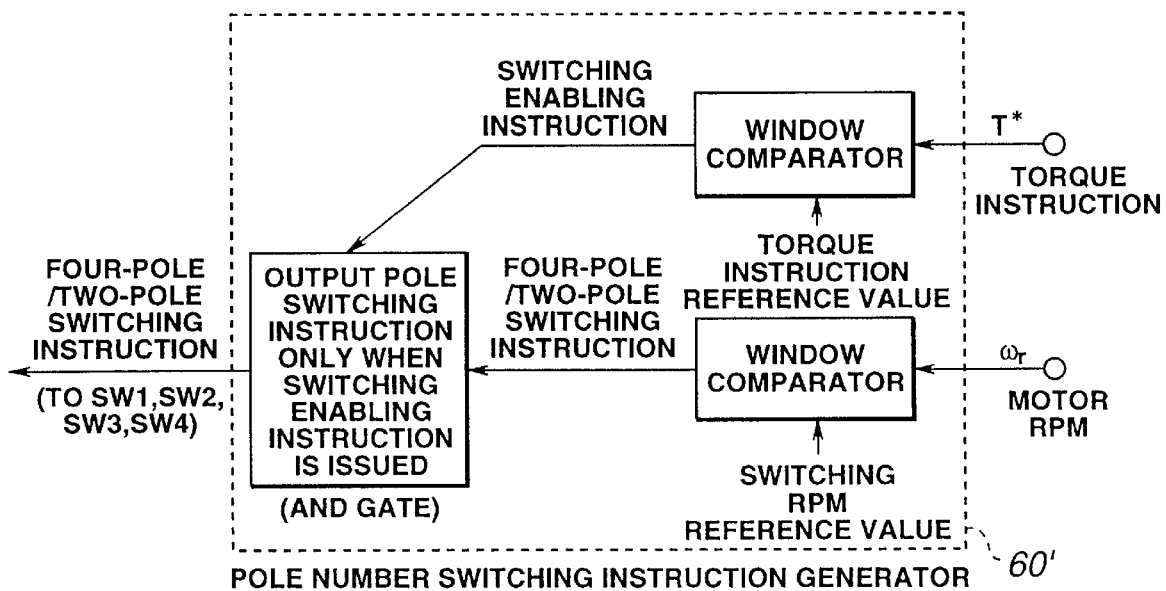
FIG. 28 is a circuit block diagram of an alternative of the sixth preferred embodiment shown in FIG. 27 applicable to the control apparatus shown in FIG. 18 or 19.

FIG. 28 shows an alternative 60' of the pole change driving instruction generator in place of the pole change driving instruction generator 60 shown in FIG. 27.

The reason of the installation of the alternative pole change driving instruction generator shown in FIG. 28 will be described below.

That is to say, only when, in the control apparatus of the induction motor capable of changing its number of poles, the ratio of the number of poles to be changed being 2:1, a high load is applied to the induction motor (PCM or PCIM), the variation of the output torque occurs during the switching in the pole driving from the greater number of poles to the less number of poles and vice versa.

In the case of FIG. 27, the rotation speed of the motor (PCM or PCIM) at which the number of poles are switched (the pole number switching point) is fixed by means of the window comparator regardless of the load applied to the motor. Therefore, in a case wherein the motor (PCM or PCIM) is driven at the rotation speed at which the number of poles are changed with the application of the high load, the abrupt variation in the torque during the switching of the pole driving occurs.

When the control apparatus of the pole change induction motor according to the present invention is applied to the electric vehicle, this variation of the output torque gives an unpleasant feeling to the electric vehicle user (driver).

However, in the electric vehicle drive, it is very rare case that the high (heavy) load application is continued for a long term. The high load application for the long term means the continuation of the full depression of the accelerator (pedal) for the long term.

Therefore, in the case of FIG. 28, a condition under which the degree of depression angle on an accelerator pedal once exceeds a predetermined angle and is thereafter decreased below the predetermined angle is added to the condition under which the number of the poles are changed (switched) in the case of FIG. 27.

In details, as shown in FIG. 28, the torque instruction T* derived from the accelerator of the electric vehicle (the torque instruction T* is based on the speed instruction ωr1 and the actual velocity ωr as shown in FIG. 17) has a value corresponding to the depression angle. Another window comparator is provided for receiving the torque instruction T* as shown in FIG. 28. When the torque instruction value exceeds a torque instruction reference value set in the other window comparator, the other window comparator outputs a high voltage level indicating that the torque instruction value has exceeded the torque instruction reference value set in the other window comparator and shifts the torque instruction reference value to a lower value. Therefore, only when the torque instruction value is decreased from the value exceeding the torque reference value and is decreased below the lower shifted torque reference value, the other window comparator outputs a pole number switching enabling instruction. The pole number switching enabling instruction output from the other window comparator is supplied to an AND gate denoted by output switching instruction only when the switching enabling instruction is issued in FIG. 28. On the other hand, when the rotation speed of the motor denoted by ωr is supplied to the window comparator having the same structure as that shown in FIG. 27 and reaches to the rotation speed of the motor at which the number of the poles are changed, the pole number switching instruction is output from the window comparator to the AND gate. The pole number change instruction (for example, four-pole/two-pole switching instruction or eight-pole/four-pole switching (change) instruction) is issued only when both of the switching enabling instruction from the other window comparator and the pole number change instruction from the window comparator are input to the AND gate.

Therefore, in a state where the load becomes light at the pole number switching point of the rotation speed of the motor, the number of poles in the induction motor are changed so that no variation of the torque occurs during the switching in the number of poles.

Seventh Embodiment

Figure 29:
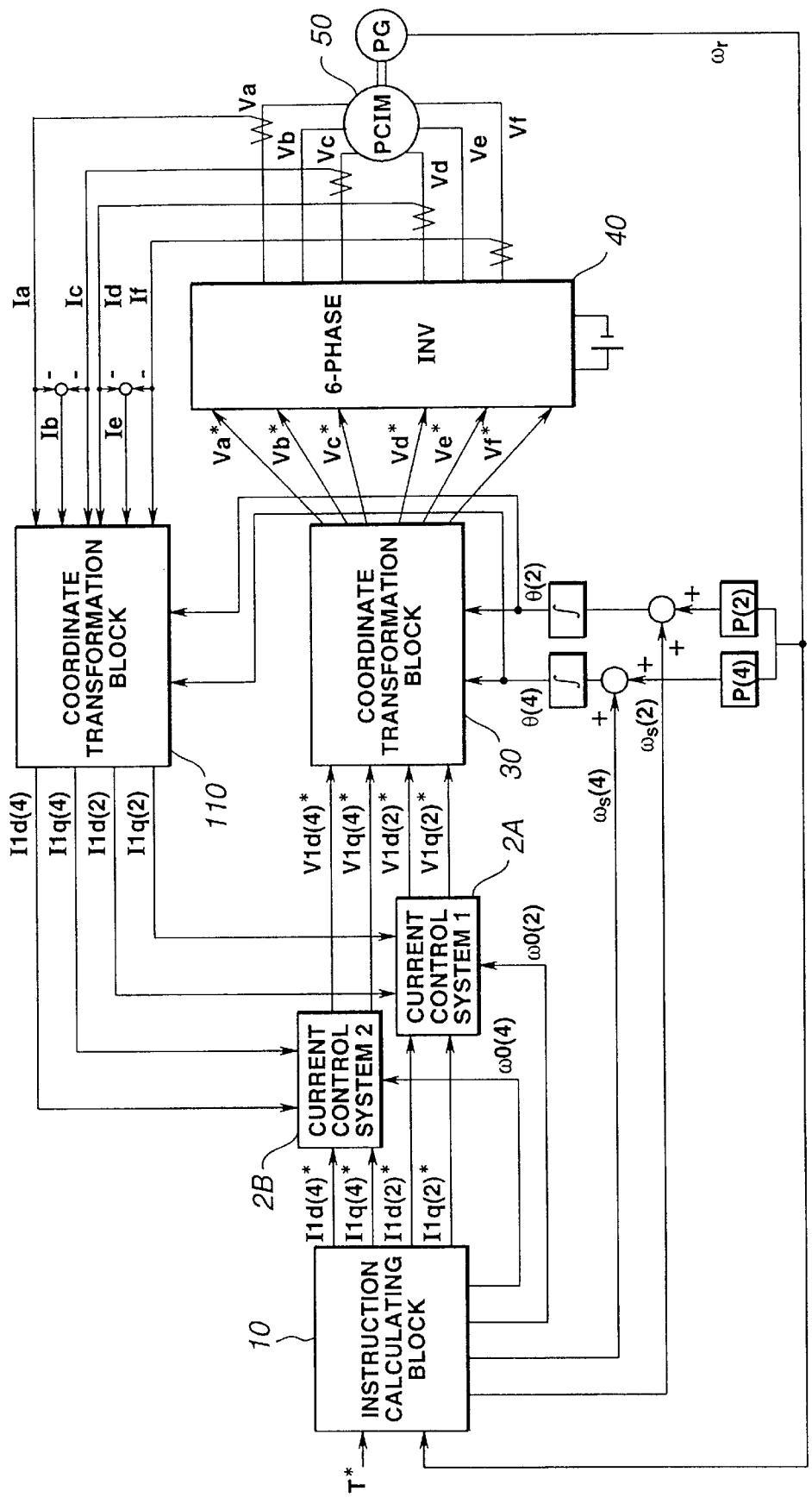
FIG. 29 is a circuit block diagram of a seventh preferred embodiment of the control apparatus for the pole change induction motor according to the present invention.

FIG. 29 shows the control system for the induction motor capable of changing the number of the poles of the induction motor between the two poles and four poles in a seventh preferred embodiment according to the present invention.

However, the structure of the control apparatus in the seventh embodiment shown in FIG. 29 is generally the same as that shown in FIG. 19 only in that the symbols are different from each other, i.e., each subscript 1 shown in FIG. 29 denotes the primary side represented by the corresponding subscript s shown in FIG. 19, each subscript (4) shown in FIG. 29 denotes the four poles represented by the corresponding subscript 2 shown in FIG. 19 and each subscript (2) denotes the two poles represented by the corresponding subscript 1 shown in FIG. 19. Then, the operation of the control apparatus described with reference to FIGS. 19 and 20 is the same as that in the seventh embodiment shown in FIG. 29.

In the seventh embodiment, however, there is a tendency described below.

When the induction motor denoted by PCIM 50 shown in FIG. 29 is driven with the relatively light load in the constant output torque driving mode, namely, when each terminal voltage of the induction motor (Va, Vb, Vc, Vd, Ve, and Vf) is lower than the maximum value up to which the six-phase inverter can output to the induction motor, the number of the poles can be changed with the axial torque of the motor maintained at constant. However, in a case where the number of the poles are changed with each terminal voltage of the induction motor (PCIM) suppressed below the maximum value of each the inverter output voltage during the high load application, the variation in the axial torque of the motor 50 occurs. This gives the unpleasant feeling to the electric vehicle user (driver).

The following embodiments have solved the above described tendency.

Eighth Embodiment

Figure 30:
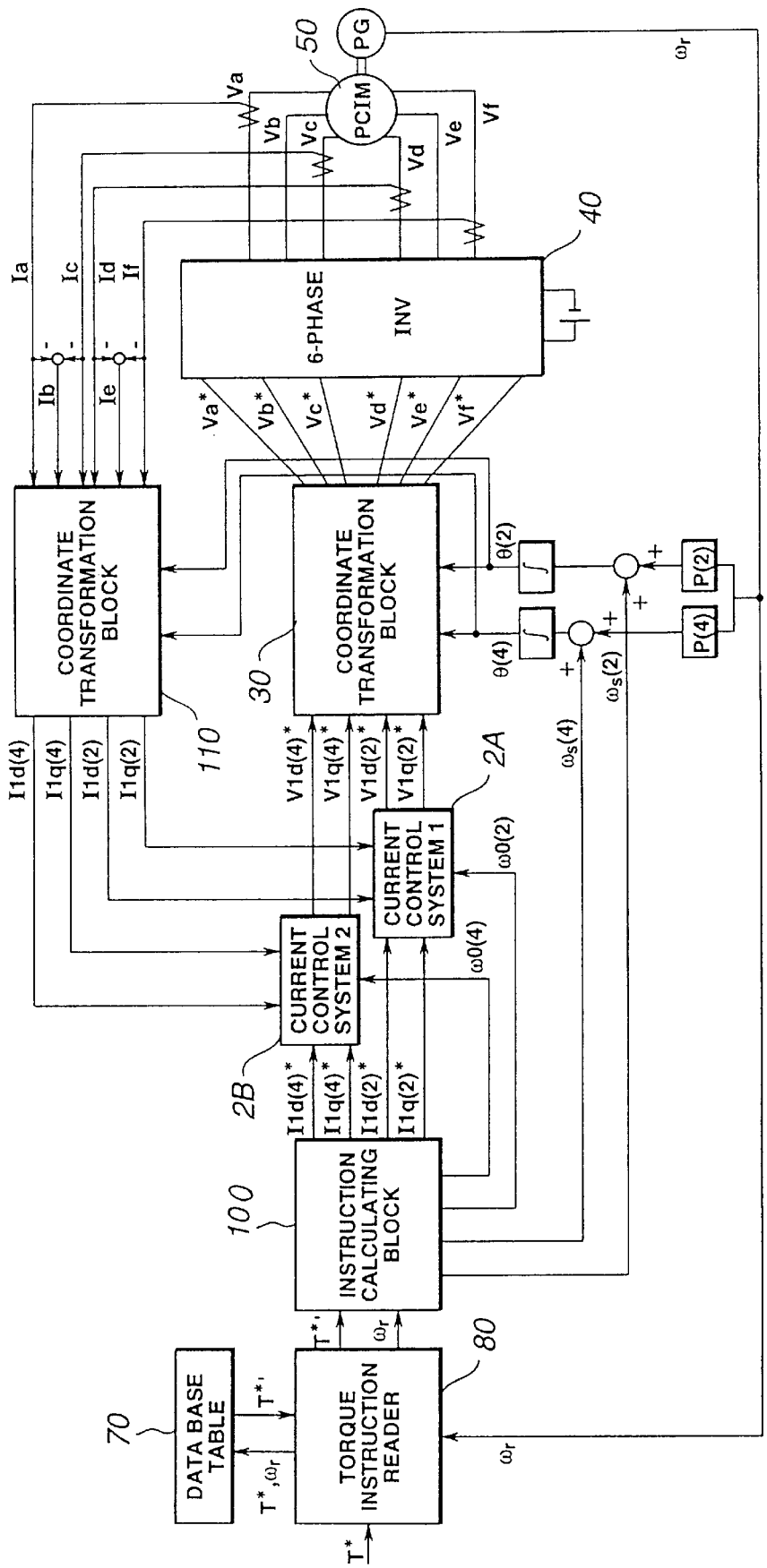
FIG. 30 is a circuit block diagram of eighth and ninth preferred embodiments of the control apparatus for the pole change induction motor according to the present invention.

FIG. 30 shows an eighth preferred embodiment of the control apparatus for the pole change induction motor capable of changing the number of the poles between four poles and two poles.

The maximum torque characteristic of the induction motor (PCIM) shown in FIG. 30 is denoted by oblique lines of FIG. 4.

However, during the change in the number of poles from the two poles to the four poles or vice versa in a case where the maximum value up to which the inverter associated with the induction motor (PCIM) can output is taken into consideration, the maximum torque characteristic temporarily drops as denoted by a solid line of ① in FIG. 4. Therefore, when the six-phase inverter performs the control over the induction motor (PCIM), a maximum value of the torque instruction T* is previously limited to a value such as not to abruptly change the variation in the maximum torque as denoted by a dotted line ② in FIG. 4 so that the torque variation during the change in the number of poles of the induction motor can perfectly be eliminated.

FIG. 30, therefore, shows the eighth preferred embodiment of the induction motor control apparatus by which the above-described concept of the maximum torque characteristic can specifically be achieved.

It is noted that, except the installations of a data table 70 and a torque instruction reader 80, the structure of the pole change induction motor control apparatus shown in FIG. 30 is the same as that shown in FIG. 29.

The torque instruction T* is derived from the accelerator of the electric vehicle as described in the embodiments shown in FIGS. 27 and 28.

That is to say, the torque instruction T* changes from 0% to 100% according to the depression angle of the accelerator (not shown) (100% means the maximum torque instruction). In order to make the maximum torque characteristic as denoted by the dotted line of ② in FIG. 4, the torque characteristic reader 80 reads a new torque instruction T*' from the data table 70 using the torque instruction T* and the motor rotation speed ωr (PU) as read parameters, the new torque instruction T*' being providing such a maximum torque characteristic as denoted by the dotted curved line of ② in FIG. 4.

Ninth Embodiment

A ninth preferred embodiment of the control apparatus according to the present invention has the same structure as the eighth preferred embodiment shown in FIG. 30. The difference in the ninth embodiment from the eighth embodiment will be described below.

That is to say, although the torque variation can perfectly be eliminated during the change in the number of the poles at the pole change switching point in the eighth embodiment, the eighth embodiment limits the maximum torque which can usually be exhibited at any rotation speed of the motor (PCIM) other than the rotation speed of the motor at which the pole number change is carried out.

Therefore, in the ninth embodiment, the maximum torque characteristic denoted by the dotted line ② of FIG. 4 is changed to that denoted by the solid line ③ of FIG. 4 so that the maximum torque characteristic becomes larger than that in the case of the eighth embodiment during the constant output driving except the case wherein the number of the poles are changed. It is noted that, in the ninth embodiment, the torque variation during the change in the number of poles is reduced as low as possible so as to prevent the unpleasant feeling caused by the shock due to the occurrence of the torque variation from being given to the electric vehicle user (driver).

To achieve the above-described enlarged maximum torque characteristic, in the ninth embodiment, the new torque instruction value T*' in the data table 70 of FIG. 30 is changed such as to give the maximum torque characteristic as denoted by the solid line of ③ in FIG. 4.

Tenth Embodiment

Figure 31:
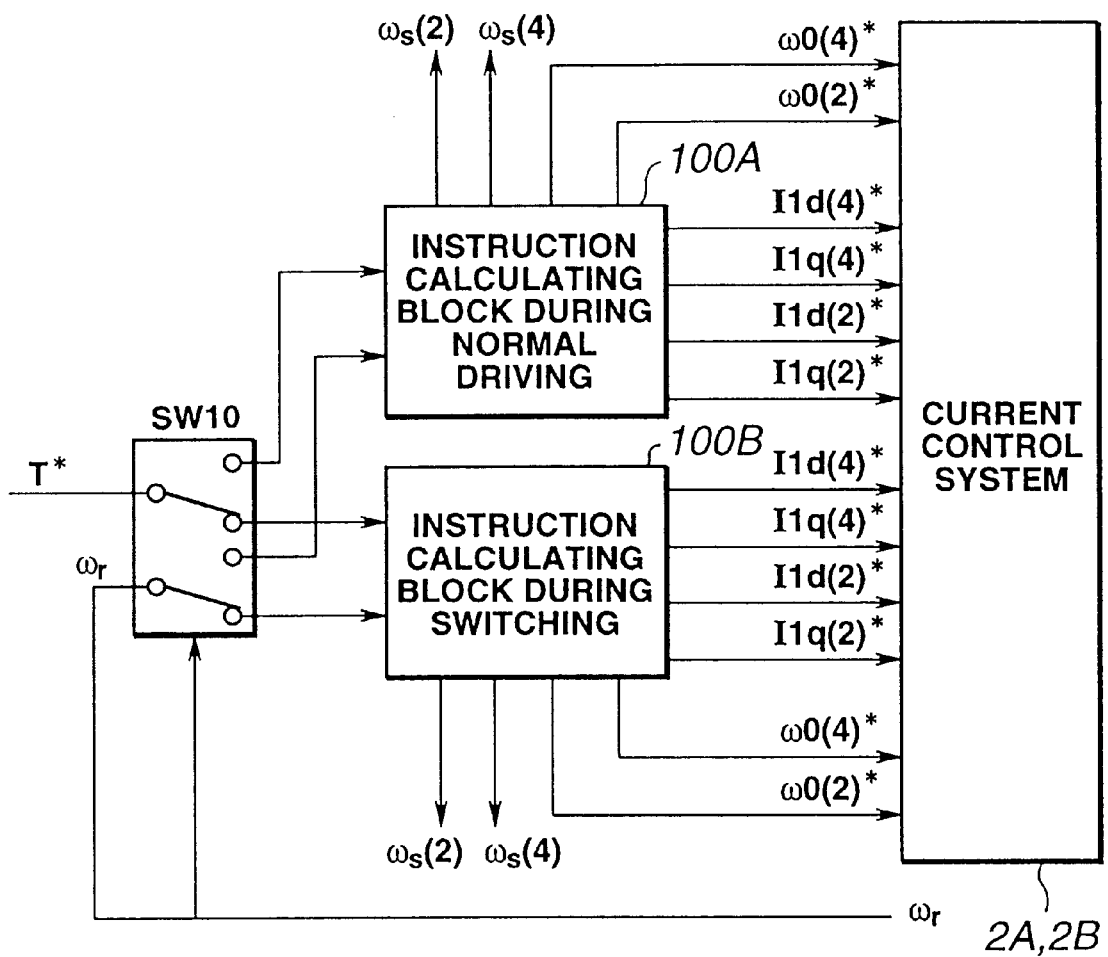
FIGS. 31, 32, and 33 are circuit block diagrams of each circuit in a tenth preferred embodiment of the control apparatus according to the present invention.
Figure 32:
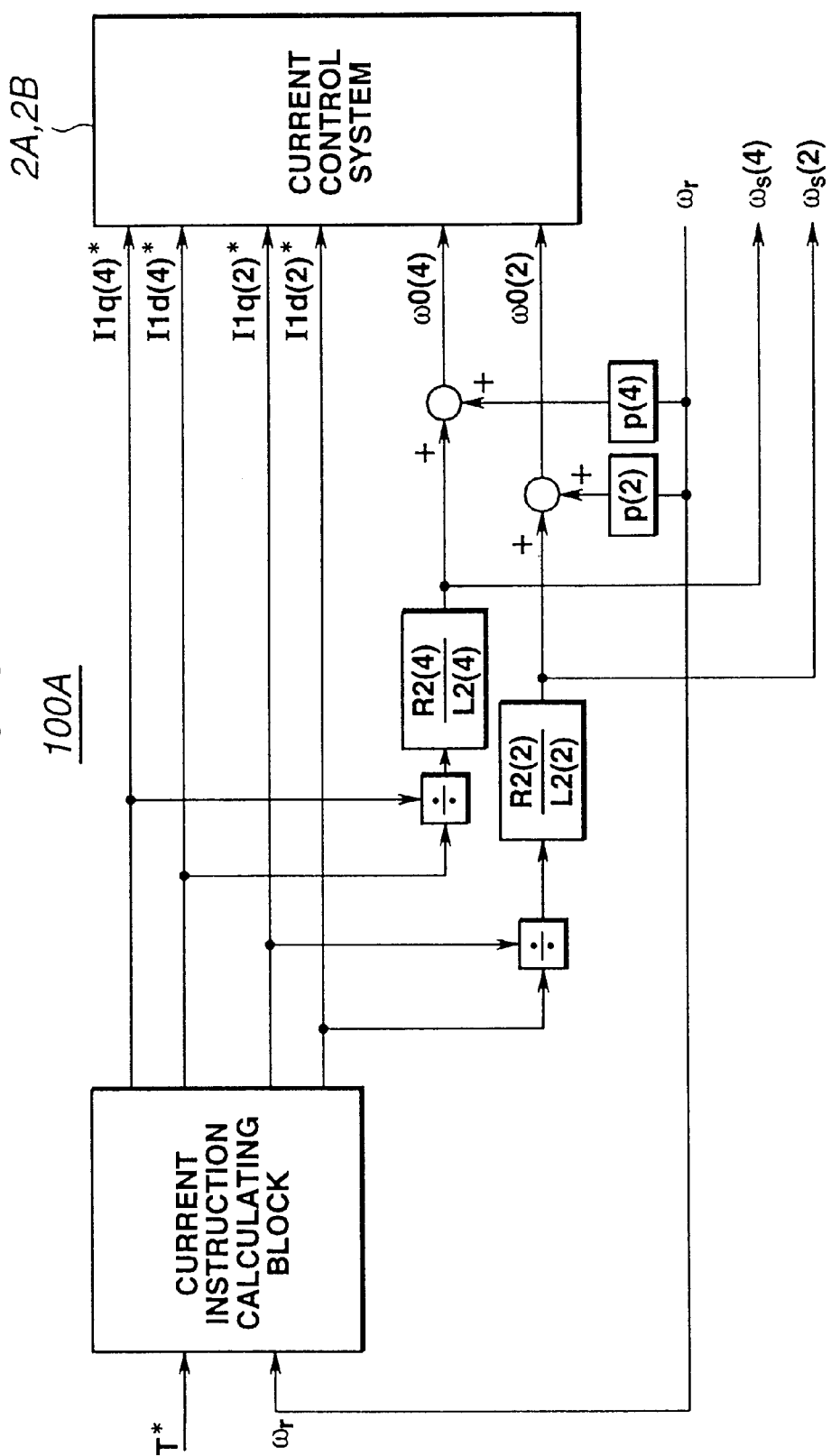
Figure 33:
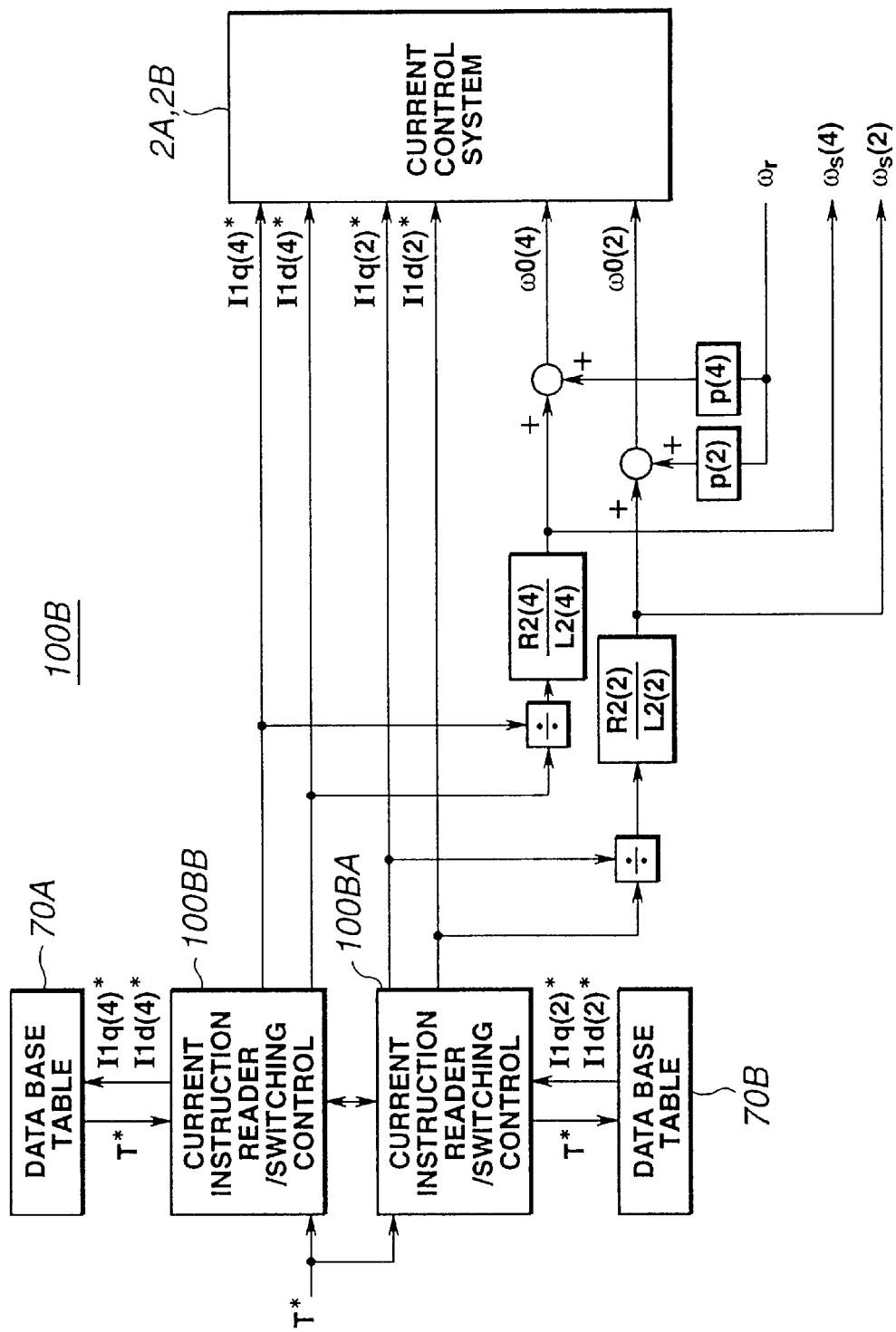

FIGS. 31, 32, and 33 show a tenth preferred embodiment of the control apparatus for the pole change induction motor according to the present invention.

The instruction calculating block 100 shown in FIGS. 31, 32, and 33 is applicable to the current instruction calculating block 100 of FIG. 29.

In the tenth embodiment, a normal vector control is carried out during the constant output driving except the time at which the pole number change is carried out without change in the maximum torque characteristic as being carried out in the case of the eighth and ninth embodiments.

In this case, the maximum torque characteristic is shown in FIG. 4 (denoted by the oblique lines).

Only during the pole number switching, the exciting current is reduced and the torque current is, at this time, increased so that the terminal voltages of the induction motor (PCIM) is suppressed.

It is, however, noted that the ratio between the exciting current and torque current is needed to be determined so that the primary current flowing through the induction motor (PCIM) 50 does not exceed a maximum value up to which the inverter 40 can output as the output current.

The details of the tenth embodiment will be described below.

That is to say, the primary voltage of the induction motor is expressed in the following equations as the voltage on the d-q axes rotating in synchronization with the power supply angular frequency ω0.

$$V1d = R1 \cdot I1d - \omega o \cdot Lo \cdot 1q \tag{9}$$

$$V1q = R1 \cdot I1d + \omega o \cdot L1 \cdot I1d \tag{10}$$

In the equations (9) and (10), R1 denotes the primary resistance [Ω], I1d denotes the exciting current [A], L1 denotes the primary inductance [H], I1q denotes the torque current [A], and Lo denotes the leakage inductance [H].

Then, the primary voltage V1 can be expressed as $$V1 = (V1d^2 + V1q^2) \tag{11}$$

The torque T of the induction motor (PCIM) is proportional to the product between the exciting current and torque current.

$$(T\alpha \sqrt{\;}(I1d^2 + I1q^2) \tag{12}$$

In addition, the primary current of the induction motor (PCIM) is as follows:

$$I1 = \sqrt{(I1d^2 + I1q^2)} \tag{13}$$

When the induction motor (PCIM) has rotated at the high rotation speed at which the change in the number of the poles is carried out, each first term of right sides in the equations (9) and (10) is sufficiently small so that the voltages on the d-q axes can be approximated as follows:

$$V1d \approx -\omega o L o I1d \tag{13},$$

and $$V1q \approx +\omega L1 I1d \tag{14}$$

Since Lo<<L1, the magnitude of I1d is varied so that the value of V1 can relatively largely be varied. This is appreciated from the equations (13), (14), and (11).

From the above relationship, the torque T is made constant, namely, the exciting current I1d is reduced and the torque current I1q is, in turn, increased, maintaining the product between I1d and I1q constant.

Thus, the primary voltage V1 of the induction motor (PCIM) can be suppressed to a lower value as compared with that before the variation of the values of I1d and I1q. Simultaneously, the torque variation can be suppressed as lowest as possible.

It is noted that, a limiter is provided for a lowest value of I1d in order to stabilize the control over the exciting and torque currents in the tenth embodiment. In addition, the above-described control is carried out into the range such that the primary current I1 does not exceed the maximum value up to which the inverter can output the current.

Referring to FIG. 31, a drive switch block SW10 is installed so that either of the two instruction calculating blocks 100A or 100B is effective according to the detected value of the rotation speed ωr of the induction motor (PCIM). It is noted that the calculated slip frequencies at the respective calculating blocks ωs(2), ωs(4) to are supplied to the coordinate transformation block 30 via summers and integrators as shown, for example, in FIG. 19. This is applied equally well to FIGS. 32 and 33.

On the other hand, in the tenth embodiment, each data base table 70A and 70B on the exciting current I1d* and torque current instructions I1q* is prepared as shown in FIG. 33 with the torque instruction T* as the read parameter when the one instruction calculating block 100A or 100B is effectively operated with the rotation speed of the motor (PCIM) having been arrived at the pole number switching point.

The data base tables 70A and 70B shown in FIG. 33 are prepared in the following manner.

The exciting and torque current instructions I1$d$* and I1$q$* effective during the change in the number of the poles are such that the exciting current I1$d$ is reduced, the torque current I1$q$ is increased, and the torque T (=K·I1$d$·I1$q$) is reduced so that the following simultaneous inequalities (15) through (18) are satisfied, the exciting current instruction I1$d$ is reduced as low as possible, and the torque T is decreased from the torque instruction T*.

$I1d \geq I1dMIN$ ($I1dMIN$ denotes the lowest limit value of the exciting current) (15), $T^*/K \geq I1dx \, I1q$ ($K$ denotes the torque coefficient) (16), $I1MAX \geq \sqrt{(I1d^2 + I1q)}$ ($I1MAX$ denotes the maximum current value up to which the inverter can output the current) (17), $V1MAX \geq \sqrt{(V1d^2 + V1q^2)}$ ($V1MAX$ denotes the maximum value up to which the inverter can output) (18).

Then, during the change in the number of the poles, the current instructions are read from the above-described data tables 70A and 70B via current instruction reader/switching controls 100BB and 100BA and the slip frequencies and power supply angular frequencies ωs and ωo are calculated from the read current instructions as appreciated from FIGS. 31 and 33.

Eleventh Embodiment

Figure 35:
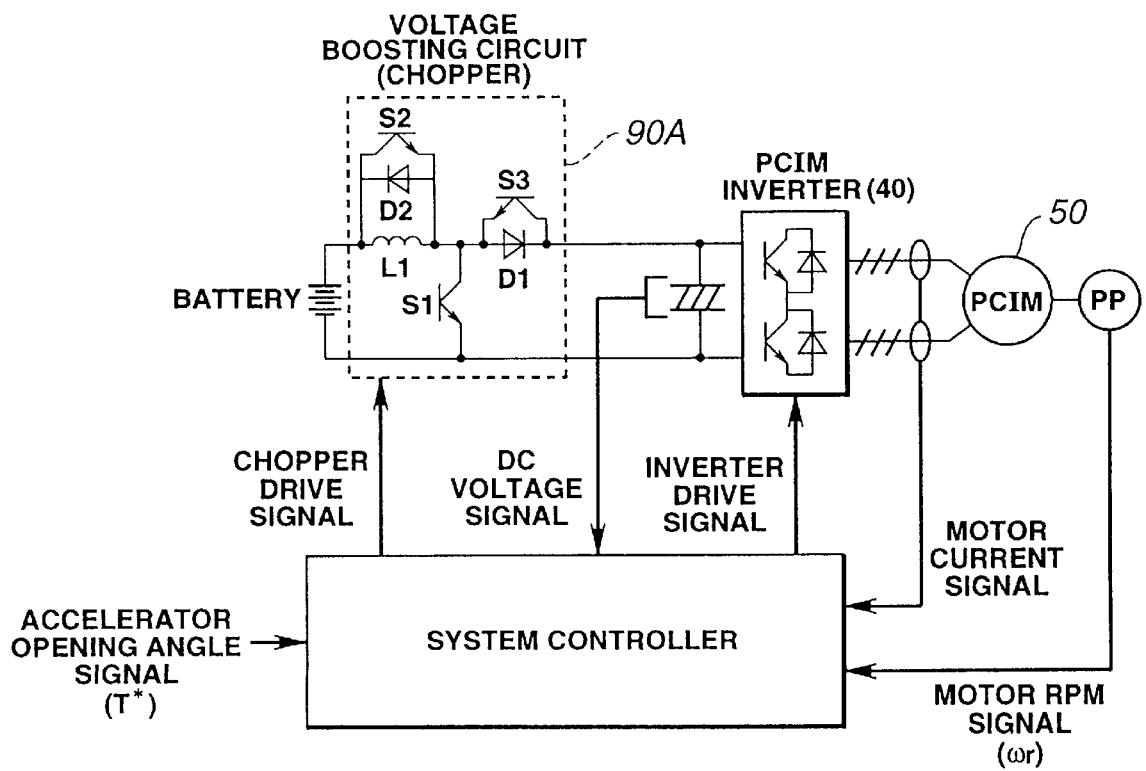
FIG. 35 is a circuit block diagram of an eleventh preferred embodiment of the control apparatus for the pole change induction motor according to the present invention.

FIG. 35 shows an eleventh embodiment of the control apparatus for the pole change induction motor (PCIM) according to the present invention.

The operation of the control apparatus in the eleventh embodiment will be described below with reference to FIG. 34 in addition to FIG. 35.

The transfer operation of switching the number of the poles in the pole change induction motor (PCIM) is carried out such that when the number of rotation speed ωr is increased and exceeds the first threshold value Ncu, the constant output driving in the n number of the poles from the driving in the 2n number of the poles (n=2, 4, - - - ) is started regardless of the load instruction, namely, the opening angle of the accelerator installed in the electric vehicle and when the motor rotation speed is, in turn, decreased and arrived at the second threshold value Ncd of the motor rotation speed ωr, the constant output driving in the 2n number of the poles from the n number of the poles is started.

Since a time it takes to switch the number of the poles is generally constant, the rotation speeds of the motor at which the transfer operations from the n number of the poles to the 2n number of the poles and vice versa are ended are varied according to the opening angle of the accelerator (the load condition). In the eleventh embodiment, the torque variations during the switching from the number of the poles are eliminated by the change in the operation mode of the voltage boosting chopper circuit connected to the DC battery for the PCIM inverter.

In the control apparatus for the pole change induction motor, in order to eliminate the torque variation during the change in the number of poles between the n number of poles and 2n number of poles, a function such that the maximum value up to which the inverter 40 can output is further increased only during the interval (about 0.7 seconds) at which the change in the number of poles is carried out may be added. An energy to be supplied lo the inverter 40 via the added function is about 75 KJ in the case of the motor output power of 60 KW class. Therefore, it gives no problem when the whole control apparatus is installed in the electric vehicle.

As shown in FIG. 35, a voltage boosting chopper circuit 90A is interposed between the DC current input ends of the PCIM inverter and the DC battery. The voltage boosting chopper circuit 90A includes: a reactor L1; a semiconductor switch S1; a diode D1; and a regenerative current bypass circuit having semiconductor switches S2 and S3 and a diode D2. The semiconductor switch S2 and the diode D2 and the semiconductor switch S3 and the diode D1 may be constituted by high-power modules. It is noted that since a rate of utilization for the semiconductor switch S1 and the rector L1 is small and short in time, the current carrying capacity of each of the semiconductor switch S1 and the reactor L1 can be designed at a rating in a short time duration.

A system controller (for example, shown in FIG. 29) receives: the accelerator opening angle signal; DC voltage signal from the capacitor; the motor current signal; and carries out the controls over the PCIM inverter and the chopper circuit.

When the Motor Rotation Speed is Increased

In a case where the motor (PCIM) is driven below the rotation speed (the first threshold value) Ncu shown in FIG. 34, the system controller receiving the accelerator opening angle signal equal to or higher than a set value of the accelerator opening angle, the set value being such that when the accelerator opening angle which is equal to or above the set value is received, the torque variations would predictively occur during the switching in the number of he poles in the induction motor (PCIM) unless the DC voltage applied across the PCIM inverter were increased, the system controller turns off the semiconductor switches S2 and S3 and commands the semiconductor switch S1 to perform the switching operation when the rotation speed of the induction motor (PCIM) comes near a rotation speed of Ncuu so that the chopper circuit applies the boosted DC voltage required for the PCIM inverter during the switching in the number of the poles. The rotation speed Ncuu from which the chopper circuit becomes effective is approximately determined according to the time duration required for the chopper circuit to boost the DC voltage.

When the Motor Rotation Speed is Decreased

In a case where the motor is driven above the rotation speed (the second threshold value) Ncd and the rotation speed is decreased so as to approach to a rotation speed of Ncdd, the system controller receiving the accelerator opening angle signal whose level is equal to or above the set value described above, the system controller turns off the semiconductor switches S2 and S3 and commands the semiconductor switch S1 to perform the switching operation so that the voltage boosting chopper circuit provides the boosted DC voltage required for the PCIM inverter during the switching in the number of the poles. The rotation speed Ncdd is approximately determined according to the time duration requiring the boosting operation of the chopper circuit in the same way as the determination of the above-described rotation speed of Ncuu.

Normal Driving

In cases of the normal driving where the accelerator opening angle signal is below the set value or the motor rotation speed is separated from the first and second threshold values Ncu and Ncd (or Ncuu and Ncdd), the system controller turns on the semiconductor switches S2 and S3 and turns off the semiconductor switch S1. Thus, the chopper circuit does not function and the current does not flow through the reactor L1. In addition, when the PCIM inverter operates the regeneration, the regenerative current flows through the semiconductor switch S3 and the diode D2 so that the regenerative power can be supplied to the DC battery.

Twelfth Embodiment

Figure 36:
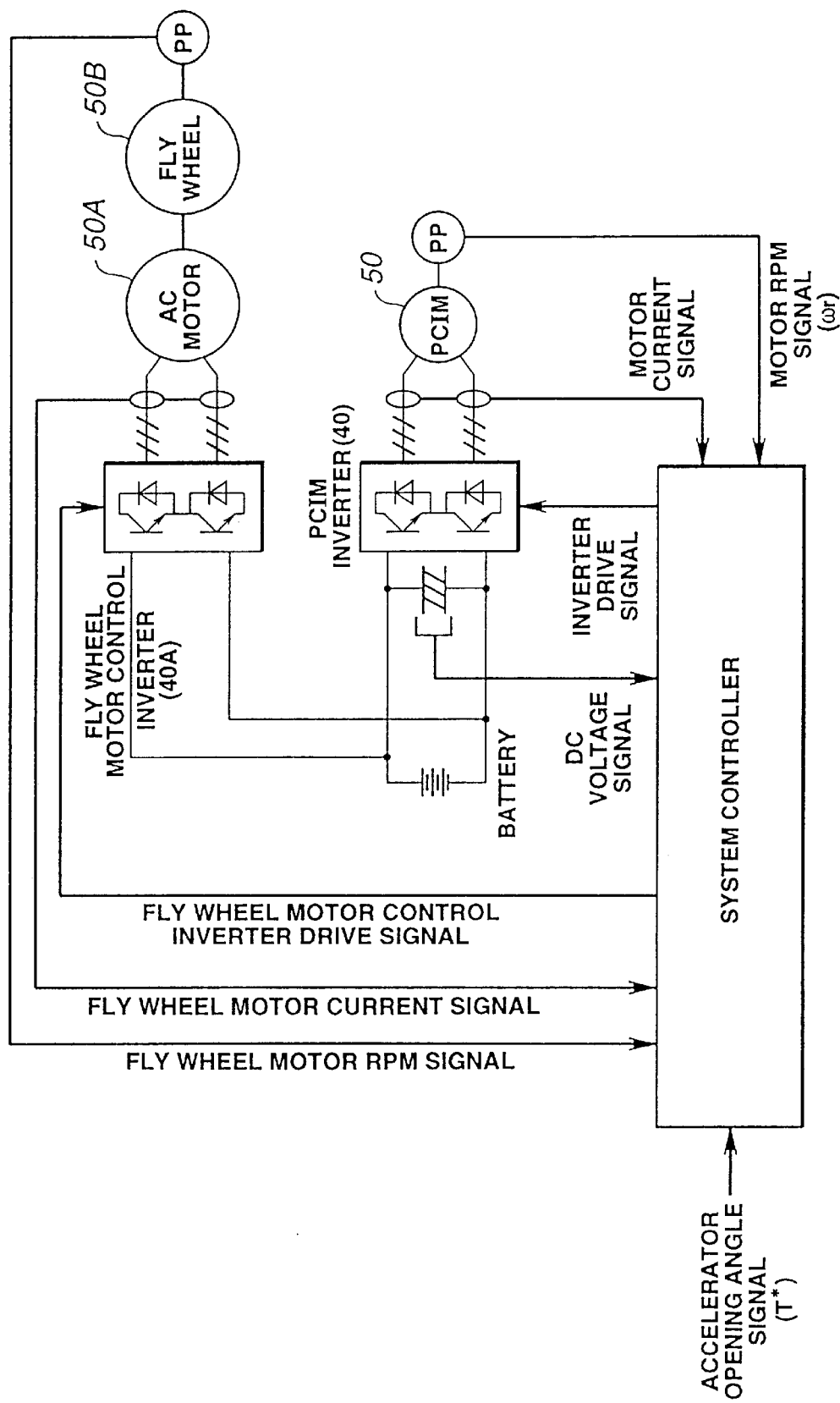
FIG. 36 is a circuit block diagram of a twelfth preferred embodiment of the control apparatus of the pole change induction motor according to the present invention.

FIG. 36 shows a twelfth preferred embodiment of the control apparatus for the pole change induction motor (PCIM) according to the present invention.

In the twelfth embodiment, the torque variation can be eliminated during the switching in the number of the poles by changing an operation mode of an energy storage unit constituted by a flywheel 50B according to the accelerator opening angle T* and motor rotation speed ($\omega r$).

As shown in FIG. 36, a flywheel motor control inverter 40A connected to an AC motor 50A associated with the flywheel 50B is installed in parallel to the battery. The system controller (for example, FIG. 29) receives: a rotation speed signal of the flywheel from a pulse generator PP associated with the flywheel 50B; a flywheel motor current signal from the current measuring instruments installed at the input ends of the AC motor 50A; the DC voltage signal across the capacitor across the PCIM inverter 40; the motor current signal from the current measuring instruments installed at the input ends of the PCIM 50; and the motor rotation speed signal from the pulse generator PP of the PCIM 50 and controls the flywheel motor controlling inverter drive signal and the PCIM inverter drive signal.

When the Rotation Speed of the Motor (PCIM) is Increased

In the same case as described in the eleventh embodiment, the operation mode of the flywheel motor controlling inverter 40A is changed to a voltage increase mode (in this mode, an energy is discharged from the flywheel) when the rotation speed of the motor (PCIM) is increased and reaches to the rotation speed of Ncuu so that the DC voltage across the PCIM inverter becomes the DC voltage required for the PCIM inverter 40 during the switching in the number of the poles. Thus, the torque variation which would occur at the rotation speed of Ncu at which the number of the poles is switched can be suppressed.

It is noted that the rotation speed of Ncdd at which the operation mode described above is changed is appropriately determined according to a time duration required for the energy storage unit using the flywheel to change the operation mode.

When the Rotation Speed is Decreased and Approached to the Rotation Speed of Ncd In the same case as described in the eleventh embodiment, the operation mode of the flywheel motor controlling inverter 40A is changed to the voltage increase mode when the rotation speed is decreased and approaches to the rotation speed of Ncdd so that the DC voltage becomes the DC voltage required for the PCIM inverter 40A during the change in the number of the poles. Thus, the torque variation which would occur at the rotation speed of Ncd at which the number of the poles is changed can be suppressed. The value of the rotation speed of Ncdd is determined in the same way as described in the case of Ncuu.

Normal Driving

In the normal driving case wherein the accelerator opening angle signal is below the set value or wherein the rotation speed of the motor is separated from the first and second threshold values (Ncu and Ncd) (or Ncuu and Ncdd), the system controller controls the flywheel motor controlling inverter so as to control the speed of the flywheel motor to store the energy required during the change (switch) in the number of the poles in the flywheel. At this time, the flywheel motor controlling inverter carries basically out the generation operation for the flywheel motor 50A. The generative energy is supplied from the DC battery and the regenerative power of the PCIM inverter 40.

Figure 37:
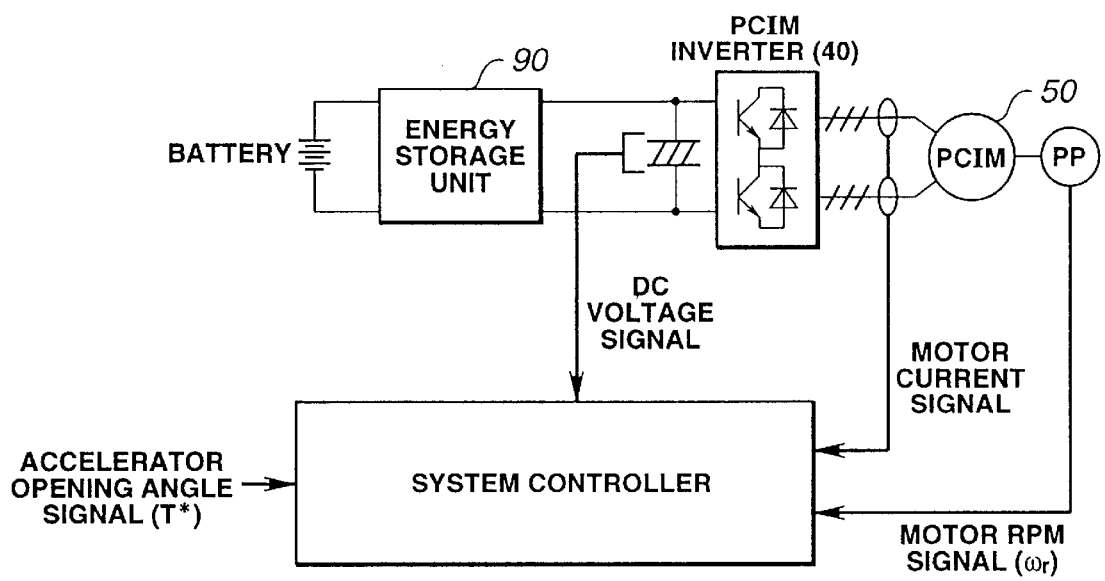
FIG. 37 is a circuit block diagram of an alternative of the twelfth preferred embodiment shown in FIG. 36.

FIG. 37 shows an alternative of the twelfth embodiment shown in FIG. 36.

In FIG. 37, the energy storage unit 90 is constituted by a superconductive coil or electric double-layer bath capacitor. Although the energy storage unit 90 shown in FIG. 37 is connected in parallel to the DC battery, the energy storage unit may be connected in series with the DC battery. The operation of the energy storage unit shown in FIG. 37 is the same as that described in the twelfth embodiment.

Simulations and Advantages

It is noted that FIG. 11C shows a system configuration of the inverter control unit 4 connected to both three-phase inverters INV (INV1 and INV2) (2, 3), e.g., shown in FIG. 6. The inverter control unit 4 shown in FIG. 11C includes a memory, I/O interface, CPU, and two gate ASICs (Application-Specific Integrated Circuits).

Figure 11D:
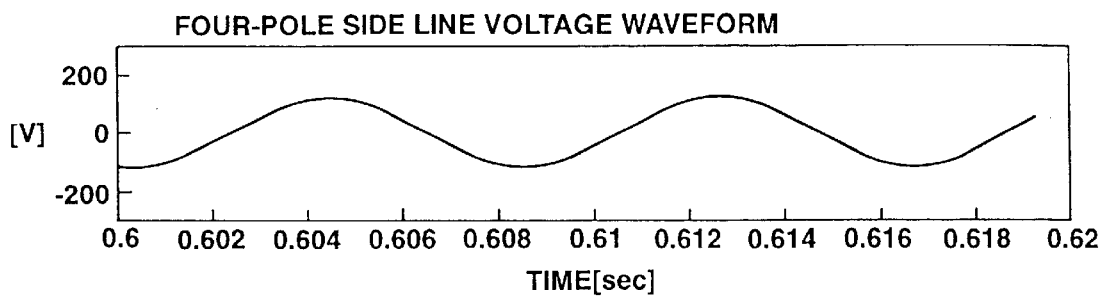
FIGS. 11D, 11E, 11F, 11G, 11H, 11I, 11J, 11K, and 11L are characteristic graphs as responses of a simulation of the control apparatus for the pole induction motor which is capable of changing the number of the poles between eight poles and four poles, e.g., as shown in FIG. 19.
Figure 11E:
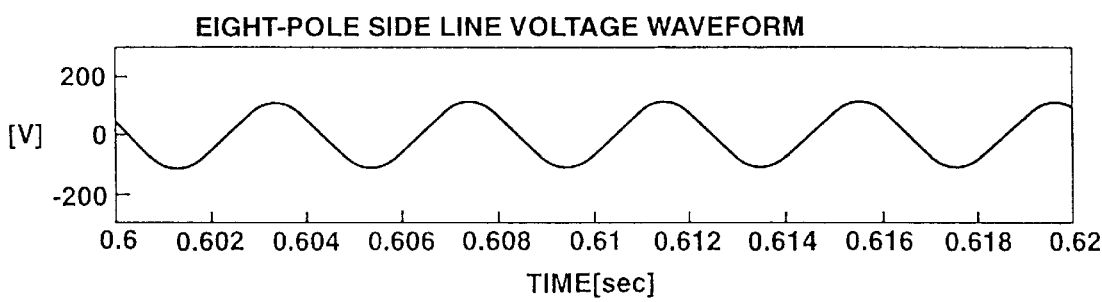
Figure 11F:
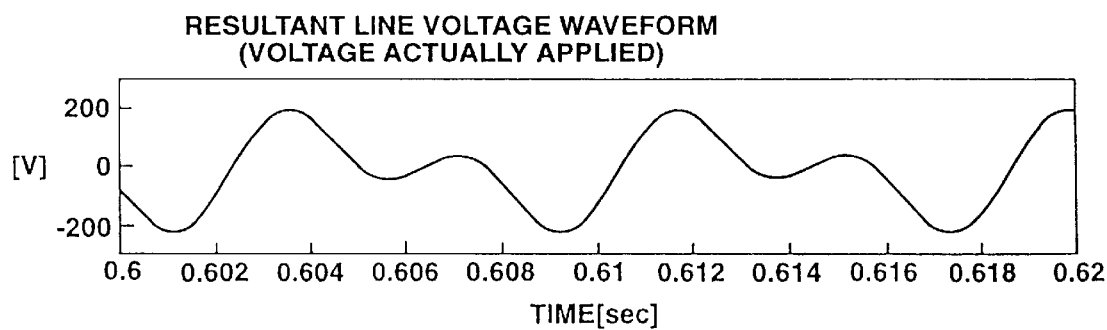

FIGS. 11D, 11E, and 11F show results of another simulation of the control apparatus for the pole change induction motor 50 capable of changing its number of the poles between four poles and eight poles shown in FIG. 19.

FIG. 11D shows the line voltage waveform when the number of the poles is four.

FIG. 11E shows the line voltage when the number of the poles is eight.

FIG. 11F shows a resultant line voltage waveform actually applied at a transient time when the number of the poles is changed between eight poles and four poles.

Figure 11G:
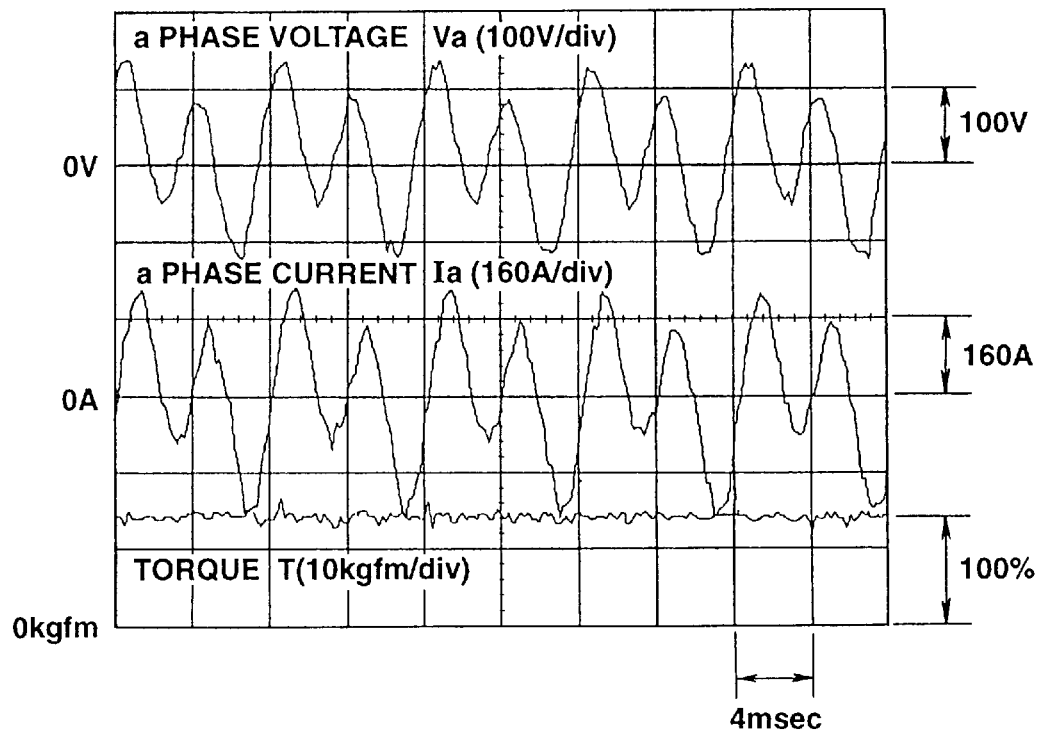

In addition, FIG. 11G shows the a (U1) phasevoltage waveform, the a phase current waveform, and output torque waveform of the motor 50 when the pole change motor 50 is driven simultaneously by the inverter 40 which is driven by both current control systems 2A and 2B during the change in the number of the poles (8→4, 4→8).

Figure 11H:
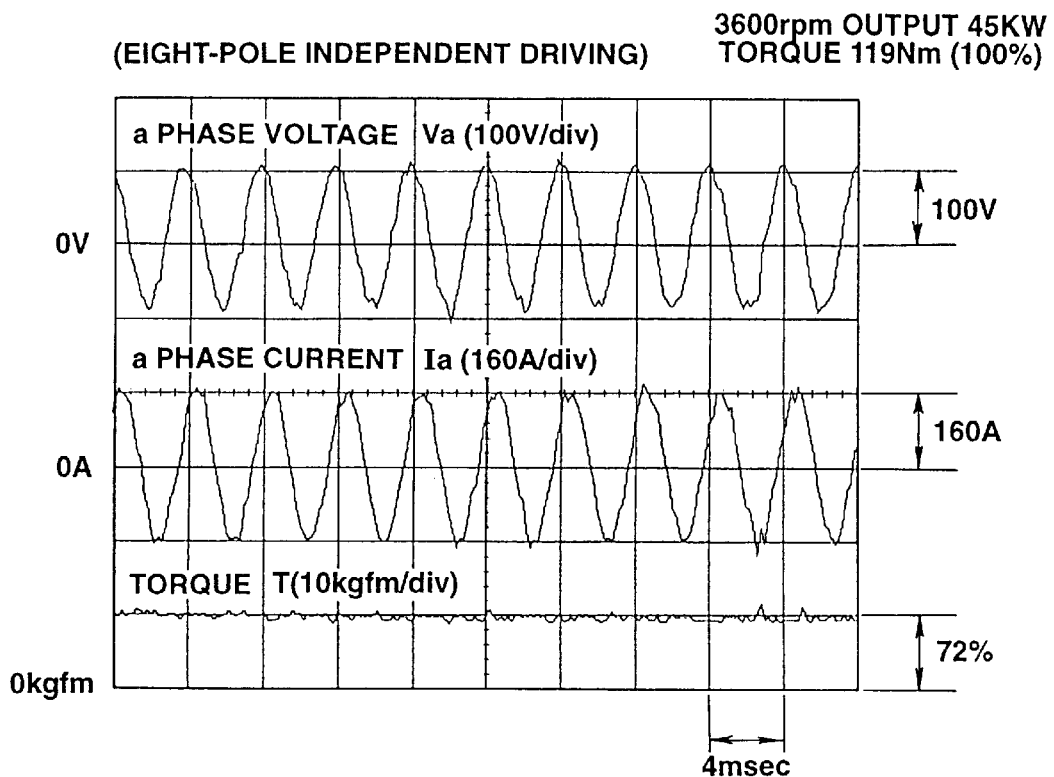

FIG. 11H shows the a phase voltage waveform, the a phase current waveform, and output motor torque waveform in a case when the inverter 40 is driven independently by the eight pole side current control system at the rotation speed of the pole change motor of 3600 (rpm), a rated output power of 45 KW, and the maximum torque Tm of 119 Nm.

Figure 11I:
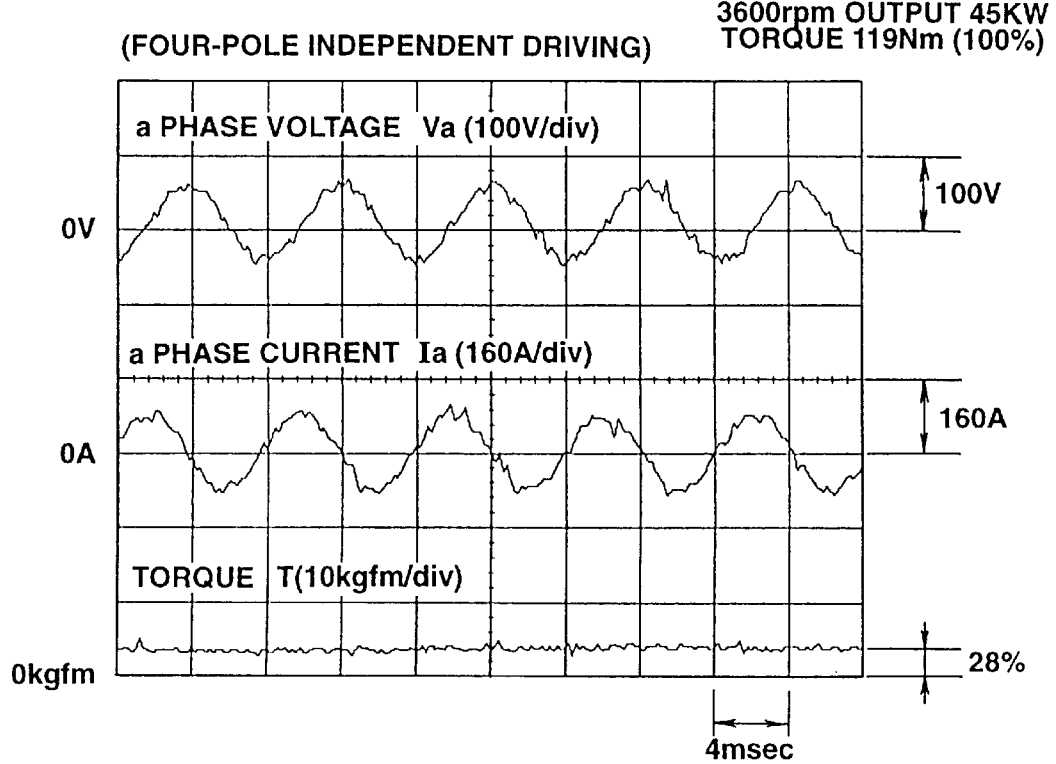

FIG. 11I shows the a phase voltage waveform, the a phase current waveform, and output motor torque waveform in a case when the inverter 40 is driven independently by the four-pole side current control system under the same conditions as those in FIG. 11H.

Figure 11J:
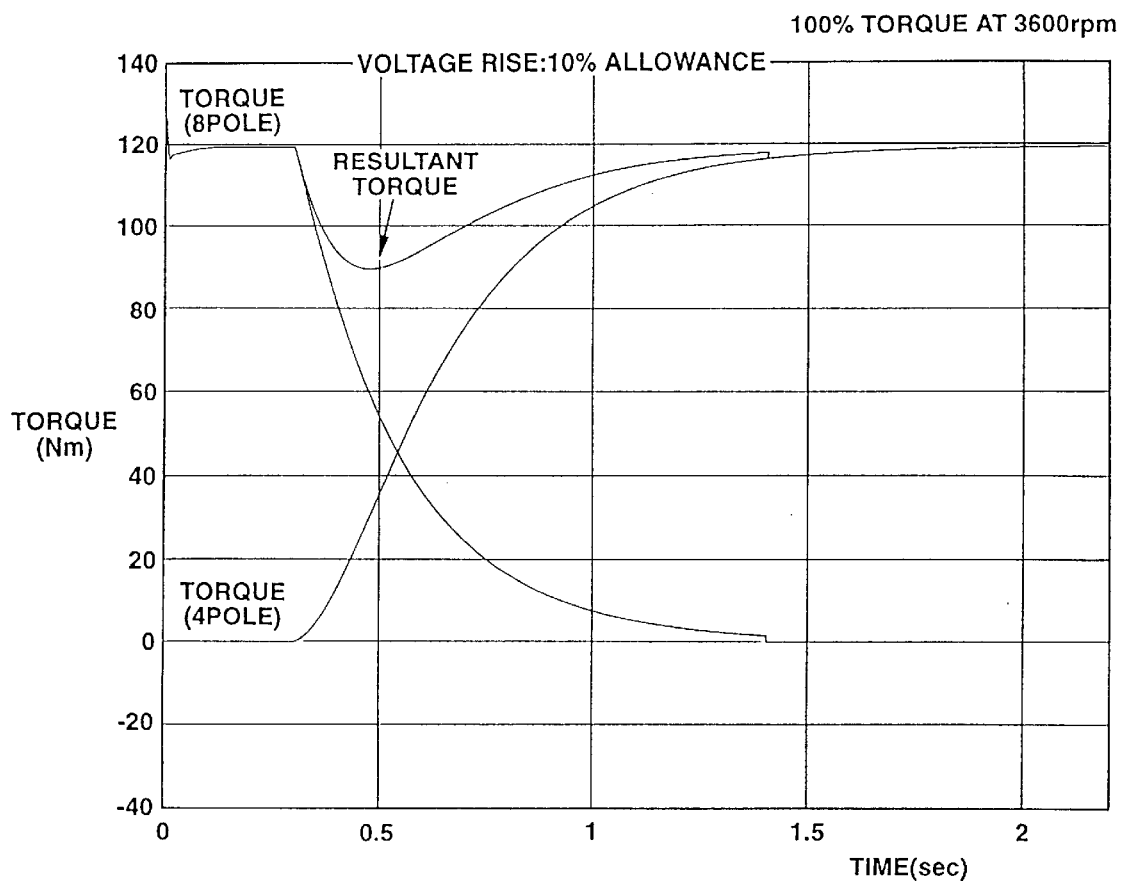

FIG. 11J shows the resultant torque waveform when the number of the poles is changed from four poles to eight poles at the rotation speed of the pole change motor of 3600 rpm with 100% torque instruction and voltage rise within 10% allowance level.

Figure 11K:
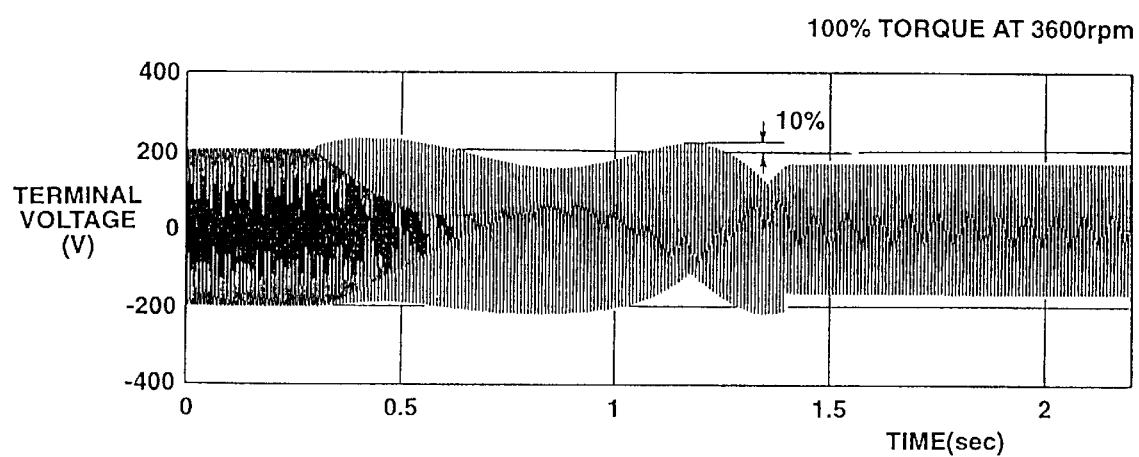

FIG. 11K shows the terminal voltage waveforms of the induction motor in the same situation as FIG. 11J.

Figure 11L:
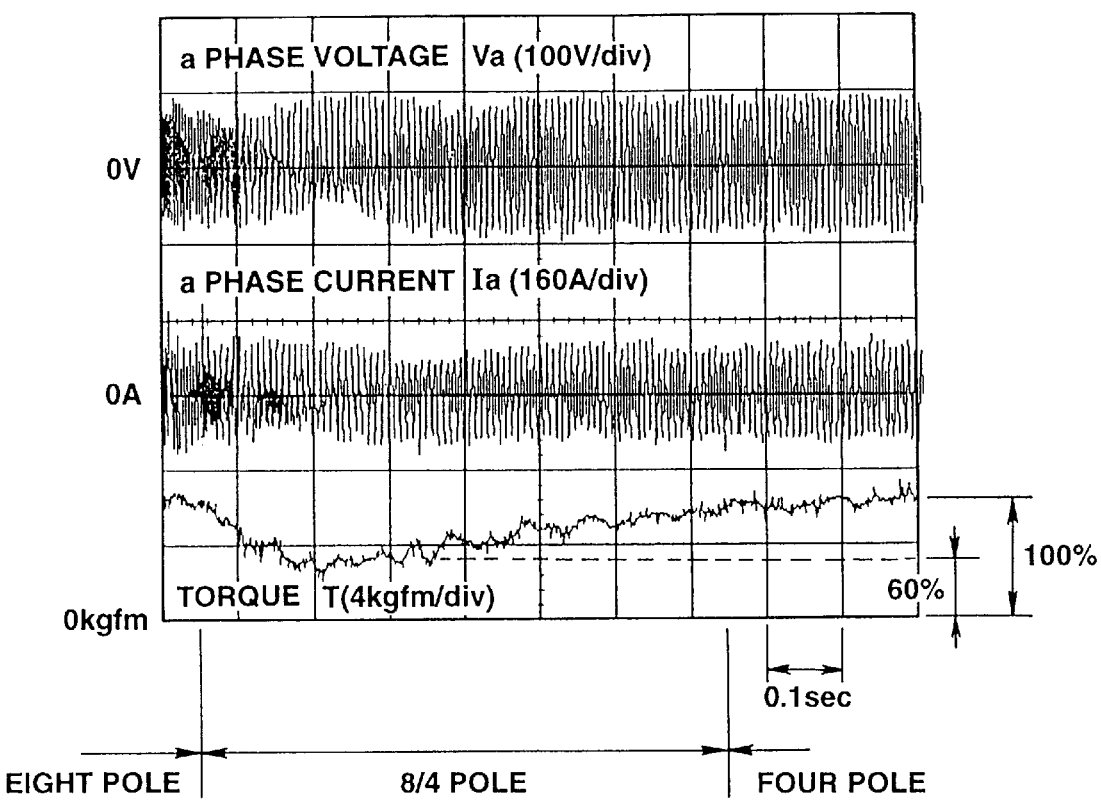

FIG. 11L shows the a phase voltage waveform, the a phase current waveform, and output torque waveform when the number of the poles is changed between eight poles and four poles.

FIG. 11M shows an application range in the constant output driving of the control apparatus for the pole change induction motor (PCIM) (oblique lines inclined downward to q right side of FIG. 11M) according to the present invention with respect to the conventional induction motor. As appreciated from FIG. 11M, the application range in the case of the present invention is such that the constant output range is equal to or above a ratio between the maximum rotation speed and the base speed of 1:2.5 and the output power is 30 KW or more.

The control apparatus of the pole change induction motor can be applied not only to the electric vehicle driving source but also to other industrial equipment such as a hoist, a main axle drive of a machine tool, or so forth.

Figure 11N:
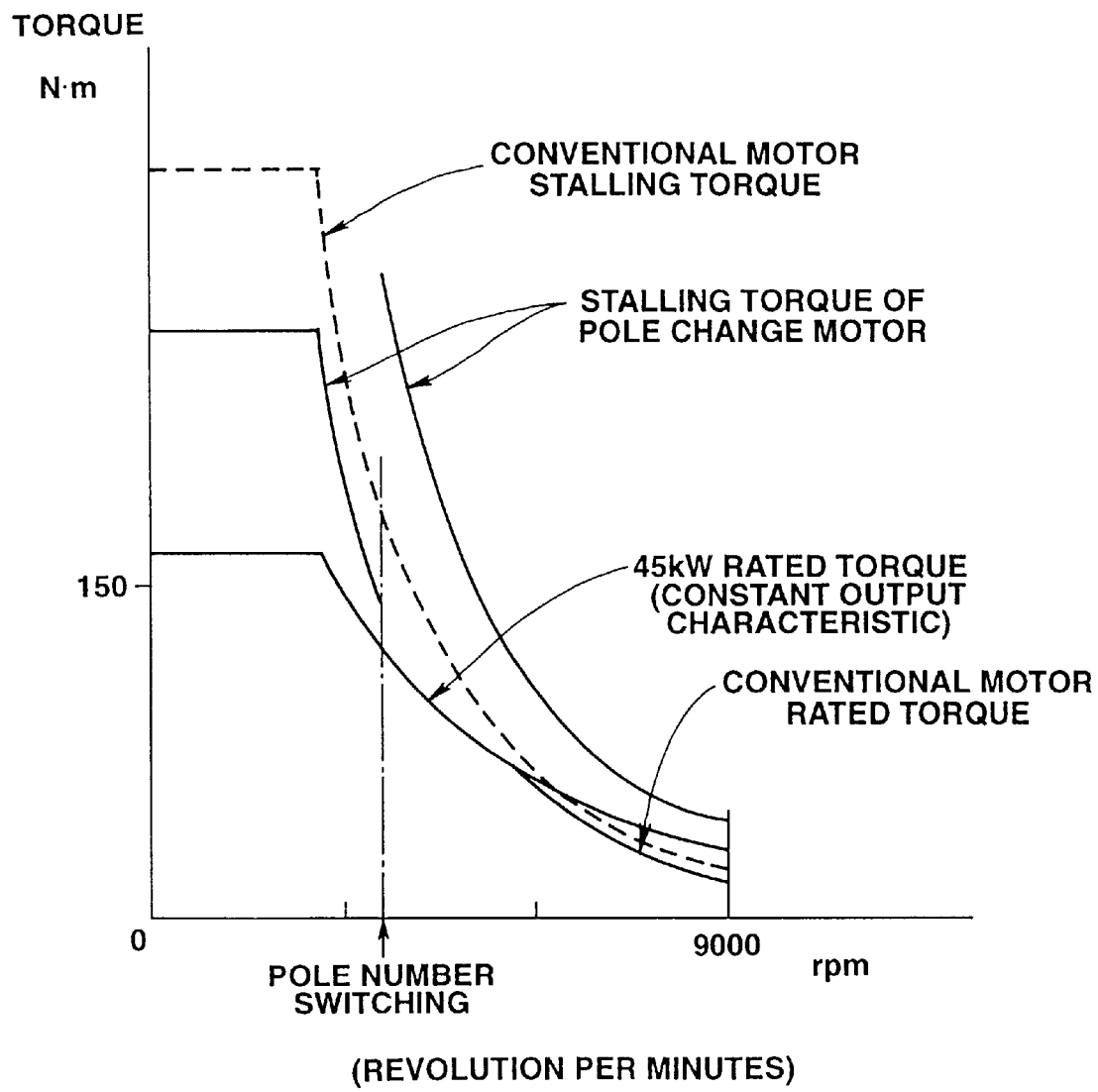
FIG. 11N is a characteristic graph representing stalling torques and rated torques in the case of the conventional induction motor and the pole change induction motor used in the control apparatus for the pole change induction motor according to the present invention.
Figure 110:
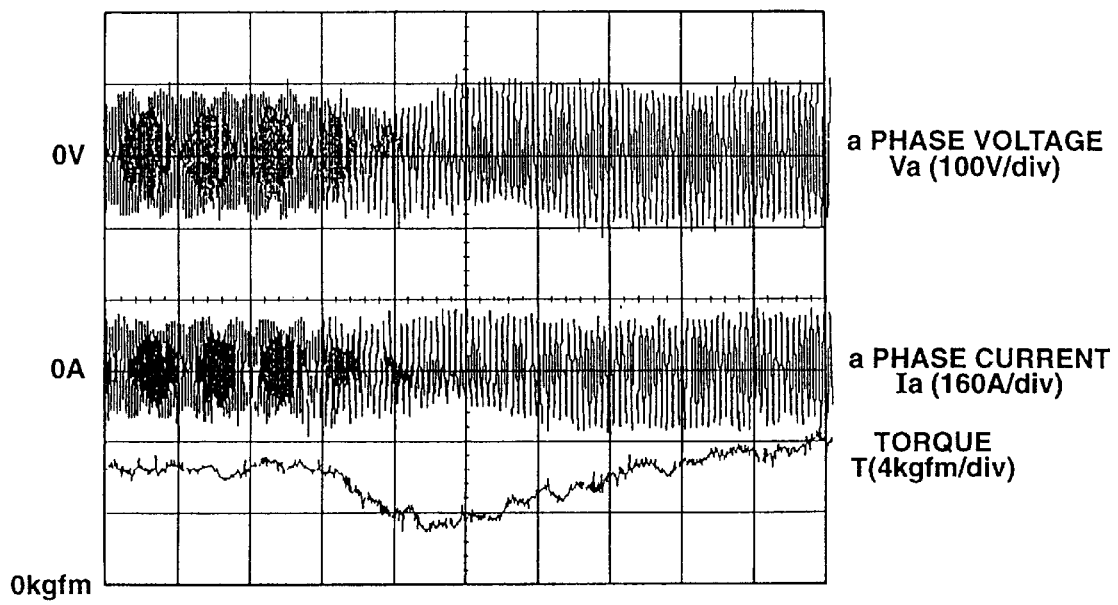

FIG. 11N shows stalling torque characteristics and rated torque characteristics in the case of the conventional induction motor and in the case of the pole change induction motor (PCIM) used in the control apparatus according to the present invention.

The pole change induction motor in the case of the present invention can be small sized since in the case where the conventional motor has four poles and the pole change motor is capable of changing its number of the poles between eight and four poles, a yoke thickness of the stator can be thinned by about half the conventional four pole induction motor and a coil end length can be shortened by about 70%. This small sizing is equally applied to the four-to-two pole change induction motor. As shown in FIG. 11N, the motor stalling torque after the change in the number of the poles from the greater number of the poles to the less number of the poles is about twice that before the change in the number of the poles.

It is noted that FIG. 11O shows the a phase voltage waveform, the a phase current waveform, and the torque waveform when the unit of the torque axis is changed from that in the case of FIG. 11L.

It is noted that the conventional induction motor and the conventional vector control apparatus for the conventional induction motor is exemplified by a U.S. Pat. No. 5,444,351 issued on Aug. 22, 1995, the disclosure of which is herein incorporated by reference.

It is also noted that A and B in FIG. 14 denote the lead (leading) terminals connected to the corresponding terminals, namely A to A and B to B.

TABLE 1

| FOUR POLES | TWO POLES |
|---|---|
| U$_1$ → U | U$_1$ → U |
| V$_1$ → V | V$_1$ → W |
| W$_1$ → W | W$_1$ → V |
| U$_2$ → U | U$_2$ → -U |
| V$_2$ → V | V$_2$ → -W |
| W$_2$ → W | W$_2$ → -V |

TABLE 2

$$U_1 = K_1(t) \cdot A \cdot \sin(\omega t) + K_2(t) \cdot A \cdot \sin\left(\frac{\omega}{2}\right)t$$

$$V_1 = K_1(t) \cdot A \cdot \sin\left(\omega t - \frac{2}{3}\pi\right) + K_2(t) \cdot A \cdot \sin\left(\frac{\omega}{2}t - \frac{4}{3}\pi\right)$$

$$W_1 = K_1(t) \cdot A \cdot \sin\left(\omega t - \frac{4}{3}\pi\right) + K_2(t) \cdot A \cdot \sin\left(\frac{\omega}{2}t - \frac{2}{3}\pi\right)$$

$$U_2 = K_1(t) \cdot A \cdot \sin(\omega t) - K_2(t) \cdot A \cdot \sin\left(\frac{\omega}{2}t\right)$$

$$V_2 = K_1(t) \cdot A \cdot \sin\left(\omega t - \frac{2}{3}\pi\right) - K_2(t) \cdot A \cdot \sin\left(\frac{\omega}{2}t - \frac{4}{3}\pi\right)$$

$$W_2 = K_1(t) \cdot A \cdot \sin\left(\omega t - \frac{4}{3}\pi\right) - K_2(t) \cdot A \cdot \sin\left(\frac{\omega}{2}t - \frac{2}{3}\pi\right)$$

WHEREIN,

TABLE 2-continued $K_1(t) = \sqrt{1 - t/T}$ (DURING LOW-TO-HIGH SPEED CHANGE)

$\begin{cases} K_1(t) = 1 & \text{IF THE SPEED IS BELOW PRE} \\ K_1(t) = 0 & \text{IF } t/T \geq 1 \end{cases}$ $K_1(t) = \sqrt{t/T}$ (DURING HIGH-TO-LOW SPEED CHANGE)

$\begin{cases} K_1(t) = 0 & \text{IF THE SPEED IS BELOW PRE} \\ K_1(t) = 1 & \text{IF } t/T \geq 1 \end{cases}$ $K_2(t) = \sqrt{t/T}$ (DURING LOW-TO-HIGH SPEED CHANGE)

$\begin{cases} K_2(t) = 0 & \text{IF THE SPEED IS BELOW PRE} \\ K_2(t) = 1 & \text{IF } t/T \geq 1 \end{cases}$ $K_2(t) = \sqrt{1 - t/T}$ (DURING LOW-TO-HIGH SPEED CHANGE)

$\begin{cases} K_2(t) = 1 & \text{IF THE SPEED IS BELOW PRE} \\ K_2(t) = 0 & \text{IF } t/T \geq 1 \end{cases}$ $K_1(t)$, $K_2(t)$: PEAK VALUE CORRECTION FUNCTION
T: SWITCHING TIME DURATION IN THE DRIVING RANGE
$\omega$: ANGULAR VELOCITY
A: PEAK VALUE
t: TIME (TIME TAKEN FROM THE SWITCHING START)

TABLE 3

$$U_1 = K_1(t) \cdot A \cdot \sin(\omega t) + K_2(t) \cdot A \cdot \sin\left(\frac{\omega}{2}\right)t$$

$$V_1 = K_1(t) \cdot A \cdot \sin\left(\omega t - \frac{2}{3}\pi\right) + K_2(t) \cdot A \cdot \sin\left(\frac{\omega}{2}t - \frac{4}{3}\pi\right)$$

$$W_1 = K_1(t) \cdot A \cdot \sin\left(\omega t - \frac{4}{3}\pi\right) + K_2(t) \cdot A \cdot \sin\left(\frac{\omega}{2}t - \frac{2}{3}\pi\right)$$

$$U_2 = K_1(t) \cdot A \cdot \sin(\omega t) - K_2(t) \cdot A \cdot \sin\left(\frac{\omega}{2}t\right)$$

$$V_2 = K_1(t) \cdot A \cdot \sin\left(\omega t - \frac{2}{3}\pi\right) - K_2(t) \cdot A \cdot \sin\left(\frac{\omega}{2}t - \frac{4}{3}\pi\right)$$

$$W_2 = K_1(t) \cdot A \cdot \sin\left(\omega t - \frac{4}{3}\pi\right) - K_2(t) \cdot A \cdot \sin\left(\frac{\omega}{2}t - \frac{2}{3}\pi\right)$$

WHEREIN, $K_1(t) = e^{-\frac{t}{T_1}}$ (DURING SWITCHING FROM LOW-TO-HIGH SPEED)

$\begin{cases} K_1(t) = 1 & \text{IF BELOW PRE} \\ K_1(t) = 0 & \text{IF } t/T_1 \geq 1 \end{cases}$ $K_1(t) = 1 - e^{-\frac{t}{T_1}}$ (DURING SWITCHING FROM HIGH-TO-LOW SPEED)

$\begin{cases} K_1(t) = 0 & \text{IF BELOW PRE} \\ K_1(t) = 1 & \text{IF } t/T_1 \geq 1 \end{cases}$ TABLE 3-continued $K_2(t) = 1 - e^{-\frac{t}{T_2}}$ (DURING SWITCHING FROM LOW-TO-HIGH SPEED)

$$\begin{cases} K_2(t) = 0 & \text{IF BELOW PRE} \\ K_2(t) = 1 & \text{IF } t/T_2 \geq 1 \end{cases}$$

$K_2(t) = e^{-\frac{t}{T_2}}$ (DURING SWITCHING FROM LOW-TO-HIGH SPEED)

$$\begin{cases} K_2(t) = 1 & \text{IF ABOVE PRE} \\ K_2(t) = 0 & \text{IF } t/T_2 \geq 1 \end{cases}$$

$K_1(t)$, $K_2(t)$: PEAK VALUE CORRECTION FUNCTION
$T_1$: A TIME VALUE EQUAL TO OR ABOVE MOTOR SECONDARY TIME CONSTANT DURING LOW-SPEED DRIVING
$T_2$: A TIME VALUE EQUAL TO OR ABOVE MOTOR SECONDARY TIME CONSTANT DURING HIGH-SPEED DRIVING
ω: ANGULAR VELOCITY
A: PEAK VALUE
t: TIME (TIME DURATION TAKEN FROM THE SWITCHING START)
e: BASE OF NATURAL LOGARITHM

TABLE 4

$U_1 = K_1(t) \cdot A \cdot \sin(\omega t) + K_2(t) \cdot A \cdot \sin\left(\frac{\omega}{2}\right)t$ $V_2 = K_1(t) \cdot A \cdot \sin\left(\omega t - \frac{2}{3}\pi\right) + K_2(t) \cdot A \cdot \sin\left(\frac{\omega}{2}t - \frac{1}{3}\pi\right)$ $W_1 = K_1(t) \cdot A \cdot \sin\left(\omega t - \frac{4}{3}\pi\right) + K_2(t) \cdot A \cdot \sin\left(\frac{\omega}{2}t - \frac{2}{3}\pi\right)$ $U_2 = K_1(t) \cdot A \cdot \sin(\omega t - 2\pi) + K_2(t) \cdot A \cdot \sin\left(\frac{\omega}{2}t - \frac{3}{3}\pi\right)$ $V_1 = K_1(t) \cdot A \cdot \sin\left(\omega t - \frac{8}{3}\pi\right) + K_2(t) \cdot A \cdot \sin\left(\frac{\omega}{2}t - \frac{4}{3}\pi\right)$ $W_2 = K_1(t) \cdot A \cdot \sin\left(\omega t - \frac{10}{3}\pi\right) + K_2(t) \cdot A \cdot \sin\left(\frac{\omega}{2}t - \frac{5}{3}\pi\right)$

WHEREIN, $K_1(t) = \sqrt{1 - t/T}$ (DURING LOW-TO-HIGH SPEED CHANGE)

$$\begin{cases} K_1(t) = 1 & \text{IF THE SPEED IS BELOW PRE} \\ K_1(t) = 0 & \text{IF } t/T \geq 1 \end{cases}$$

$K_1(t) = \sqrt{t/T}$ (DURING HIGH-TO-LOW SPEED CHANGE)

$$\begin{cases} K_1(t) = 0 & \text{IF THE SPEED IS BELOW PRE} \\ K_1(t) = 1 & \text{IF } t/T \geq 1 \end{cases}$$

$K_2(t) = \sqrt{t/T}$ (DURING LOW-TO-HIGH SPEED CHANGE)

$$\begin{cases} K_2(t) = 0 & \text{IF THE SPEED IS BELOW PRE} \\ K_2(t) = 1 & \text{IF } t/T \geq 1 \end{cases}$$

TABLE 4-continued $K_2(t) = \sqrt{1 - t/T}$ (DURING LOW-TO-HIGH SPEED CHANGE)

$$\begin{cases} K_2(t) = 1 & \text{IF THE SPEED IS BELOW PRE} \\ K_2(t) = 0 & \text{IF } t/T \geq 1 \end{cases}$$

$K_1(t)$, $K_2(t)$: PEAK VALUE CORRECTION FUNCTION
T: SWITCHING TIME DURATION IN THE DRIVING RANGE
ω: ANGULAR VELOCITY
A: PEAK VALUE
t: TIME (TIME TAKEN FROM THE SWITCHING START)

TABLE 5

$U_1 = K_1(t) \cdot A \cdot \sin(\omega t) + K_2(t) \cdot A \cdot \sin\left(\frac{\omega}{2}\right)t$ $V_2 = K_1(t) \cdot A \cdot \sin\left(\omega t - \frac{2}{3}\pi\right) + K_2(t) \cdot A \cdot \sin\left(\frac{\omega}{2}t - \frac{1}{3}\pi\right)$ $W_1 = K_1(t) \cdot A \cdot \sin\left(\omega t - \frac{4}{3}\pi\right) + K_2(t) \cdot A \cdot \sin\left(\frac{\omega}{2}t - \frac{2}{3}\pi\right)$ $U_2 = K_1(t) \cdot A \cdot \sin(\omega t - 2\pi) + K_2(t) \cdot A \cdot \sin\left(\frac{\omega}{2}t - \frac{3}{3}\pi\right)$ $V_1 = K_1(t) \cdot A \cdot \sin\left(\omega t - \frac{8}{3}\pi\right) + K_2(t) \cdot A \cdot \sin\left(\frac{\omega}{2}t - \frac{4}{3}\pi\right)$ $W_2 = K_1(t) \cdot A \cdot \sin\left(\omega t - \frac{10}{3}\pi\right) + K_2(t) \cdot A \cdot \sin\left(\frac{\omega}{2}t - \frac{5}{3}\pi\right)$

WHEREIN, $K_1(t) = e^{-\frac{t}{T_1}}$ (DURING SWITCHING FROM LOW-TO-HIGH SPEED)

$$\begin{cases} K_1(t) = 1 & \text{IF BELOW PRE} \\ K_1(t) = 0 & \text{IF } t/T_1 \geq 1 \end{cases}$$

$K_1(t) = 1 - e^{-\frac{t}{T_1}}$ (DURING SWITCHING FROM HIGH-TO-LOW SPEED)

$$\begin{cases} K_1(t) = 0 & \text{IF BELOW PRE} \\ K_1(t) = 1 & \text{IF } t/T_1 \geq 1 \end{cases}$$

$K_2(t) = 1 - e^{-\frac{t}{T_2}}$ (DURING SWITCHING FROM LOW-TO-HIGH SPEED)

$$\begin{cases} K_2(t) = 0 & \text{IF BELOW PRE} \\ K_2(t) = 1 & \text{IF } t/T_2 \geq 1 \end{cases}$$

TABLE 5-continued $K_2(t) = e^{-\frac{t}{T_2}}$ (DURING SWITCHING FROM HIGH-TO-LOW SPEED)

$\begin{cases} K_2(t) = 1 & \text{IF ABOVE PRE} \\ K_2(t) = 0 & \text{IF } t/T_2 \geq 1 \end{cases}$ $K_1(t), K_2(t)$: PEAK VALUE CORRECTION FUNCTION
$T_1$: A TIME VALUE EQUAL TO OR ABOVE MOTOR SECONDARY TIME CONSTANT DURING LOW-SPEED DRIVING
$T_2$: A TIME VALUE EQUAL TO OR ABOVE MOTOR SECONDARY TIME CONSTANT DURING HIGH-SPEED DRIVING
ω: ANGULAR VELOCITY
A: PEAK VALUE
t: TIME (TIME DURATION TAKEN FROM THE SWITCHING START)
e: BASE OF NATURAL LOGARITHM

TABLE 6

|     |      |     | ds1        | qs1      | dr1        | qr1       |     |      |
|-----|------|-----|------------|----------|------------|-----------|-----|------|
| ds1 | Vds1 | ds1 | Rs + Rm1   | −ω1Ls1   | Rm1        | −ω1Msr1   | ds1 | Ids1 |
| qs1 | Vqs1 | qs1 | ω1Ls1      | Rs + Rm1 | ω1Msr1     | Rm1       | qs1 | Iqs1 |
|     |      |     |            |          | =          |           |     |      |
| dr1 |      | dr1 | s1Rm1      | −s1ω1Msr1| Rr1 + s1Rm1| −s1ω1Lr1  | dr1 | Idr1 |
| qr1 |      | qr1 | s1ω1Msr1   | s1Rm1    | s1ω1Lr1    | Rs1 + s1Rm1| qr1| Iqr1 |

TABLE 7

|     |      |     | ds2        | qs2      | dr2        | qr2       |     |      |
|-----|------|-----|------------|----------|------------|-----------|-----|------|
| ds2 | Vds2 | ds2 | Rs + Rm2   | −ω2Ls2   | Rm2        | −ω2Msr2   | ds2 | Ids2 |
| qs2 | Vqs2 | qs2 | ω2Ls2      | Rs + Rm2 | ω2Msr2     | Rm2       | qs2 | Iqs2 |
|     |      |     |            |          | =          |           |     |      |
| dr2 |      | dr2 | s2Rm2      | −s2ω2Msr2| Rr2 + s2Rm2| −s2ω2Lr2  | dr2 | Idr2 |
| qr2 |      | qr2 | s2ω2Msr2   | s2Rm2    | s2ω2Lr2    | Rs2 + s2Rm2| qr2| Iqr2 |

TABLE 8

$$\begin{bmatrix} Va^* \\ Vb^* \\ Vc^* \\ Vd^* \\ Ve^* \\ Vf^* \end{bmatrix} = \begin{bmatrix} \cos\theta s1 & -\sin\theta s1 & \cos\theta s2 & -\sin\theta s2 \\ \cos\left(\theta s1 - \frac{\pi}{3}\right) & -\sin\left(\theta s1 - \frac{\pi}{3}\right) & \cos\left(\theta s2 - \frac{2}{3}\pi\right) & -\sin\left(\theta s2 - \frac{4}{3}\pi\right) \\ \cos\left(\theta s1 - \frac{2}{3}\pi\right) & -\sin\left(\theta s1 - \frac{2}{3}\pi\right) & \cos\left(\theta s2 - \frac{4}{3}\pi\right) & -\sin\left(\theta s2 - \frac{4}{3}\pi\right) \\ \cos\left(\theta s1 - \frac{3}{3}\pi\right) & -\sin\left(\theta s1 - \frac{3}{3}\pi\right) & \cos\theta s2 & -\sin\theta s2 \\ \cos\left(\theta s1 - \frac{4}{3}\pi\right) & -\sin\left(\theta s1 - \frac{4}{3}\pi\right) & \cos\left(\theta s2 - \frac{2}{3}\pi\right) & -\sin\left(\theta s2 - \frac{2}{3}\pi\right) \\ \cos\left(\theta s1 - \frac{5}{3}\pi\right) & -\sin\left(\theta s1 - \frac{5}{3}\pi\right) & \cos\left(\theta s2 - \frac{4}{3}\pi\right) & -\sin\left(\theta s2 - \frac{4}{3}\pi\right) \end{bmatrix} \begin{bmatrix} Vds1^* \\ Vqs1^* \\ Vds2^* \\ Vqs2^* \end{bmatrix}$$

TABLE 9

| | dr1 | qr1 | dr2 | qr2 | |
|---|---|---|---|---|---|
| $Vg^*$ | $\cos\theta r1$ | $-\sin\theta r1$ | $\cos\theta r2$ | $-\sin\theta r2$ | $Vds1^*$ |
| $Vh^*$ | $\cos\left(\theta r1 - \frac{\pi}{3}\right)$ | $-\sin\left(\theta r1 - \frac{\pi}{3}\right)$ | $\cos\left(\theta r2 - \frac{2}{3}\pi\right)$ | $-\sin\left(\theta r2 - \frac{4}{3}\pi\right)$ | $Vqs1^*$ |
| $Vi^*$ | $\cos\left(\theta r1 - \frac{2}{3}\pi\right)$ | $-\sin\left(\theta r1 - \frac{2}{3}\pi\right)$ | $\cos\left(\theta r2 - \frac{4}{3}\pi\right)$ | $-\sin\left(\theta r2 - \frac{4}{3}\pi\right)$ | $Vds2^*$ |
| $Vj^*$ = | $\cos\left(\theta r1 - \frac{3}{3}\pi\right)$ | $-\sin\left(\theta r1 - \frac{3}{3}\pi\right)$ | $\cos\theta r2$ | $-\sin\theta r2$ | $Vqs2^*$ |
| $Vk^*$ | $\cos\left(\theta r1 - \frac{4}{3}\pi\right)$ | $-\sin\left(\theta r1 - \frac{4}{3}\pi\right)$ | $\cos\left(\theta r2 - \frac{2}{3}\pi\right)$ | $-\sin\left(\theta r2 - \frac{2}{3}\pi\right)$ | |
| $Vl^*$ | $\cos\left(\theta r1 - \frac{5}{3}\pi\right)$ | $-\sin\left(\theta r1 - \frac{5}{3}\pi\right)$ | $\cos\left(\theta r2 - \frac{4}{3}\pi\right)$ | $-\sin\left(\theta r2 - \frac{4}{3}\pi\right)$ | |

TABLE 10

MOTOR CONSTANTS

| | FOUR POLE DRIVING | EIGHT POLE DRIVING |
|---|---|---|
| PRIMARY RESISTANCE | Rs1: 1.762 (Ω) | Rs2: 1.762 (Ω) |
| SECONDARY RESISTANCE | Rr1: 0.835 (Ω) | Rr2: 1.293 (Ω) |
| PRIMARY SELF INDUCTANCE | Ls1: 0.140 (mH) | Ls2: 0.0529 (mH) |
| SECONDARY SELF INDUCTANCE | Lr1: 0.138 (mH) | Lr2: 0.0512 (mH) |
| MUTUAL INDUCTANCE | M1: 0.136 (mH) | M2: 0.0482 (mH) |
| LEAKAGE INDUCTANCE | Lσ1: 0.00589 (mH) | Lσ2: 0.00753 (mH) |
| SECONDARY TIME CONSTANT | Tr1: 0.165 (sec) | Tr2: 0.0396 (sec) |

What is claimed is:

1. An apparatus comprising:
(a) a pole change induction motor adapted to change its number of poles between an n number of poles and a 2n number of poles, wherein n is equal to one of 2 and 4, and having stator windings, the stator windings including six lead terminals;
(b) inverter means for providing frequency controlled three-phase powers for two groups of said stator windings, each of the two groups comprising one of two groups of lead terminals, each group of lead terminals having three lead terminals;
(c) measuring means for measuring a rotation speed of the pole change induction motor; and
(d) controlling means for receiving the measured rotation speed (ωr) of said pole change induction motor and a speed instruction (ωr*), and controlling output phases derived from said inverter means to the stator windings via each of the two groups of lead terminals to provide one of
  (i) the same phases for the outputs of said inverter means; and
  (ii) phases of the output of the inverter means such that each phase of the outputs at respective phases of said inverter means is shifted sequentially by $2\pi/3$ for the two groups of lead terminals when said induction motor is driven in a constant power operation range and the rotation speed of the motor falls in a low speed range below a predetermined rotation speed, whereby the induction motor is driven with the number of poles being changed to the 2n number of poles.

2. An apparatus as claimed in claim 1, wherein n is equal to 2 and wherein said controlling means controls said inverter means to output voltage control signals in accordance with the following equations, the output phases and frequencies of said inverter means being switched during a switching between high speed driving in which the rotation speed of said induction motor falls in the high speed range and low speed driving in which the rotation speed of said induction motor falls in the low speed range, $U1 = K_1(t) \cdot A \cdot \sin(\omega t) + K_2(t) \cdot A \cdot \sin(\omega/2)t$, $V1 = K_1(t) \cdot A \cdot \sin(\omega t - 2/3 \cdot \pi) + K_2(t) \cdot A \cdot \sin(\omega/2t - 4/3 \cdot \pi)$, $W1 = K_1(t) \cdot A \cdot \sin(\omega t - 4/3 \cdot \pi) + K_2(t) \cdot A \cdot \sin(\omega t/2 - 2/3 \cdot \pi)$ $U2 = K_1(t) \cdot A \cdot \sin(\omega t) - K_2(t) \cdot A \cdot \sin(\omega/2 - t)$, $V2 = K_1(t) \cdot A \cdot \sin(\omega t - 2/3 \cdot \pi) - K_2(t) \cdot A \cdot \sin(\omega/2 \cdot t - 2/3 \cdot \pi) - K_2(t) \cdot A \cdot \sin(\omega/2 \cdot t - 4/3 \cdot \pi)$, and $W2 = K_1(t) \cdot A \cdot \sin(\omega t - 4/3 \cdot \pi) + K_2(t) \cdot A \cdot \sin(\omega t/2 - 2/3 \cdot \pi)$ wherein $K_1(t) = \sqrt{(1-t/T)}$, during the low-to-high speed change, $K_1(t) = 1$, if the speed is below PRE, and $K_1(t) = 0$, if $t/T \geq 1$, $K_1(t) = \sqrt{(t/T)}$, during the high-to-low speed change, $K_1(t) = 0$, if the speed is below PRE, and $K_1(t) = 1$, if $t/T \geq 1$, $K_2(t) = \sqrt{(t/T)}$ during the low-to-high speed change, $K_2(t) = 0$, if the speed is below PRE, and $K_2(t) = 1$, if $t/T \geq 1$, $k_2(t) = \sqrt{(1-t/T)}$, during the high-to-low speed change, $K_2(t) = 1$, if the speed is below PRE and $K_2(t) = 0$, if $t/T \geq 1$, and wherein $K_1(t)$ and $K_2(t)$ denote peak value correction functions, T denotes a switching time duration in the driving range, ω denotes an angular velocity, A denotes a peak value, and t denotes a time taken from the switching start.

3. An apparatus as claimed in claim 1, wherein n is equal to 2 and wherein said controlling means controls said inverter means to output voltage control signals in accordance with the following equations, the output phases and frequencies of said inverter means being switched during a switching between high speed driving in which the rotation speed of said induction motor falls in the high speed range and low speed driving in which the rotation speed of said induction motor falls in the low speed range, $U1 = K_1(t) \cdot A \cdot \sin(\omega t) + K_2(t) \cdot A \cdot \sin(\omega/2)t,$ $V1 = K_1(t) \cdot A \cdot \sin(\omega t - 2/3 \cdot \pi) + K_2(t) \cdot A \cdot \sin(\omega/2t\ 4/3 - 4/3 \cdot \pi),$ $W1 = K_1(t) \cdot A \cdot \sin(\omega t - 4/3 \cdot \pi) + K_2(t) \cdot A \cdot \sin(\omega t/2 - 2/3 \cdot \pi)$ $U2 = K_1(t) \cdot A \cdot \sin(\omega t) - K_2(t) \cdot A \cdot \sin(\omega/2 \cdot t),$ $V2 = K_1(t) \cdot A \cdot \sin(\omega t - 2/3 \cdot \pi) - K_2(t) \cdot A \cdot \sin(\omega/2 \cdot t - 2/3 \cdot \pi) - K_2(t) \cdot A \cdot \sin(\omega/2 \cdot t - 4/3 \cdot \pi),$ and $W2 = K_1(t) \cdot A \cdot \sin(\omega t - 4/3 \cdot \pi) + K_2(t) \cdot A \cdot \sin(\omega t/2 - 2/3 \cdot \pi),$ wherein $K_1(t) = e^{-t/T1}$, during the switching from the low speed to the high speed, $K_1(t)=1$, if the speed is below PRE, and $K_1(t)=0$, if $t/T1 \geq 1$, $K_1(t) = 1-e^{-t/T1}$, during the switching from the high speed to the low speed, $K_1(t)=0$, if the speed is below PRE, and $K_1(t)=1$, if $t/T \geq 1$, $K_2(t) = 1-e^{-t/T2}$, during the switching from the low speed to the high speed, $K_2(t)=0$, if the speed is below PRE, $K_2(t)=1$, if $K_2(t)=0$, if the speed is below PRE, $K_2(t)=1$, if $t/T2 \geq 1$, and $k_2(t) = e^{-t/T2}$, during the high-to-low speed change, $K_2(t)=1$, if the speed is below PRE and $K_2(t)=0$, if $t/T \geq 1$, and wherein $K_1(t)$ and $K_2(t)$ denote peak value correction functions, T1 denotes a time value equal to or above motor secondary time constant during the low speed driving, T2 denotes a time value equal to or above motor secondary time constant during the high speed driving, $\omega$ denotes an angular velocity, A denotes a peak value, t denotes a time taken from the switching start, and e denotes a base of natural logarithm.

4. An apparatus as claimed in claim 2, wherein said inverter means comprises two three-phase inverters, each of the three-phase inverters being connected to one group of lead terminals.

5. An apparatus as claimed in claim 1, wherein said inverter means comprises a single six-phase inverter which supplies frequency controlled six-phase currents to said two groups of the lead terminals; and wherein said controlling means controls said six-phase inverter to provide one of:
(i) phases of the outputs of said six-phase inverter such that each phase of the outputs at respective phases of said six-phase inverter is shifted sequentially by 2 π/3 for the two groups of the lead terminals when said induction motor is driven in the constant power operation range and the rotation speed of said induction motor falls in a relatively low speed range; and
(ii) phases of the outputs of said six-phase inverter such that each phase of the outputs at respective phases of said six-phase inverter is sequentially shifted by π/3 for the two groups of the lead terminals when said induction motor is driven in the constant power operation range and the rotation speed of said induction motor falls in the relatively low speed range, and controlling the said six-phase inverter to provide frequencies of the outputs at the respective phases of said six-phase inverter for the two groups of the lead terminals of said stator windings when said induction motor is driven in the constant power operation range and the rotation speed of said induction motor falls in a relatively high speed range such that the output frequencies are approximately half those outputted when said induction motor is driven in the constant power operation range and the rotation speed of said induction motor falls in the relatively low speed range.

6. An apparatus as claimed in claim 5, wherein said controlling means controls said six-phase inverter to output voltage control signals in accordance with the following equations, the output phases and frequencies of said six-phase inverter being switched during a switching between high speed driving in which the rotation speed of said induction motor falls in the high speed range and low speed driving in which the rotation speed of said induction motor falls in the low speed range, $U1 = K_1(t) \cdot A \cdot \sin(\omega t) + K_2(t) \cdot A \cdot \sin(\omega/2)t,$ $V2 = K_1(t) \cdot A \cdot \sin(\omega t - 2/3 \cdot \pi) + K_2(t) \cdot A \cdot \sin(\omega/2t - 1/3 \cdot \pi),$ $W1 = K_1(t) \cdot A \cdot \sin(\omega t - 4/3 \cdot \pi) + K_2(t) \cdot A \cdot \sin(\omega t/2 - 2/3 \cdot \pi),$ $U2 = K_1(t) \cdot A \cdot \sin(\omega t - 2\ \pi) + K_2(t) \cdot A \cdot \sin(\omega/2 \cdot t - 2/3 \cdot \pi),$ $V1 = K_1(t) \cdot A \cdot \sin(\omega t - 8/3 \cdot \pi) + K_2(t) \cdot A \cdot \sin(\omega/2 \cdot t - 4/3 \cdot \pi),$ and $W2 = K_1(t) \cdot A \cdot \sin(\omega t - 10/3 \cdot \pi) + K_2(t) \cdot A \cdot \sin(\omega t/2 - 5/3 \cdot \pi),$ wherein $K_1(t) = \sqrt{(1-t/T)}$, during the low-to-high speed change, $K_1(t)=1$, if the speed is below PRE, and $K_1(t)=0$, if $t/T \geq 1$, $K_1(t) = \sqrt{(t/T)}$, during the high-to-low speed change, $K_1(t)=0$, if the speed is below PRE, and $K_1(t)=1$, if $t/T \geq 1$, $K_2(t) = \sqrt{(t/T)}$ during the low-to-high speed change, $K_2(t)=0$, if the speed is below PRE, and $K_2(t)=1$, if $t/T \geq 1$, $k_2(t) = \sqrt{(1-t/T)}$, during the high-to-low speed change, $K_2(t)=1$, if the speed is below PRE and $K_2(t)=0$, if $t/T \geq 1$, and wherein $K_1(t)$ and $K_2(t)$ denote peak value correction functions, T denotes a switching time duration in the driving range, $\omega$ denotes an angular velocity, A denotes a peak value, and t denotes a time taken from the switching start.

7. An apparatus as claimed in claim 5, wherein said controlling means controls said six-phase inverter to output voltage control signals in accordance with the following equations, the output phases and frequencies of said six-phase inverter being switched during a switching between high speed driving in which the rotation speed of said induction motor falls in the high speed range and low speed driving in which the rotation speed of said induction motor falls in the low speed range, $U1 = K_1(t) \cdot A \cdot \sin(\omega t) + K_2(t) \cdot A \cdot \sin(\omega/2)t,$ $V2 = K_1(t) \cdot A \cdot \sin(\omega t - 2/3 \cdot \pi) + K_2(t) \cdot A \cdot \sin(\omega/2t - 1/3 \cdot \pi),$ $W1 = K_1(t) \cdot A \cdot \sin(\omega t - 4/3 \cdot \pi) + K_2(t) \cdot A \cdot \sin(\omega t/2 - 2/3 \cdot \pi)$ $U2 = K_1(t) \cdot A \cdot \sin(\omega t - 2\ \pi) + K_2(t) \cdot A \cdot \sin(\omega/2 \cdot t - 2/3\ \pi),$ $V1 = K_1(t) \cdot A \cdot \sin(\omega - 8/3 \cdot \pi) + K_2(t) \cdot A \cdot \sin\ \omega/2 \cdot\ t - 4/3 \cdot \pi),$ and $W2 = K_1(t) \cdot A \cdot \sin(\omega t - 10/3 \cdot \pi) + K_2(t) \cdot A \cdot \sin(\omega t/2 - 5/3 \cdot \pi),$ wherein $K_1(t) = e^{-t/T1}$, during the switching from the low speed to the high speed, $K_1(t)=1$, if the speed is below PRE, and $K_1(t)=0$, if $t/T1 \geq 1$, $K_1(t)=1-e^{-t/T1}$, during the switching from the high speed to the low speed, $K_1(t)=0$, if the speed is below PRE, and $K_1(t)=1$, if $t/T \geq 1$, $K_2(t)=1-e^{-t/T2}$, during the switching from the low speed to the high speed , $K_2(t)=0$, if the speed is below PRE, $K_2(t)=1$, if $K_2(t)=0$, if the speed is below PRE, $K_2(t)=1$, if $t/T2 \geq 1$, and $k_2(t)=e^{-t/T2}$, during the high-to-low speed change, $K_2(t)=1$, if the speed is below PRE and $K_2(t)=0$, if $t/T \geq 1$, and wherein $K_1(t)$ and $K_2(t)$ denote peak value correction functions, T1 denotes a time value equal to or above motor secondary time constant during the low speed driving, T2 denotes a time value equal to or above motor secondary time constant during the high speed driving, ω denotes an angular velocity, A denotes a peak value, t denotes a time taken from the switching start, and e denotes a base of natural logarithm.

8. An apparatus as claimed in claim 1, wherein said predetermined speed is varied depending upon a value of the rotation speed.

9. An apparatus as claimed in claim 8, wherein said predetermined speed is varied to provide first and second threshold values such that when the rotation speed of said induction motor falling in the low speed range is increased and has arrived at a speed substantially similar to the predetermined speed, the predetermined speed is shifted to the first threshold value which is higher than the second threshold value when the rotation speed of said induction motor falling in the high speed range is decreased and has arrived at a speed substantially similar to the predetermined speed.

10. An apparatus as claimed in claim 1, wherein said induction motor includes a plurality of the stator windings in a single-layer concentric winding form of the 2n number of poles, and wherein each one of the windings having an interval of 4 π in an electrical angle is connected in one of series with and parallel to another winding to form six winding groups, any of the winding groups present for each 2 π/3 in the electrical angle being sequentially set as: U1 phase, V2 phase, W1 phase, U2 phase, V1 phase, and W2 phase, wherein the U1, V1, and W1 phases are commonly connected to form a first group of stator windings and the U2, V2, and W2 phases are commonly connected to form a second group of stator windings, the first and second groups of said stator windings having the six lead terminals.

11. An apparatus as claimed in claim 1, wherein said induction motor includes six stator windings in a single-layer concentric winding form of four poles, each stator winding being sequentially set to $U_1, V_2, W_1, U_2, V_1$ and $W_2$ phases, the $U_1, V_1$, and $W_1$ phases forming a first group of three-phase windings, and the first and second groups being commonly connected in one of a Y or Δ connection form and having three of said six lead terminals.

12. An apparatus as claimed in claim 1, wherein said induction motor includes a plurality of stator windings in a double-layer lap winding form, the winding pitch of each stator winding being approximately one half a magnetic polarity pitch, and each one of the windings has an interval of 2 π in an electrical angle is connected in one of series with and parallel to another winding to form six winding groups, any of the winding groups present for each π/3 in the electrical angle being sequentially set as U1, V2, W1, $U_2, V_1$ and $W_2$ phases, the $U_1, V_1$, and $W_1$ phases being commonly connected to form a first group of stator windings, and the first group of stator windings and a second group of stator windings having six lead terminals.

13. An apparatus as claimed in claim 12, wherein said induction motor includes the plurality of the stator windings in the double-layer lap winding form of poles, each winding being sequentially set as $U_1, V_2, W_1, U_2, V_1$, and $W_2$ phases.

14. An apparatus as claimed in claim 5, further comprising:

a speed instruction generator which generates and outputs the speed instruction (ωr*), and wherein said controlling means comprises a speed control system adapted to receive the speed instruction (ωr*) and the measured rotation speed of said induction motor (ωr) and output exciting and torque current instructions (Ids1*, Iqs1*, Ids2*, Iqs2*) in d-q axes which are rotated in synchronization with the rotation of said induction motor in an operation mode of said induction motor in which the number of poles is changed into the n number of poles and in another operation mode thereof in which the number of poles is changed into the 2n number of poles;

current control systems adapted to receive the exciting and torque current instructions (Ids1*, Iqs1*, Ids2*, Iqs2*) and a corresponding one of two electrical angular frequencies (ω1 and ω2) and output voltage instructions in the d-q axes (Vds1*, Vqs1*, Vds1*, Vds2*, and Vqs2*); and a coordinate transformation block adapted to receive the voltage instructions (Vds1*, Vqs1*, Vds2*, Vqs2*) from the current control systems and an integrated result of a slip angular frequency (ω2) and a coefficient related to either the n number of poles or the 2n number of poles and output coordinate transformed six-phase voltage instructions.

15. An apparatus as claimed in claim 14, wherein said six-phase inverter outputs the six-phase voltage controlled signals to the six lead terminals of said induction motor according to the coordinate transformed six-phase voltage instructions received from the coordinate transformation block.

16. An apparatus as claimed in claim 15, wherein said speed control system comprises:

a speed control block which drives a difference between said speed instruction (ωr*) and the measured rotation speed (ωr) and outputs a torque instruction;

a first switch which serves to selectively output the torque instruction generated by the speed control block according to whether the operation mode of the induction motor is in the n number of poles or in the 2n number of poles;

coefficient generators which selectively multiply the torque instruction by constants depending on a switched position of said first switch to derive the q-axis current instructions (Iqs1* and Iqs2*);

indicators which derive the d-axis current instructions (Ids1*, Ids2*);

a second switch which serves to selectively pass the exciting current instructions in the d-axis (Ids1*, Ids2*);

first dividers which divide the q-axis current instructions (Ids1*, Ids2*);

coefficient generators adapted to generate and output Rr1/Lr1 (Rr1 denotes a secondary resistance and Lr1 denotes a secondary self inductance for the n number of poles) and Rr2/Lr2 (for the 2n number of poles) to multiply the divided d-q axes current instructions by the coefficients (Rr1/Lr1) to derive the slip frequencies (ωs1 and ωs2) in the operation mode of the n number of poles and in the operation mode of the 2n number of poles;

a third switch which serves to selectively switch one of the derived slip frequencies (ωs1 and ωs2) according to the current operation mode of either the n number of poles or the 2n number of poles.

17. An apparatus as claimed in claim 16, wherein said slip frequencies (ωs1 and ωs2) derived from said coefficient generators (Rr1/Lr1, Rr2/Lr2) are added to the number of poles by which the rotation speed of said induction motor is multiplied to provide the electrical angular frequencies (ω1 and ω2) in the operation mode in which the number of poles is changed into the n number of poles and in which the number of poles is changed into the 2n number of poles.

18. An apparatus as claimed in claim 17, wherein n is equal to four and wherein the number of poles in said induction motor is between four poles and eight poles, and which further comprises a current measuring block adapted to measure each phase current (Ia, Ib, Ic, Id, Ie, and If) at the six lead terminals of the pole change induction motor and output coordinate transformed currents in the d-q axes (Ids1, Iqs1, Ids1, and Iqs1), the coordinate transformed currents (Ids1, Iqs1, Ids1, and Iqs1) being fed back into the current control systems.

19. An apparatus as claimed in claim 13, wherein said speed control system comprises a first switching block for the n number poles and a second switching block for the 2n number poles, the first and second switching blocks being adapted to gradually raise the corresponding a first two of the exciting and torque current instructions in the d-q axes (Ids1* and Iqs1* or Ids2* and Iqs2*) and, simultaneously, gradually decrease a second two of the exciting and torque current instructions when the number of poles in the induction motor is changed from the n number of poles to the 2n number of poles.

20. An apparatus as claimed in claim 19, wherein when the number of poles in said induction motor is changed between the n number of poles and the 2n number of poles, the torque current instruction for the n number of poles is set to be proportional to $1-e^{(-t/Tr1)}$, wherein t denotes time from the start of the switching in the pole number, e denotes an exponential, and Tr1 denotes a secondary time constant;

and wherein an axial torque generated for the n number of poles is equal to $T^*(1-e^{(-t/Tr1)})$ and an axial torque generated for the 2n number of poles is equal to $T^*-T(n)$ and is equal to $T^*(2e^{(-t/Tr1)}-e^{(-2t/Tr1)})$.

21. An apparatus as claimed in claim 20, wherein said speed control block comprises a pole number switching instruction generator adapted to generate and output the pole number switching instruction when the rotation speed of said induction motor is increased from the low speed driving range and reaches a first threshold value and when the rotation speed of the induction motor is decreased from the high speed driving range and reaches a second threshold value, the pole number switching instruction being transmitted to said first, second, and third switches.

22. An apparatus as claimed in claim 21, wherein said pole number switching instruction generator comprises a window comparator.

23. An apparatus as claimed in claim 22, wherein said pole number switching instruction generator further comprises window comparing means for receiving the torque instruction and for issuing a switching enabling instruction when a value of the torque instruction is increased above a third threshold value set in said window comparing means and, thereafter, is decreased below a fourth threshold value which is lower than the third threshold value, and wherein said pole number switching instruction generator outputs the pole number switching instruction when the switching enabling instruction is issued.

24. An apparatus as claimed in claim 20, wherein when the number of poles of said induction motor is switched between the n number of poles and the 2n number of poles, a maximum value of the torque instruction is limited such that a maximum torque characteristic for the 2n number of poles is not abruptly changed, whereby a torque variation during the switching of the number of poles is suppressed.

25. An apparatus as claimed in claim 20, wherein when the number of poles of said induction motor is switched between the n number of poles and the 2n number of poles, a primary voltage of said induction motor is suppressed by said six-phase inverter so that a product of the exciting and torque current instructions in the primary side of the induction motor in d-q axes is maintained constant, whereby a torque variation during the switching of the number of poles is suppressed.

26. An apparatus as claimed in claim 25, further comprising a data base table adapted to store the primary exciting current and the primary torque current in the d-q axes with the torque instruction issued during the switching of the number of poles;

wherein the stored primary exciting and torque currents ($I1d$ and $I1q$) are such that $I1d \geq I1d\text{MIN}$ ($I1d\text{MIN}$: a lowest value of the primary exciting current in the d-axis), $T^*/K$ (K denotes a torque coefficient), $I1\text{MAX} \geq \sqrt{(I1d_2^2+I1q_2^2)}$ ($I1\text{MAX}$ denotes a current value up to which the six-phase inverter can output), and $V1\text{MAX} \geq \sqrt{(V1d^2+V1q^2)}$ ($V1d$ denotes a primary exciting voltage in the d-axis, $V1q$ denotes a primary torque voltage in the q-axis, and $V1\text{MAX}$ denotes a voltage value up to which the inverter can output).

27. An apparatus as claimed in claim 20, wherein a main circuit of said six-phase inverter is connected across a DC battery via an energy storage unit which effectively boosts a DC voltage applied to said main circuit when the number of poles is switched.

28. An apparatus as claimed in claim 27, wherein said energy storage unit comprises a voltage boosting chopper circuit with a power regeneration bypass circuit.

29. An apparatus as claimed in claim 28, wherein said energy storage unit comprises an AC motor with a flywheel.

30. A method for speed controlling a pole change induction motor, comprising the steps of:

(a) providing a pole change induction motor capable of changing its number of poles between an n number of poles and a 2n number of poles, wherein n is equal to one of 2 and 4, and having stator windings, the stator windings including six lead terminals;

(b) providing inverter means for frequency controlled three-phase powers for two groups of said stator windings, each of the two groups comprising one of two groups of lead terminals, each of said groups of lead terminals having three lead terminals;

(c) measuring a rotation speed of the pole change induction motor; and (d) receiving the measured rotation speed (ωr) of said pole change induction motor and a speed instruction (ωr*), and controlling output phases derived from said inverter means to the stator windings via each of the two groups of lead terminals to provide one of (i) same phases for the outputs of said inverter means; and (ii) phases of the outputs of said inverter means such that each phase of the outputs at respective phases of said inverter means is shifted sequentially by 2 π/3 for the two groups of lead terminals when said induction motor is driven in a constant power operation range and the rotation speed of the motor falls in a low speed range below a predetermined rotation speed, whereby the induction motor is driven with the number of poles being changed to the 2n number of poles.

31. An apparatus comprising:

a pole change induction motor constructed such that the number of poles of the motor can be switched between a first number of poles (n) and a second number of poles (2n), wherein n is equal to one of 2 and 4, the motor having stator windings arranged into two groups, each of the two groups having three lead terminals;

at least one inverter for providing three-phase power for the two groups of lead terminals;

measuring means for measuring a rotation speed ($\omega r$) of the motor; and a controller for receiving the measured rotation speed ($\omega r$) of the motor and a speed instruction ($\omega r^*$);

wherein when the motor is driven in a constant output range and the rotation speed ($\omega r$) of the motor falls in a low speed range below a predetermined rotation speed (af), and the number of poles of the motor is equal to the second (2n) number of poles, the controller controls the three-phase power provided by the at least one inverter via each of the two groups of lead terminals to provide one of (1) equivalent phases for the output of the at least one inverter, and (2) phases for the output of the at least one inverter such that each phase of the output at respective phases of the at least one inverter is sequentially shifted by 2 $\pi/3$ for the two groups of lead terminals; and wherein when the motor is driven in the constant output range and the rotation speed ($\omega r$) of the motor falls in a high speed range exceeding the predetermined speed (af), and the number of poles of the motor is equal to the first (n) number of poles, the controller controls the three-phase power provided by the at least one inverter via each of the two groups of lead terminals to provide one of (1) 180°-inverted phases for the output of the at least one inverter with an output frequency of each of the at least one inverters being halved, and (2) phases for the output of the at least one inverter such that each phase of the output at respective phases of the at least one inverter is sequentially shifted by $\pi/3$ for the two groups of lead terminals with an output frequency of each of the at least one inverters being halved.

32. An apparatus as claimed in claim 31, wherein n=2, and wherein the controller controls the inverter to output current control signals in accordance with the following equations:

$U1 = K_1(t) \cdot A \cdot \sin(\omega t) + K_2(t) \cdot A \cdot \sin(\omega/2)t,$ $V1 = K_1(t) \cdot A \cdot \sin(\omega t - 2/3 \cdot \pi) + K_2(t) \cdot A \cdot \sin(\omega/2t - 4/3 \cdot \pi),$ $W1 = K_1(t) \cdot A \cdot \sin(\omega t - 4/3 \cdot \pi) + K_2(t) \cdot A \cdot \sin(\omega t/2 - 2/3 \cdot \pi)$ $U2 = K_1(t) \cdot A \cdot \sin(\omega t) - K_2(t) \cdot A \cdot \sin(\omega/2 - t),$ $V2 = K_1(t) \cdot A \cdot \sin(\omega t - 2/3 \cdot \pi) - K_2(t) \cdot A \cdot \sin(\omega/2 \cdot t - 2/3 \cdot \pi) - K_2(t) \cdot A \cdot \sin(\omega/2 \cdot t - 4/\cdot \pi),$ and $W2 - K_1(t) \cdot A \cdot \sin(\omega t - 4/3 \cdot \pi) + K_2(t) \cdot A \cdot \sin(\omega t/2 - 2/3 \cdot \pi);$ wherein $K_1(t)=\sqrt{(1-t/T)}$, during the low-to-high speed change, $K_1(t)=1$, if the speed is below PRE, and $K_1(t)=0$, if $t/T \geq 1$, $K_1(t)=\sqrt{(t/T)}$, during the high-to-low speed change, $K_1(t)=0$, if the speed is below PRE, and $K_1(t)=1$, if $t/T \geq 1$, $K_2(t)=\sqrt{(t/T)}$ during the low-to-high speed change, $K_2(t)=0$, if the speed is below PRE, and $K_2(t)=1$, if $t/T \geq 1$, $k_2(t)=\sqrt{(1-t/T)}$, during the high-to-low speed change, $K_2(t)=1$, if the speed is below PRE and $K_2(t)=0$, if $t/T \geq 1$, and wherein $K_1(t)$ and $K_2(t)$ denote peak value correction functions, T denotes a switching time duration in the driving range, $\omega$ denotes an angular velocity, A denotes a peak value, and t denotes a time taken from the switching start.

33. An apparatus as claimed in claim 31, wherein n=2, and wherein the controller controls the inverter to output current control signals in accordance with the following equations:

$U1 = K_1(t) \cdot A \cdot \sin(\omega t) + K_2(t) \cdot A \cdot \sin(\omega/2)t;$ $V1 = K_1(t) \cdot A \cdot \sin(\omega t - 2/3 \cdot \pi) + K_2(t) \cdot A \cdot \sin(\omega/2t - 4/3 \cdot \pi),$ $W1 = K_1(t) \cdot A \cdot \sin(\omega t - 4/3 \cdot \pi) + K_2(t) \cdot A \cdot \sin(\omega t/2 - 2/3 \cdot \pi)$ $U2 = K_1(t) \cdot A \cdot \sin(\omega t) - K_2(t) \cdot A \cdot \sin(\omega/2 - t),$ $V2 = K_1(t) \cdot A \cdot \sin(\omega t - 2/3 \cdot \pi) - K_2(t) \cdot A \cdot \sin(\omega/2 \cdot t - 2/3 \cdot \pi) - K_2(t) \cdot A \cdot \sin(\omega/2 \cdot t - 4/3 \cdot \pi),$ and $W2 - K_1(t) \cdot A \cdot \sin(\omega t - 4/3 \cdot \pi) + K_2(t) \cdot A \cdot \sin(\omega t/2 - 2/3 \cdot \pi);$ wherein $K_1(t)=e^{-t/T1}$, during the switching from the low speed to the high speed, $K_1(t)=1$, if the speed is below PRE, and $K_1(t)=0$, if $t/T1 \geq 1$, $K_1(t)=1-e^{-t/T1}$, during the switching from the high speed to the low speed, $K_1(t)=0$, if the speed is below PRE, and $K_1(t)=1$, if $t/T \geq 1$, $K_2(t)=1-e^{-t/T2}$, during the switching from the low speed to the high speed, $K_2(t)=0$, if the speed is below PRE, $K_2(t)=1$, if $K_2(t)=0$, if the speed is below PRE, $K_2(t)=1$, if $t/T2 \geq 1$, and $k_2(t)=e^{-t/T2}$, during the high-to-low speed change, $K_2(t)=1$, if the speed is below PRE and $K_2(t)=0$, if $t/T \geq 1$, and wherein $K_1(t)$ and $K_2(t)$ denote peak value correction functions, T1 denotes a time value equal to or above motor secondary time constant during the low speed driving, T2 denotes a time value equal to or above motor secondary time constant during the high speed driving, $\omega$ denotes an angular velocity, A denotes a peak value, t denotes a time taken from the switching start, and e denotes a base of natural logarithm.

34. An apparatus as claimed in claim 31, wherein the inverter means comprises a six-phase inverter supplying frequency controlled six-phase currents to the two groups of the lead terminals, and wherein the controller controls said six-phase inverter to provide;

(1) the phases of the outputs of the six-phase inverter such that each phase of the outputs at respective phases of the six-phase inverter is shifted sequentially by 2 $\pi/3$ for the two groups of the lead terminals when the motor is driven in the constant output driving range and the rotation speed of the motor falls in the low speed range;

(2) the phases of the outputs of the six-phase inverter such that each phase of the outputs at respective phases of the six-phase inverter is sequentially shifted by $\pi/3$ for the two groups of the lead terminals;

(3) the frequencies of the outputs at the respective phases of said six-phase inverter for the two groups of the lead terminals such that the output frequencies are approximately half the output frequencies when the motor is driven in the constant output driving and the rotation speed of the motor falls in the high speed range.

35. An apparatus as claimed in claim 34, wherein the controller controls the six-phase inverter to output current control signals in accordance with the following equations:

$$U1 = K_1(t) \cdot A \cdot \sin(\omega t) + K_2(t) \cdot A \cdot \sin(\omega/2)t,$$

$$V2 = K_1(t) \cdot A \cdot \sin(\omega t - 2/3 \cdot \pi) + K_2(t) \cdot A \cdot \sin(\omega/2t - 1/3 \cdot \pi),$$

$$W1 = K_1(t) \cdot A \cdot \sin(\omega t - 4/3 \cdot \pi) + K_2(t) \cdot A \cdot \sin(\omega t/2 - 2/3 \cdot \pi),$$

$$U2 = K_1(t) \cdot A \cdot \sin(\omega t - 2\pi) + K_2(t) \cdot A \cdot \sin(\omega/2 \cdot t - 2/3 \cdot \pi),$$

$$V1 = K_1(t) \cdot A \cdot \sin(\omega t - 8/3 \cdot \pi) + K_2(t) \cdot A \cdot \sin(\omega/2 \cdot t - 4/3 \cdot \pi),$$

and $$W2 = K_1(t) \cdot A \cdot \sin(\omega t - 10/3 \cdot \pi) + K_2(t) \cdot A \cdot \sin(\omega t/2 - 5/3 \cdot \pi),$$

wherein $K_1(t) = \sqrt{(1-t/T)}$, during the low-to-high speed change, $K_1(t)=1$, if the speed is below PRE, and $K_1(t)=0$, if $t/T \geq 1$, $K_1(t) = \sqrt{(t/T)}$, during the high-to-low speed change, $K_1(t)=0$, if the speed is below PRE, and $K_1(t)=1$, if $t/T \geq 1$, $K_2(t) = \sqrt{(t/T)}$ during the low-to-high speed change, $K_2(t)=0$, if the speed is below PRE, and $K_2(t)=1$, if $t/T \geq 1$, $k_2(t) = \sqrt{(1-t/T)}$, during the high-to-low speed change, $K_2(t)=1$, if the speed is below PRE and $K_2(t)=0$, if $t/T \geq 1$, and wherein $K_1(t)$ and $K_2(t)$ denote peak value correction functions, T denotes a switching time duration in the driving range, $\omega$ denotes an angular velocity, A denotes a peak value, and t denotes a time taken from the switching start.

36. An apparatus as claimed in claim 34, wherein the controller controls the six-phase inverter to output current control signals in accordance with the following equations:

$$U1 = K_1(t) \cdot A \cdot \sin(\omega t) + K_2(t) \cdot A \cdot \sin(\omega/2)t,$$

$$V2 = K_1(t) \cdot A \cdot \sin(\omega t - 2/3 \cdot \pi) + K_2(t) \cdot A \cdot \sin(\omega/2t - 1/3 \cdot \pi),$$

$$W1 = K_1(t) \cdot A \cdot \sin(\omega t - 4/3 \cdot \pi) + K_2(t) \cdot A \cdot \sin(\omega t/2 - 2/3 \cdot \pi)$$

$$U2 = K_1(t) \cdot A \cdot \sin(\omega t - 2\pi) + K_2(t) \cdot A \cdot \sin(\omega/2 \cdot t - 2/3 \pi),$$

$$V1 = K_1(t) \cdot A \cdot \sin(\omega - 8/3 \cdot \pi) + K_2(t) \cdot A \cdot \sin(\omega/2 \cdot t - 4/3 \cdot \pi),$$

and $$W2 = K_1(t) \cdot A \cdot \sin(\omega t - 10/3 \cdot \pi) + K_2(t) \cdot A \cdot \sin(\omega t/2 - 5/3 \cdot \pi),$$

wherein $K_1(t) = e^{-t/T1}$, during the switching from the low speed to the high speed, $K_1(t)=1$, if the speed is below PRE, and $K_1(t)=0$, if $t/T1 \geq 1$, $K_1(t) = 1 - e^{-t/T1}$, during the switching from the high speed to the low speed, $K_1(t)=0$, if the speed is below PRE, and $K_1(t)=1$, if $t/T \geq 1$, $K_2(t) = 1 - e^{-t/T2}$, during the switching from the low speed to the high speed, $K_2(t)=0$, if the speed is below PRE, $K_2(t)=1$, if $K_2(t)=0$, if the speed is below PRE, $K_2(t)=1$, if $t/T2 \geq 1$, and $k_2(t) = e^{-t/T2}$, during the high-to-low speed change, $K_2(t)=1$, if the speed is below PRE and $K_2(t)=0$, if $t/T \geq 1$, and wherein $K_1(t)$ and $K_2(t)$ denote peak value correction functions, T1 denotes a time value equal to or above motor secondary time constant during the low speed driving, T2 denotes a time value equal to or above motor secondary time constant during the high speed driving, $\omega$ denotes an angular velocity, A denotes a peak value, t denotes a time taken from the switching start, and e denotes a base of natural logarithm.

37. An apparatus comprising:
(a) a pole change induction motor adapted to change its number of poles between an n number of poles and a 2n number of poles, wherein n is equal to one of 2 and 4, and having stator windings, the stator windings including six lead terminals;

(b) inverter means for providing frequency controlled three-phase powers for two groups of said stator windings, each of the two groups comprising three lead terminals;

(c) measuring means for measuring a rotation speed of the pole change induction motor; and (d) controlling means for receiving the measured rotation speed ($\omega r$) of said pole change induction motor and a speed instruction ($\omega r^*$), and controlling output phases derived from said inverter means to the stator windings via each of the two groups of lead terminals to provide one of (i) 180°-inverted output phases for the outputs of said inverter means which are supplied to one of the two groups of lead terminals with the same phases provided for the outputs of said inverter means which are supplied to the other of the two groups of lead terminals, and provide output frequencies of the outputs of said inverter means to the two groups of lead terminals which are approximately half the output frequencies in a case when said induction motor is driven in the constant output range and the rotation speed of the motor falls in the low speed range below the predetermined rotation speed; and (ii) the phases of the outputs of said inverter means such that each phase of the outputs at respective phases of said inverter means is sequentially shifted by $\pi/3$ for the two groups of lead terminals and to provide the frequencies of the outputs at the respective phases of said inverter means for the two groups of lead terminals such that the output frequencies are approximately half the output frequencies when the induction motor is driven in the constant output driving and the rotation speed of said induction motor falls in the low speed range when the induction motor is driven in the constant output range and the rotation speed of said induction motor falls in a high speed range exceeding the predetermined speed, whereby the induction motor is driven with the number of poles being changed to the n number of poles.

38. A method for speed controlling a pole change induction motor, comprising the steps of:

(a) providing a pole change induction motor capable of changing its number of poles between an n number of poles and a 2n number of poles, wherein n is equal to one of 2 and 4, and having stator windings, the stator windings including six lead terminals;

(b) providing inverter means for frequency controlled three-phase powers for two groups of said stator windings, each of the two groups comprising three lead terminals;

(c) measuring a rotation speed of the pole change induction motor; and (d) receiving the measured rotation speed ($\omega r$) of said pole change induction motor and a speed instruction ($\omega r^*$), and controlling output phases derived from said inverter means to the stator windings via each of the two groups of lead terminals to provide one of (i) 180°-inverted output phases for the outputs of said inverter means which are supplied to one of the two groups of lead terminals with the same phases provided for the outputs of said inverter means which are supplied to the other of the two groups of lead terminals, and provide output frequencies of the outputs of said inverter means to the two groups of lead terminals which are approximately half the output frequencies in a case when the induction motor is driven in the constant output range and the rotation speed of the induction motor falls in the low speed range below the predetermined speed; and (ii) the phases of the outputs of said inverter means such that each phase of the outputs at respective phases of said inverter means is sequentially shifted by π/3 for the two groups of lead terminals and to provide the frequencies of the outputs at the respective phases of said inverter means for the two groups of lead terminals such that the output frequencies are approximately half the output frequencies when the induction motor is driven in the constant output driving and the rotation speed of said induction motor falls in the low speed range, when the number of poles being changed to the n number of poles.

39. An apparatus comprising:

(a) a pole change induction motor adapted to change its number of poles between an n number of poles and a 2n number of poles, wherein n denotes an arbitrary number equal to 2 or more, and having stator windings, the stator windings including six lead terminals;

(b) a single six-phase inverter which supplies frequency controlled six-phase currents to said lead terminals;

(c) measuring means for measuring a rotation speed of the pole change induction motor; and (d) controlling means for receiving the measured rotation speed (ωr) of said pole change induction motor and a speed instruction (ωr*) and for controlling said six-phase inverter to provide either one of phases of the outputs of said six-phase inverter such that each phase of the outputs at respective phases of said six-phase inverter is shifted sequentially by 2 π/3 for two groups of the lead terminals of said stator windings when said induction motor is driven in a constant power operation range and the rotation speed of said induction motor falls in a relatively low speed range or the phases of the outputs of said six-phase inverter such that each phase of the outputs at respective phases of said six-phase inverter is sequentially shifted by π/3 for the two groups of the lead terminals of said stator windings when said induction motor is driven in the constant power operation range and the rotation speed of said induction motor falls in the relatively low speed range, and controlling the said six-phase inverter to provide frequencies of the outputs at the respective phases of said six-phase inverter for the two groups of the lead terminals of said stator windings when said induction motor is driven in the constant power operation range and the rotation speed of said induction motor falls in a relatively high speed range such that the output frequencies are approximately half those outputted when said induction motor is driven in the constant power operation range and the rotation speed of said induction motor falls in the relatively low speed range.

40. A method for speed controlling a pole change induction motor, comprising the steps of:

(a) providing a pole change induction motor capable of changing its number of poles between an n number of poles and a 2n number of poles, wherein n is equal to one of 2 and 4, and having stator windings, the stator windings including six lead terminals;

(b) providing inverter means for frequency controlled three-phase powers for two groups of said stator windings, each of the two groups comprising three lead terminals;

(c) measuring a rotation speed of the pole change induction motor; and (d) receiving the measured rotation speed (ωr) of said pole change induction motor and a speed instruction (ωr*), and controlling output phases derived from said inverter means to the stator windings via each of the two groups of lead terminals to provide one of (i) 180°-inverted output phases for the outputs of said inverter means which are supplied to one of the two groups of lead terminals with the same phases provided for the outputs of said inverter means which are supplied to the other of the two groups of lead terminals, and provide output frequencies of the outputs of said inverter means to the two groups of lead terminals which are approximately half the output frequencies in a case when the induction motor is driven in the constant power operation range and the rotation speed of the induction motor falls in the low speed range below the predetermined speed; and (ii) the phases of the outputs of said inverter means such that each phase of the outputs at respective phases of said inverter means is sequentially shifted by π/3 for the two groups of lead terminals and to provide the frequencies of the outputs at the respective phases of said inverter means for the two groups of lead terminals such that the output frequencies are approximately half the output frequencies when the induction motor is driven in the constant power operation range and the rotation speed of said induction motor falls in the low speed range, when the number of poles being changed to the n number of poles.

41. An apparatus comprising:

(a) a pole change induction motor adapted to change its number of poles between an n number of poles and a 2n number of poles, wherein n denotes an arbitrary number equal to 2 or more, and having stator windings, the stator windings including six lead terminals;

(b) a single six-phase inverter which supplies frequency controlled six-phase currents to said lead terminals;

(c) measuring means for measuring a rotation speed of the pole change induction motor; and (d) controlling means for receiving the measured rotation speed (ωr) of said pole change induction motor and a speed instruction (ωr*) and for controlling said six-phase inverter to provide either one of phases of the outputs of said six-phase inverter such that each phase of the outputs at respective phases of said six-phase inverter is shifted sequentially by 2 π/3 for two groups of the lead terminals of said stator windings when said induction motor is driven in a constant power operation range and the rotation speed of said induction motor falls in a relatively low speed range or the phases of the outputs of said six-phase inverter such that each phase of the outputs at respective phases of said six-phase inverter is sequentially shifted by π/3 for the two groups of the lead terminals of said stator windings when said induction motor is driven in the constant power operation range and the rotation speed of said induction motor falls in the relatively low speed range, and controlling the said six-phase inverter to provide frequencies of the outputs at the respective phases of said six-phase inverter for the two groups of the lead terminals of said stator windings when said induction motor is driven in the constant power operation range and the rotation speed of said induction motor falls in a relatively high speed range such that the output frequencies are approximately half those outputted when said induction motor is driven in the constant power operation range and the rotation speed of said induction motor falls in the relatively low speed range.

* * * * *